US012792875B1

(12) United States Patent
Krishnan et al.

(10) Patent No.: US 12,792,875 B1
(45) Date of Patent: Nov. 10, 2026

(54) SYSTEMS AND METHODS FOR ADAPTIVE REACTION NETWORK EXPLORATION WITH MACHINE LEARNING AND QUANTUM COMPUTER-AIDED REFINEMENT

(71) Applicant: QpiAI India Private Limited, Bangalore (IN)

(72) Inventors: Aswanth Krishnan, Bengaluru (IN); Lakshya Priyadarshi, Lucknow (IN); Swati Kumari, Bengaluru (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/394,775

(22) Filed: Nov. 19, 2025

(30) Foreign Application Priority Data

Oct. 8, 2025 (IN) ............................. 202541097075

(51) Int. Cl.
*G06N 3/042* (2023.01)
*G06N 10/60* (2022.01)

(52) U.S. Cl.
CPC ............. *G06N 3/042* (2023.01); *G06N 10/60* (2022.01)

(58) Field of Classification Search
None
See application file for complete search history.

(56) References Cited

U.S. PATENT DOCUMENTS

2009/0182542 A9 7/2009 Hilton et al.
2020/0365236 A1* 11/2020 Park .................... G06N 3/0464
2024/0153595 A1 5/2024 Alampara et al.
(Continued)

FOREIGN PATENT DOCUMENTS

WO WO-2025/076847 A1 4/2025

OTHER PUBLICATIONS

Wang, Fangxin, et al. "Uncertainty in graph neural networks: A survey." arXiv preprint arXiv:2403.07185 (2024). (Year: 2024).*
(Continued)

*Primary Examiner* — Karlheinz R. Skowronek
*Assistant Examiner* — Mary C Leverett
(74) *Attorney, Agent, or Firm* — Foley & Lardner LLP

(57) ABSTRACT

A molecular analysis system utilizes one or more processors coupled to non-transitory memory to process three-dimensional molecular structures. The system obtains atomic positions and types for a plurality of atoms and generates a corresponding graph data structure wherein nodes represent respective atoms. A graph neural network (GNN) model operates on the graph to produce, for each atom, an energy prediction, a force vector prediction, and an uncertainty score. Based on these outputs, the system selects a processing function for at least one atom. The selected processing function is executed using a hybrid classical-quantum computing architecture, enabling efficient and adaptive computational treatment of molecular systems. This integration of GNN-based inference with uncertainty-driven selection and hybrid computation enhances prediction accuracy and computational resource utilization in molecular modeling applications, such as energy estimation, structural optimization, and dynamic simulation.

20 Claims, 15 Drawing Sheets

(56) References Cited

U.S. PATENT DOCUMENTS

2025/0259084 A1 8/2025 Crabtree et al.

OTHER PUBLICATIONS

Maji, Debasis, et al. "Accelerating molecular dynamics with a graph neural network: a scalable approach through E (q) C-GNN." The Journal of Physical Chemistry Letters 16.9 (2025): 2254-2264. (Year: 2025).*
Musielewicz, Joseph, et al. "Improved uncertainty estimation of graph neural network potentials using engineered latent space distances." The Journal of Physical Chemistry C 128.49 (2024): 20799-20810. (Year: 2024).*
Kulichenko, Maksim, et al. "Uncertainty-driven dynamics for active learning of interatomic potentials." Nature computational science 3.3 (2023): 230-239. (Year: 2023).*
Lee, Jinsol, and Ghassan AlRegib. "Gradients as a measure of uncertainty in neural networks." 2020 IEEE International Conference on Image Processing (ICIP). IEEE, 2020. (Year: 2020).*
Baiardi, Alberto, Matthias Christandl, and Markus Reiher. "Quantum computing for molecular biology." ChemBioChem 24.13 (2023): e202300120. (Year: 2023).*
Non-Final Office Action on U.S. Appl. No. 19/394,672 DTD Jan. 26, 2026.

* cited by examiner

SYSTEMS AND METHODS FOR ADAPTIVE REACTION NETWORK EXPLORATION WITH MACHINE LEARNING AND QUANTUM COMPUTER-AIDED REFINEMENT

CROSS-REFERENCE TO RELATED APPLICATIONS

This application claims the benefit of priority to Indian Provisional Application No. 202541097075, filed Oct. 8, 2025, the entirety of which is incorporated by reference herein.

BACKGROUND

Modeling chemical systems is important for understanding reaction mechanisms, predicting material properties, and guiding molecular design. Computational chemistry methods can approximate molecular energies, forces, and electronic structures using simulations executed on different types of computing resources. However, achieving both accuracy and efficiency in simulating complex chemical reactions remains challenging.

SUMMARY

Computational chemistry approaches typically rely on density functional theory (DFT) and force-field based models to approximate atomic energies and forces. Although such approaches are generally accurate, they require the use of high-performance quantum systems and/or high-performance classical systems, and generally have poor performance. Although some attempts have been made to use machine-learning to accelerate the computation of molecular dynamics, such approaches typically fail because training distributions rarely cover the full chemical space encountered during reaction exploration. This leads to high prediction error outside the training domain, making conventional machine-learning approaches unsuitable to replace conventional DFT or force-field based models. In addition, traditional prediction approaches rarely quantify spatially resolved uncertainty, so low-confidence predictions cannot be identified during runtime. Such shortcomings place significant constraints on accuracy and scalability of reactive molecular simulations, making complex or large-scale computations impracticable to perform.

The techniques described herein address these shortcomings by providing a computational framework that combines universal machine learning potentials with targeted refinement from quantum simulations. To do so, machine-learning models can be trained and dynamically updated (e.g., fine-tuned) from specific sets of conformers to improve the performance and accuracy with respect to conventional approaches. Such conformers may be derived from selected reactions and/or reactants. To provide ground-truth data for such conformers, the systems and methods described herein can implement selective generation of simulation results using quantum approaches, hybrid approaches, and classical approaches, for example, to improve overall resource utilization relative to conventional approaches.

In one example use-case, a machine learning model is pre-trained on conformers generated under a range of initial conditions and subsequently fine-tuned using conformers derived from a target chemical reaction. The machine-learning model can be initially trained to generate, for an input molecular structure, per-atom outputs including energy predictions and force predictions. Various approaches (described in further detail herein) can be used to determine uncertainty scores for each atomic prediction. Once predictions have been generated, atoms can be grouped into fragments according to spatial proximity and respective their uncertainty values, and each fragment can be assigned a score (e.g., an average uncertainty score). The uncertainty score of the fragment can be used to determine a suitable processing function to calculate ground-truth force and energy values (e.g., via a simulation or approximation function).

In some implementations, the uncertainty score for a fragment can be used to determine whether the fragment is routed to a quantum computing system, a hybrid solver (e.g., combinations of quantum and classical processing), or a classical computing system. The results of fragment-level simulations, including refined per-atom energies and forces, can be combined with the fragment structures and stored within a training dataset. This process can be repeated for any number of fragments and/or conformers. The training dataset can be used to apply transfer learning operations that fine-tune the machine learning model, thereby incorporating difficult conformers sampled from the candidate reaction into the predictive framework. The process of receiving conformers, generating uncertainty-guided fragments, simulating selected fragments using quantum, hybrid, or high-accuracy classical methods, and updating the machine-learning model can be repeated for any number of conformers and environmental variations, progressively refining the accuracy and reliability of predictions using machine-learning models for molecular dynamics. This approach provides a technical improvement over conventional approaches by adaptively concentrating expensive computational resources on regions of high uncertainty, thereby increasing prediction accuracy while reducing overall system complexity.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of ‘a,’ ‘an,’ and ‘the’ include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
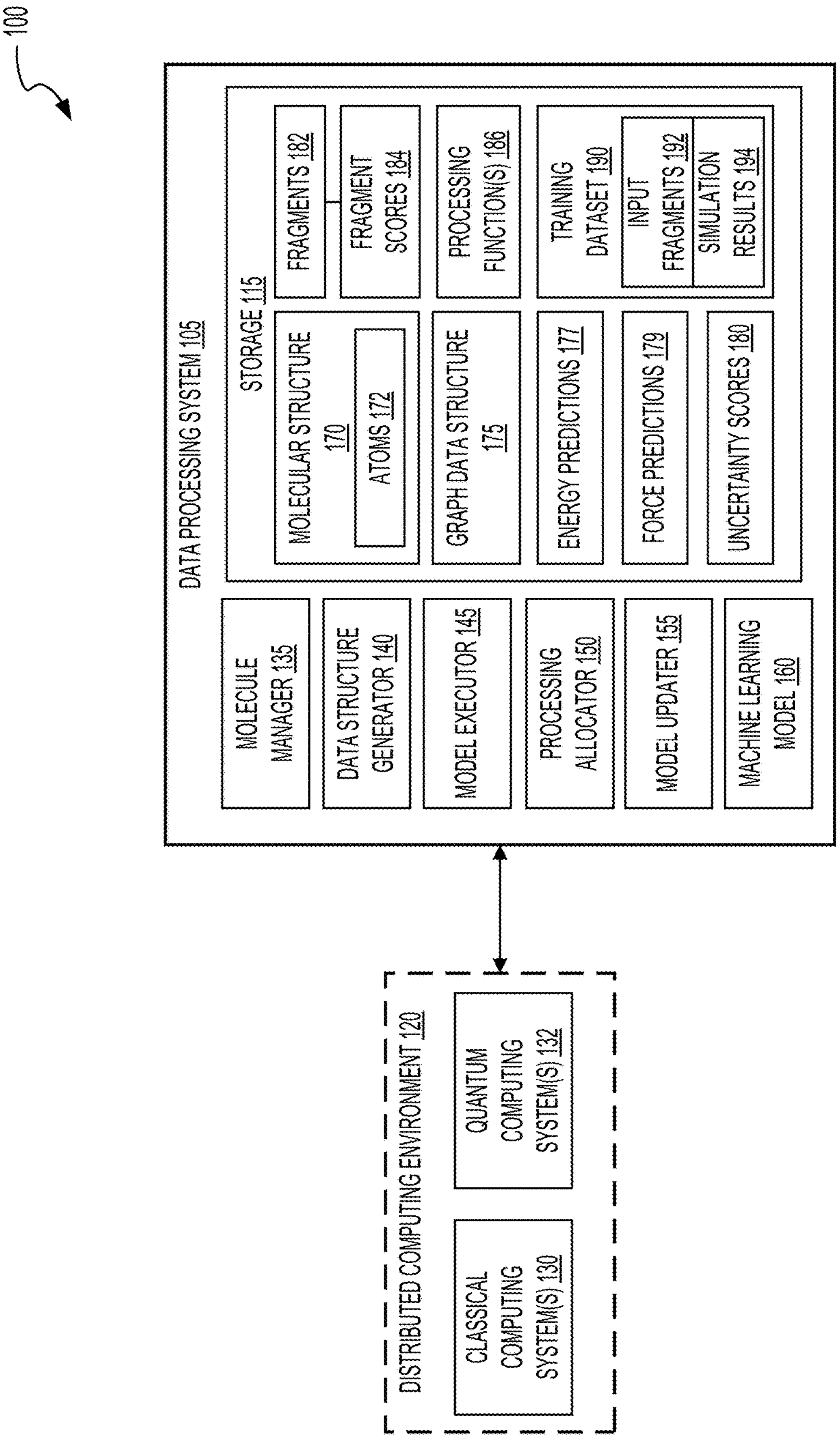
FIG. 1 illustrates a system for adaptive reaction network exploration with machine learning and quantum computer-aided refinement, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

This disclosure relates to techniques for adaptive chemical reaction network exploration using computational models that integrate machine learning approaches with refinement from quantum computing. Computational chemistry methods can be used to predict molecular energies, electronic structures, and dynamic interactions of atomic systems. Such techniques can be applicable to domains including catalysis, pharmaceutical development, and materials science. Computational chemistry typically solves molecular dynamics (e.g., energy and forces between atoms) using simulations, which may be executed on quantum processors or very high-performance computing systems (e.g., supercomputers).

Existing molecular simulation techniques are significantly constrained with respect to efficiency and scalability. For instance, DFT and force-field models can provide useful approximations but often require extensive computation time when applied to large or reactive systems. Generally, such approaches are not readily applicable to large datasets of molecular structures because doing so results in significant resource utilization and significant computation time. Although certain machine-learning approaches have been implemented to accelerate such calculations through predictions/approximations, such techniques tend to exhibit high prediction error for atomic environments that fall outside the training distribution for the machine-learning models generating those predictions.

The techniques described herein can address such constraints by providing an adaptive computational framework that combines the use of machine-learning with targeted refinement using quantum/classical simulations. The framework can implement a dynamic loop in which machine-learning models are trained and fine-tuned with conformers sampled from reaction pathways. Selected conformers can be evaluated through targeted quantum, hybrid, and/or high-accuracy classical simulations to generate ground-truth reference data. By dynamically generating and including simulation output from such sampled conformers into one or more training datasets, the techniques described herein can expand the predictive capacity of machine-learning models relative to conventional approaches. Such techniques enable the allocation of higher-fidelity methods to regions of molecular space where prediction error is likely to occur without requiring the significant computational resource consumption of conventional simulation techniques.

In one example implementation, a molecular structure (e.g., a candidate conformer) can be transformed into a graph representation in which atoms correspond to nodes and interatomic relationships correspond to edges. A machine-learning model (e.g., a graph neural network) can be executed to predict per-atom energies, forces, and to derive per-atom uncertainty scores. Atoms from the conformers can be clustered into fragments according to their uncertainty scores and their respective positions. Fragments having average uncertainty scores that exceed one or more thresholds can be routed for refinement using a selected computational method. In one example, a scheduler can assign fragments to a quantum computing environment, a hybrid solver, or a classical solver, based on configured thresholds and based on available computational resources. Refined fragment predictions can then be stored in a training dataset for the machine-learning model. Transfer learning can be applied to fine-tune the machine-learning model to continuously improve the predictive accuracy with respect to the corresponding candidate conformers.

The techniques described herein can provide several technical improvements over existing approaches to molecular simulation. By introducing spatially resolved uncertainty metrics, the techniques described herein can automatically train machine-learning models to accurately predict molecular dynamics for localized regions where high predicted error within a molecular environment is likely to occur. By adaptively selecting fragments for refinement, the systems and methods described herein can allocate computationally intensive resources only where they are most impactful, while improving the accuracy of relatively low-resource machine-learning operations with respect to such types of molecular structures. Through active learning and repeated updating of the predictive model, the framework can extend predictive accuracy to chemical environments not present during initial training. Once suitably trained, the machine-learning model can be used in place of computationally expensive simulations such as DFT, significantly reducing the computational resources required without sacrificing predictive accuracy. As a result, the techniques described herein can improve scalability, accuracy, and efficiency of molecular dynamics calculations compared to conventional methods.

Referring now to FIG. 1, illustrated is a block diagram of an example system 100 for adaptive reaction network exploration with machine learning and quantum computer-aided refinement. The system 100 can include a data processing system 105 and a distributed computing environment 120. The data processing system 105 can include a molecule manager 135, a data structure generator 140, a model executor 145, a processing allocator 150, a model updater 155, a machine learning model 160, and storage 115. The storage 115 can include a molecular structure 170 with atoms 172, a graph data structure 175, energy predictions 177, force predictions 179, uncertainty scores 180, fragments 182, fragment scores 184, processing functions 186, a training dataset 190, input fragments 192, and simulation results 194. The distributed computing environment 120 can include classical computing systems 130 and quantum computing systems 132.

The data processing system 105 can include at least one processor and a memory (e.g., a processing circuit). The memory can store processor-executable instructions that, when executed by processor(s), cause the processor(s) to perform one or more of the operations described herein. The processor(s) may include a general-purpose processor (e.g., a central processing unit (CPU), etc.), an application-specific integrated circuit (ASIC), a graphics processing unit (GPU), a tensor processing unit (TPU), a field-programmable gate array (FPGA), the like, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, and/or any other suitable memory from which the processor(s) can read instructions and/or data. The instructions may include code from any suitable computer programming language. The data processing system 105 can include one or more computing devices or servers that can perform various functions as described herein. The data processing system 105 can include any or all of the components and perform any or all of the functions of any computing system described herein.

Although the operations are described as being performed by the data processing system 105, any of the operations described herein may be performed via any computing system described herein. For example, in some implementations, various operations may be implemented by one or more classical systems 132 of the distributed computing environment 120. Any operation described herein can be performed in response to any suitable initiation condition. For example, any operation described herein can be performed in response to operator input received by the data processing system 105 (e.g., via an input/output device), via one or more processes executing via the data processing system 105 (or a computing system in communication with the data processing system 105), and/or in response to one or more requests transmitted to the data processing system 105.

For example, the data processing system 105 may provide one or more application programming interfaces (APIs) to which requests can be transmitted/provided. In some implementations, one or more external computing systems can transmit requests to the data processing system 105 via the network 110, and the data processing system 105 can provide corresponding responses to the requesting external computing systems through the network 110 according to the provided APIs. In one example, an external computing system can transmit a request to the data processing system 105 requesting processing of a particular molecular structure 170 (e.g., a candidate conformer, etc.), and the data processing system 105 can transmit a response including the energy predictions 177, the force predictions 179, and/or the uncertainty scores 180.

In some implementations, one or more requests can specify the execution of one or more training operations for an identified machine-learning model 160. In response to such requests, the data processing system 105 may provide a checkpoint/snapshot of an updated machine-learning model 160 and/or an identifier (e.g., a uniform resource identifier, uniform resource locator, etc.) to a network location at which the updated machine-learning model 160 may be obtained. The APIs provided by the data processing system 105 may be used to obtain any information about the processing operations described herein, including but not limited to information about the status of conformer generation, training operations, and/or inference operations.

The network 110 can include computer networks such as local, wide, metro, or other area networks. The network 110 can include intranets, cellular networks, satellite networks, other computer networks such as voice or data mobile phone communication networks, and/or combinations thereof. The data processing system 105 of the system 100 can communicate via the network 110, for instance with the classical computing systems 130 and/or the quantum computing systems 132. The network 110 may be any form of computer network that can relay information between the data processing system 105, the classical computing systems 130, the quantum computing systems 132, and/or one or more information sources, such as web servers or external databases/storage systems, among others.

In some implementations, the network 110 may include the Internet and/or other types of data networks. The network 110 may also include any number of computing devices (e.g., computers, servers, routers, network switches, etc.) that are configured to receive and/or transmit data within and/or via the network 110. The network 110 may further include any number of hardwired and/or wireless connections. Any or all of the computing devices described herein (e.g., the data processing system 105, the classical computing systems 130, the quantum computing systems 132, etc.) may communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein may also communicate wirelessly with the computing devices of the network 110 via a proxy device (e.g., a router, network switch, or gateway).

The system 100 is shown as the distributed computing environment 120. The distributed computing environment 120 can execute processing functions 186 selected by the processing allocator 150, as described in further detail herein. The distributed computing environment 120 can include one or more classical systems 130 and one or more quantum systems 132. The distributed computing environment 120 can include various heterogeneous hardware resources that are available for executing computing operations, including classical systems 130 and quantum systems 132. The distributed computing environment 120 can include, for example, nodes or servers that include one or more processing components 130 and/or quantum systems 132, clusters, or other types of computing devices.

In some implementations, the distributed computing environment 120 may be or may be included as part of a data center. The distributed computing environment 120 can include any type of computing hardware resources with any suitable memory, bandwidth, processing capability, and network topology. The distributed computing environment 120 can provision resources (or be provisioned, e.g., via the processing allocator 150, etc.) and facilitate communication among one or more classical systems 130 and quantum systems 132. In some implementations, classical systems 130 and quantum systems 132 can be allocated for the execution of one or more processing tasks in connection with the various approaches described herein. In some implementations, the distributed computing environment 120 may include or be in communication with one or more resources (e.g., memory systems, repositories, etc.) that may be shared among the classical systems 130 and quantum systems 132.

One or more of the classical systems 130 and/or the quantum systems 132 can communicate with the data processing system 105 to facilitate execution of various processing tasks (e.g., simulation of specific fragments 182, etc.). The distributed computing environment 120 can include interfaces that may be accessed by the data processing system 105 to transmit configuration data to the classical systems 130 and quantum systems 132, receive operational parameters, initiate assignment or reassignment of processing tasks, and/or monitor the state of the classical systems 130 and quantum systems 132. The interfaces can include but are not limited to APIs, command-line interfaces, and/or graphical user interfaces, for example, provided via web-based interfaces, among others. In some implementations, the data processing system 105 can use such interfaces to update resource assignments for the classical systems 130 and quantum systems 132, initiate partitioning or grouping of processing jobs, or initiate scheduling operations across the distributed computing environment 120.

The distributed computing environment 120 can include one or more classical systems 130, each of which can be an individual hardware resource such as a cluster, memory device, CPU, GPU, FPGA, ASIC, or a node or server that includes one or more CPUs, GPUs, FPGAs, and/or ASICs, among others. Each classical system 130 can have one or more attributes, which may include memory size, bandwidth, processing capability, and/or other hardware characteristics. The classical systems 130 can be arranged in the distributed computing environment 120 such that each classical system 130 can communicate with other classical systems 130 and/or with one or more quantum systems 132, for example, to obtain measurement results, exchange intermediate data, and/or facilitate execution of any processing task described herein. In some implementations, the data processing system 105 may provision one or more classical systems 130 and/or one or more quantum systems 132 to generate simulation results 194 for inclusion in one or more training datasets 190.

The quantum systems 132 can include one or more quantum processing units (QPUs), quantum memory, and quantum communication interfaces. Each QPU can include a qubit array, a quantum gate array, and a quantum readout system. The quantum systems 132 can execute quantum instructions and/or quantum algorithms, for example, quantum gate operations, quantum measurements, or quantum state preparations. The quantum memory can store quantum states and/or intermediate results generated by the quantum systems 132 during execution of quantum instructions. The quantum communication interfaces can facilitate transmission and/or reception of quantum information, such as qubit measurements, between the quantum systems 132 and other computing systems, such as one or more classical systems 130, other quantum systems 132, and/or the data processing system 105.

In some implementations, the quantum communication interfaces can include hardware and/or software components for interfacing with quantum-classical communication links or quantum interconnects. In some implementations, the quantum systems 132 can include quantum control electronics, such as microwave generators, digital-to-analog converters, analog-to-digital converters, and timing generators, to control quantum state manipulation and measurement operations. Any of the quantum systems 132 may be implemented using any of the components described in connection with the quantum system 1500 of FIG. 15. In some implementations, the quantum systems 132 may each include (or may be in communication with) one or more classical computing devices that can process and/or access results/measurements generated via the QPUs of the quantum systems 132.

The data processing system 105 can include or be in communication with the storage 115. The storage 115 can be a computer-readable memory that can store or maintain any of the information described herein. The storage 115 can maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via the network 210. In some implementations, the storage 115 can be internal to the data processing system 105. In some implementations, the storage 115 can exist external to the data processing system 105 and may be accessed via a network (e.g., the network 210). For example, the storage 115 may be distributed across many different computer systems (e.g., a cloud computing system) or storage elements and may be accessed via the network or a suitable computer bus interface.

The data processing system 105 can store, in one or more regions of the memory of the data processing system 105, or in the storage 115, the results of any or all computations, determinations, selections, identifications, generations, constructions, or calculations in one or more data structures indexed or identified with appropriate values. Any or all values stored in the storage 115 may be accessed by any computing device described herein, such as the data processing system 105, to perform any of the functionalities or functions described herein. In implementations where the storage 115 forms a part of a cloud computing system, the storage 115 can be a distributed storage medium in a cloud computing system and can be accessed by any of the components of the data processing system 105 or any other computing devices described herein.

The storage 115 can store one or more molecular structures 170. Each molecular structure 170 can represent a three-dimensional arrangement of atoms 172, each atom 172 having an associated spatial coordinate in three-dimensional space and an atom type such as an element type, charge state, or spin multiplicity. In some implementations, each molecular structure 170 can include one or more candidate conformers of a molecule or of a reaction intermediate formed between two or more reactants. For example, a molecular structure 170 can represent a gas-phase conformer of a reactant, a transition-state conformer along a reaction coordinate, or a solvated conformer of a product species. Each molecular structure 170 can be maintained in a digital format suitable for use by the data processing system 105. In some implementations, a molecular structure 170 can include additional metadata values that specify boundary conditions, solvent models, or thermodynamic state parameters such as temperature and pressure, which influence downstream processing events involving the molecular structure 170.

In some implementations, additional metadata values stored in association with a molecular structure 170 can include information identifying the manner in which the molecular structure 170 was generated or obtained. For example, a molecular structure 170 provided from an external computing system can include metadata identifying the source system, the associated dataset, and a request identifier that caused the molecular structure 170 to be generated. In some implementations, a molecular structure 170 obtained via operator input can include metadata relating to operator-specified structural constraints, operator-specified conformation sampling instructions, and identifiers of manually introduced geometric transformations. In some implementations, the metadata can further specify parameters such as the coordinate precision of atomic positions, the basis set applied during geometry preprocessing, or the file format type used for data exchange.

In some implementations, a molecular structure 170 generated through automated sampling operations can include metadata indicating one or more procedures used during such generation. For example, a molecular structure 170 generated through normal mode sampling can include metadata identifying the vibrational modes used to perturb the molecular geometry. A molecular structure 170 generated through molecular dynamics between reactants can include metadata specifying the simulation length, integration timestep, and random seed initialization used during the trajectory. A molecular structure 170 generated through reaction coordinate scanning can include metadata identifying the reaction coordinate definition, step resolution, and constraint values applied during scanning. In some implementations, such metadata can incorporate numerical identifiers of the integrator method and/or the constraint solver algorithm that governed the atomic motion.

In some implementations, metadata for a molecular structure 170 can include information specifying surface configurations used during conformer generation. For example, metadata values can include a selected surface layer, adsorption site mapping information, or geometric reconstruction descriptors describing the state of the surface lattice. In some implementations, metadata for a molecular structure 170 can include interface structure information such as binding site location, orientation sampling data, or chemical coverage values associated with one or more binding interactions. In some implementations, metadata for a molecular structure 170 can include environmental descriptors identifying simulation parameters such as solvent conditions, applied temperature, or applied pressure that influenced the conformer geometry. In some implementations, the environmental metadata can additionally specify parameters such as solvation model type, ionic strength, dielectric constant, or thermostatic ensemble identifiers (e.g., NVE, NVT, or NPT), which can define the thermodynamic regime under which the molecular structure 170 was obtained.

In some implementations, a molecular structure 170 can be stored in file formats such as XYZ, PDB, MOL2, or other chemistry-specific file types, or in serialized data structures describing atom identifiers, atomic positions, and bonding connectivity. For example, a molecular structure 170 can be represented internally in memory by an adjacency matrix encoding atom-to-atom connections and a tensor containing per-atom features including atomic number and three-dimensional position. In some implementations, the adjacency matrix can further encode bond order or aromaticity flags corresponding to individual atom pairs, while the tensor can include multi-channel features such as spin multiplicity or electron density approximations. For example, the tensor can store floating-point coordinates for atomic positions, discrete categorical identifiers for atom type, and continuous descriptors including partial charge or van der Waals radius. A molecular structure 170 can be provided via operator input, supplied in an application programming interface request, or obtained from a stored conformer dataset accessible to the storage 115. Example conformer generation processes are described in connection with FIG. 5.

The atoms 172 of the molecular structure 170 can be stored in association with one or more atom identity attributes or basic properties. Such attributes can include but are not limited to an element type stored as either an atomic number or a symbol, a formal charge represented as an integer value, and/or a spin multiplicity value that indicates the electronic state of the atom 172. In some implementations, the atoms 172 can further include an aromaticity flag to indicate whether the atom participates in an aromatic ring, or a hybridization state value that identifies the orbital state of the atom such as sp3, sp2, or sp. For example, a carbon atom 172 included in an aromatic ring of the corresponding molecular structure 170 can be stored with an aromaticity flag set to true, a formal charge value of zero, and a hybridization state set to sp2.

In some implementations, the atoms 172 of the molecular structure 170 can be stored in association with one or more local chemical environment descriptors. For example, the atoms 172 may be stored in association with a coordination number representing the number of bonded neighbors of a respective atom 172. In some implementations, the local chemical environment data can include a bond type list that identifies the types of bonds (e.g., single, double, triple, aromatic, etc.) that the atom 172 forms with its neighboring atoms 172. For example, an iron atom 172 in a coordination complex can be stored with a coordination number of six, and its bond type list can include six coordination bonds to surrounding oxygen atoms 172.

The atoms 172 of the molecular structure 170 can be stored in association with one or more geometric attributes. In some implementations, geometric features can include but are not limited to three-dimensional coordinates for each atom 172 expressed as absolute (x, y, z) positions, and/or relative positions referenced with respect to a center of the molecular structure 170. In some implementations, an atom 172 can further store distances to one or more neighbor atoms 172. In some implementations, angular descriptors can be stored to represent bond angle information, such as angular values computed between vectors formed by a given atom 172 and two neighbor atoms 172. For example, the data for a water molecule stored in the molecular structure 170 can represent an oxygen atom 172 at the origin, two hydrogen atoms 172 at coordinates defining an angle of approximately 104.5 degrees, and associated bond length values specifying the O—H distances.

The storage 115 is shown as storing a graph data structure 170. The storage 115 can store the graph data structure 175 as a machine-readable representation of a corresponding molecular structure 170, in which atoms 172 are encoded as nodes and interatomic relationships are encoded as edges. The graph data structure 175 can be maintained in memory as an adjacency list, adjacency matrix, and/or tensor format, and can be stored in file types such as JavaScript Object Notation (JSON), Hierarchical Data Format (HDF5), and/or chemistry-specific formats such as MOL2 or Protocol Buffer encodings. In some implementations, the graph data structure 175 can be stored in association with (e.g., store an identifier/reference of) a corresponding molecular structure 170. For example, a molecular structure 170 initially supplied in Protein Data Bank (PDB) or XYZ file formats can be transformed (e.g., using the techniques described herein) into a graph data structure 175 in which each atom 172 corresponds to an indexed node record in the graph, and each covalent bond or non-bonded neighbor interaction corresponds to an edge record with associated feature tensors. The storage 115 can store multiple graph data structures 175 for multiple distinct molecular structures 170.

Each node of the graph data structure 175 can encode atom-level descriptors that correspond to atoms 172 of the molecular structure 170. Such descriptors can include atom identity and basic properties such as element type (expressed as an atomic number or symbol and optionally one-hot encoded into a categorical tensor), formal charge as an integer value, spin multiplicity encoded to capture electronic ground or excited states, an aromaticity flag that signals membership in an aromatic ring, and a hybridization state encoded as a categorical value such as sp3, sp2, or sp. In some implementations, the graph data structure 175 can further encode local chemical environment descriptors at each node, such as coordination number representing the number of bonded neighbors, a bond type list identifying single, double, aromatic, or triple bonds to neighbors, and/or neighbor element statistics. For example, an iron atom 172 in a transition metal complex can include a coordination number of six, a bond type list referencing ligand coordination bonds, and a neighbor element histogram recording six oxygen neighbor atoms. The nodes of the graph data structure 175 can further encode geometric features and optional quantum descriptors that represent additional spatial or electronic information for atoms 172. Geometric features can include three-dimensional coordinates expressed as absolute x, y, z positions or relative to the center of mass of the molecular structure 170, radial distances to neighbors compiled as a local distance histogram, angular descriptors that encapsulate bond angle measures between pairs of neighbors, and/or spherical harmonic coefficients.

The graph data structure 175 can maintain edge records that correspond to bonding or connectivity relationships between atoms 172 of the molecular structure 170. Each edge record can include one or more bonding attributes such as bond type, bond order, an aromatic flag, and/or a conjugation flag. For example, a bond type attribute may represent whether the edge corresponds to a single, double, triple, or aromatic bond. A bond order attribute may store a numeric value representing the integer or fractional order of the bond, such as 1.0, 1.5, or 2.0, depending on whether the edge corresponds to a single bond, an aromatic bond, or a double bond. An aromatic flag may be stored as a Boolean value that indicates whether the atoms 172 connected by the edge participate in a delocalized 7*r*-electron system. A conjugation flag can indicate whether the edge is part of a conjugated path within the molecular structure 170, such as a linear sequence of single and double bonds.

The graph data structure 175 can further store geometric relationship attributes for each edge to represent spatial interactions between connected atoms 172. Each edge may include an interatomic distance value calculated as the Euclidean norm between the three-dimensional positions of the two atoms 172 connected by the edge. In some implementations, the edge may additionally store a relative position vector representing the difference between the Cartesian coordinates of a neighbor atom and a source atom along the edge. For example, if atom A has coordinates (x1, y1, z1) and atom B has coordinates (x2, y2, z2), the relative position vector for the edge can be (x2−x1, y2−y1, z2−z1). In some implementations, the graph data structure 175 can store a unit direction vector for each edge derived by normalizing the relative position vector. For example, the unit vector obtained from the difference vector can encode orientation and directionality, which can be used by the machine learning model 160 during message passing operations.

In some implementations, the graph data structure 175 can store one or more angular descriptors and/or torsional descriptors for edges that involve atoms 172 beyond the bonded pair. For example, if a first atom 172 forms bonds with both a second atom 172 and a third atom 172, the edge connecting the first and second atom 172 may store an angle attribute that represents the bond angle formed by the first atom 172, the second atom 172, and the third atom 172. Such angular and torsional attributes can be stored as floating-point numbers, and can be indexed in association with their respective edges in the graph data structure 175. In some implementations, angular descriptors may identify (e.g., using flags, other data structure entries, etc.) in-plane and out-of-plane bending geometries, and torsional descriptors may identify periodicity properties such as cis/trans or rotational symmetry relationships, among others.

The storage 115 can store energy predictions 177 generated for each atom 172 via the machine learning model 160. The energy predictions 177 can represent values on the potential energy surface of the molecular structure 170, where the potential energy surface defines the variation of predicted total energy as a function of the atomic positions in three-dimensional space. In some implementations, the potential energy surface generated using the energy predictions 177 can be used to characterize equilibrium geometries, transition states, or reaction pathways. For example, the potential energy surface can indicate relative minima corresponding to stable conformers or intermediates, and local saddle points corresponding to reaction barriers. The energy predictions 177 can therefore be used to predict thermodynamic stability, compute activation energies, or select conformer geometries for further refinement using higher accuracy computational methods.

The storage 115 can store force predictions 179 generated for each atom 172 via the machine learning model 160. The force predictions 179 can represent atomic force vectors derived as the negative gradient of the predicted potential energy with respect to the Cartesian coordinates of each atom 172. In some implementations, the force prediction 179 for an atom 172 can be expressed as a three-component vector (Fx, Fy, Fz) that corresponds to directional components of force along the x, y, and z axes of the molecular structure 170. In some implementations, the three-component vector can be expressed in floating-point form with defined precision and stored in association with the corresponding atom 172 within an indexed data structure.

The storage 115 can store one or more uncertainty scores 180 generated for corresponding atoms 172. Specifically, the uncertainty scores 180 can represent an uncertainty in the accuracy of the predicted energy values 177 and the predicted force values 179 generated for an atom 172. In some implementations, the uncertainty scores 180 can include an ensemble prediction variance generated from parameter dropout techniques applied to the machine learning model 160. Such an ensemble prediction variance can quantify the degree to which repeated predictions for the same atom 172 diverge when the parameters of the machine learning model 160 are perturbed, thereby measuring stability of learned representations. For example, if predictions for energy values 177 and force values 179 vary by only a small amount for a given atom 172, the ensemble prediction variance can remain low, indicating strong certainty. If predictions diverge significantly for that atom 172, the ensemble prediction variance can assume a larger value, signaling high uncertainty. The ensemble prediction variance score can be stored in association with the atom 172 and the corresponding predicted values 177 and 179 in the storage 115.

In some implementations, the uncertainty scores 180 can include a gradient-based sensitivity score obtained by relating prediction outputs to underlying model parameters. Such a score can quantify the relative susceptibility of predictions for an atom 172 to perturbations in parameters of the machine learning model 160. For example, if the gradient magnitudes associated with the energy value 177 or the force vector value 179 for an atom 172 are small, the predictions are relatively insensitive to parameter changes and the uncertainty score is low. If the gradient magnitudes are large, the predictions can vary sharply under slight adjustments, and the uncertainty score can be correspondingly high. The gradient-based sensitivity score can be stored together with the atom 172, enabling it to be referenced during further refinement.

In some implementations, the uncertainty scores 180 can include a distance-to-training-data score determined in a chemical embedding space. Such a score can quantify how similar the atomic environment of an atom 172 is relative to the distribution of atomic environments in a training dataset used for the machine learning model 160. For example, if the embedding of the atom 172 lies close to embeddings in the training dataset, the nearest neighbor distance will be small, reflecting higher certainty. If the embedding of the atom 172 lies far from all training embeddings, the nearest neighbor distance will be large, indicating potentially novel or underrepresented atomic environments. The distance-to-training-data score can be stored in association with the predictions 177 and 179 for the atom 172.

In some implementations, the uncertainty scores 180 can include a composite score generated as a weighted average of multiple component scores (e.g., ensemble prediction variance, gradient-based sensitivity, distance-to-training-data scores, etc.). Such a composite score can quantify aspects of uncertainty that are captured differently by each metric, combining information on prediction stability, parameter sensitivity, and dataset similarity in a single value. For example, a composite score can weight ensemble prediction variance more heavily when prediction divergence dominates, while giving higher weight to embedding distance when an atom 172 lies outside of training distribution. The composite score can be stored in association with the atom 172 together with the corresponding predicted energy values 177 and force values 179.

The storage 115 can store one or more fragments 182 derived from the molecular structure 170. Each fragment 182 can include a subset of the atoms 172 of the molecular structure 170, such that the subset corresponds to a localized region of the molecular structure 170 identified for separate processing. In some implementations, fragments 182 can be generated by clustering atoms 172 according to their uncertainty scores and respective spatial positions, as described in further detail herein. For example, a fragment 182 can represent a cluster of atoms 172 located near a reactive bond, a transition-metal center, or a strained region within the molecular structure 170. Each fragment 182 may be persisted as an individual object that maintains references to the constituent atoms 172, together with identifiers that associate the object with the parent molecular structure 170.

The storage 115 can maintain fragments 182 in any of a variety of machine-readable data structures. In some implementations, fragments 182 can be stored as subgraphs of the graph data structure 175, where only the nodes corresponding to the atoms 172 of the fragment 182 and the edges defining their connectivity are retained. In some implementations, fragments 182 can be maintained as array data structures containing index values and coordinate tensors representing the selected atoms 172. For example, a fragment 182 can be expressed as a serialized JSON object containing atom identifiers, bond connectivity, and an average uncertainty score. In another example, a fragment 182 can alternatively be stored as an HDF5 group with variable-length tensors indexing spatial coordinates, element types, or uncertainty values of the included atoms 172. In some implementations, each fragment 182 may be stored as a graph data structure similar in format to the graph data structure 175.

The storage 115 can store fragment scores 184 associated with the fragments 182. Each fragment score 184 can represent a quantitative measure of prediction reliability for the corresponding fragment 182 derived from the molecular structure 170. In some implementations, the fragment score 184 can be calculated as an average of the uncertainty scores 180 associated with the atoms 172 that are included in the fragment 182. For example, when a fragment 182 includes four atoms 172 with respective uncertainty scores 180, the fragment score 184 can be determined by summing the four uncertainty scores 180 and dividing by four to yield an average value. The fragment score 184 can be stored in direct association with the fragment 182 in the storage 115, thereby enabling downstream selection operations that determine whether the fragment 182 qualifies for additional processing using quantum or classical methods.

The storage 115 can store processing functions 186 that operate to simulate a fragment 182 and/or molecular structure 170 for the determination of energy values and force vectors corresponding to each atom 172. In some implementations, the processing functions 186 can include quantum operations represented as quantum tasks or circuit formulations suitable for execution on a quantum computing system 132. For example, the processing functions 186 can include/define quantum circuits for variational quantum eigensolver (VQE), quantum phase estimation (QPE), unitary coupled cluster singles and doubles (UCCSD), and/or Hamiltonian diagonalization routines which may be encoded, for example, in Pauli operator form. In some implementations, the processing functions 186 can include applying quantum circuit reduction protocols, qubit tapering methods, and/or quantum error mitigation operations (e.g., zero-noise extrapolation, etc.).

In some implementations, the processing functions 186 can include implementing electronic structure calculations in which the quantum mechanical Hamiltonian for the fragment 182 is constructed and solved. The Hamiltonian can encode the kinetic energy of electrons, electron-nuclear attraction, and electron-electron repulsion terms for the atoms 172 of the fragment 182. For example, the processing functions 186 can include selecting among methods such as VQE, QPE, or complete active space self-consistent field (CASSCF) according to algorithm selection logic that evaluates fragment size, available qubits, and circuit depth. The resulting procedure can generate eigenvalues corresponding to the electronic ground state and in some cases low-lying excited states of the fragment 182.

In some implementations, the processing functions 186 can include applying boundary treatments required where the fragment 182 has been isolated from a surrounding molecular structure 170. For example, the processing functions 186 can include inserting link atoms such as hydrogen atoms at severed carbon-carbon bonds to satisfy valence in the quantum input structure. The processing functions 186 can include freezing certain orbitals located at the fragment boundary to maintain wavefunction consistency between the quantum region and the excluded region. Such orbital freezing can prevent artificial electron delocalization across cut bonds in the Hamiltonian representation.

In some implementations, the processing functions 186 can include performing numerical quantum calculations that yield fragment-level observables. For example, one execution of the processing functions 186 can include generating a scalar value representing the total ground state energy of the fragment 182. In another example, the processing functions 186 can include generating per-atom force vectors for atoms 172 within the fragment 182 by evaluating the gradient of the total energy with respect to nuclear coordinates. In another example, the processing functions 186 can include determining electronic properties such as charge distribution across the fragment 182 or spin density localized on selected atoms 172. Such properties can be stored to facilitate subsequent embedding with classical calculations.

The storage 115 can further maintain processing functions 186 that define hybrid quantum-classical methods in which a subset of the fragment 182 is simulated with quantum instructions while complementary portions are processed with classical computing algorithms executed via classical computing systems 130. In some implementations, the hybrid processing functions 186 can include specifying iterative routines in which quantum subroutines evaluate parameterized Hamiltonian expectation values that are used in a classical optimization loop. For example, a VQE algorithm can include executing parameterized ansatz circuits on a quantum processor of the quantum computing system 132 while a classical optimizer of the classical computing system 130 applies gradient-free or gradient-based parameter updates. In some implementations, the hybrid processing functions 186 can include applying embedding methodologies where a fragment 182 is treated quantum mechanically while boundary conditions are processed with molecular mechanics force fields or continuum solvation models using classical resources of the classical computing system 130. For example, the hybrid processing functions 186 can include assigning a catalytic pocket of a molecular structure 170 to a quantum simulation executed on a quantum computing system 132 while approximating solvent polarization energies using a Poisson-Boltzmann solver executed on the classical computing system 130.

In some implementations, the processing functions 186 can include applying operations that address overlap between quantum and classical regions of the molecular structure 170 to maintain continuity of the simulation at the interface. For example, the processing functions 186 can include inserting link atoms at the boundary to cap severed bonds in the quantum region, such as replacing a carbon-carbon bond with a carbon-hydrogen cap in the fragment input data. The processing functions 186 can include assigning electronic charges derived from the quantum calculation executed by the quantum computing system 132 to fit point charges at the boundary that represent electrostatic effects to the classical environment processed by the classical computing system 130. In another example, the processing functions 186 can include simulating polarization effects in which the electron density of the quantum fragment 182 induces dipole moments in the classical region processed by the classical computing system 130, and conversely the field of the classical environment modifies the quantum-state calculation of the fragment 182 executed on the quantum computing system 132.

The storage 115 can additionally store processing functions 186 that specify entirely classical computing operations executed by the classical computing systems 130, which may be used as a fallback path or as a selected method when uncertainty scores do not meet a quantum selection threshold. In some implementations, such classical processing functions 186 can include/define coupled cluster approaches such as coupled cluster singles and doubles with perturbative triples [CCSD(T)], multi-configurational self-consistent field (MCSCF), density matrix renormalization group (DMRG), and/or high-accuracy density functional theory (DFT) variants. In some implementations, the classical processing functions 186 can include applying semi-empirical quantum chemistry methods such as PM7 or force-field routines like CHARMNM or AMBER for fragments 182 with low uncertainty values. For example, a molecular structure 170 representing a protein-ligand interface can include being simulated via DFT with hybrid functionals as defined by the processing functions 186 to obtain forces without requiring execution of a quantum algorithm on the quantum computing system 132.

In some implementations, the classical processing functions 186 can include incorporating long-range interaction models to preserve correlations between the classical environment and the fragment 182. For example, the classical processing functions 186 can include calculating Coulombic interactions between partial charges on the environment atoms and van der Waals interactions between non-bonded atoms at the fragment boundary. Such processing functions 186 can be executed via the classical computing systems 130 to maintain the continuity of energy contributions across the quantum-classical boundary. In some implementations, the classical processing functions 186 can include applying environmental models that represent solvent and dynamic thermodynamic effects. For example, an implicit solvent model can include being assigned using a polarizable continuum representation, or an explicit solvent layer can include being applied by including discrete solvent atoms maintained under molecular dynamics executed by the classical computing systems 130. The classical processing functions 186 can include applying thermodynamic conditions by simulating the effects of temperature and pressure on the configuration of the molecular structure 170.

In some implementations, the classical processing functions 186 can include applying molecular mechanics operations that extend force field descriptions to the environment region of the molecular structure 170. For example, the classical processing functions 186 can include performing geometry optimization calculations on atoms to enforce bond lengths, bond angles, and torsion angles defined by a selected force field parameter set. In another example, the processing functions 186 can include executing a molecular dynamics simulation (e.g., via classical, quantum, or hybrid algorithms) to generate physically realistic motion of atoms that connect to the fragment 182.

The storage 115 can store the training dataset 190, which can be used to fine-tune the machine learning model 160 by maintaining examples derived from fragment-level computations. The training dataset 190 can include a set of records where each record is formed from an input fragment 192 and corresponding ground-truth simulation results 194, and each such record can be indexed for access by the machine learning model 160 during retraining operations. In some implementations, the training dataset 190 can be separated into subsets such as a training portion and a validation portion to permit evaluation of model accuracy on data that has not been used for parameter updates. For example, the storage 115 can allocate a configurable percentage of records within the training dataset 190 to serve exclusively as validation data, and the machine learning model 160 can apply those records as checkpoints for estimating error convergence during fine-tuning. The training dataset 190 can be stored in serialized formats such as HDF5, JSON, or binary tensor data structures, which in some implementations may be stored in association with indexing metadata that identifies dataset boundaries, record counts, and/or set partitions.

The training dataset 190 can include input fragments 192 that are selected for storage after being derived from one or more molecular structures 170. The input fragments 192 can correspond to regions identified as having elevated uncertainty scores 180 and can be clustered into fragment groupings for additional processing. In some implementations, the input fragments 192 can be screened and ranked according to retention criteria that determine whether they are sufficiently distinct to warrant inclusion in the training dataset 190. For example, as described in connection with FIG. 6, the dataset generation process can involve obtaining a molecular structure, applying selection and ranking operations, evaluating retention criteria, and generating a training example if the criteria are satisfied. Each input fragment 192 can therefore represent a localized structure that is intended for refinement and subsequent utilization in retraining the machine learning model 160.

In some implementations, the input fragment 192 can correspond to an entire molecular structure 170 rather than a localized region. For example, the input fragment 192 can represent a reactant conformer, a full transition-state geometry, or an entire solvated product configuration. In such cases, the stored input fragment 192 can include all atoms 172 of the molecular structure 170, the corresponding connectivity and coordinate data, and any associated metadata describing charge states or environmental parameters. The training dataset 190 can therefore maintain complete molecular systems alongside partial fragments, and such full molecular structures can be used in association with the machine learning model 160 for finetuning and/or pretraining operations. In some implementations, the storage 115 may include multiple training datasets 190. In some implementations, some training datasets 190 may include entire molecules represented as input fragments 192, while other training datasets 190 may include partial fragments of entire molecules as input fragments 192.

The training dataset 190 can further include simulation results 194 corresponding to each input fragment 192. The simulation results 194 can include high-accuracy values derived from processing functions 186 applied to the fragment, such as predicted energy values or force vector values for the atoms 172 contained in the fragment. In some implementations, the simulation results 194 can be generated via quantum computation, hybrid quantum-classical computation, and/or high-accuracy classical computation, depending on the fragment score 184 and allocation thresholds. For example, a fragment 182 with high uncertainty may produce simulation results 194 containing a total energy value and per-atom force vectors computed via a VQE executed on a quantum computing system 132. The simulation results 194 can be stored in association with the corresponding input fragment 192 within the training dataset 190 to preserve the linkage between the input and the refined output.

The data processing system 105 is shown as including one or more machine-learning models 160 that can implement a graph neural network architecture. The machine-learning models 160 can receive graph data structures representing molecular structures and propagate node and edge information through message passing layers to update atom-level feature vectors. In some implementations, each message passing layer can compute messages from neighboring nodes using edge features such as interatomic distance, bond type, or angular descriptors, and aggregate such messages for feature updates. For example, a message passing layer can calculate weighted sums of neighbor embeddings and apply a nonlinear transformation to generate updated node representations. The machine-learning models 160 can include multiple stacked message passing layers, where each subsequent layer receives updated atom features and refines the representation to support accurate energy, force, and uncertainty predictions.

The machine-learning models 160 can further include one or more output heads that map node embeddings to respective prediction targets. In some implementations, a first output head can generate scalar energy contributions per atom, a second output head can generate vector-valued force predictions per atom, and a third output head can generate scalar uncertainty estimates for each atom. For example, the force prediction head can apply a linear transformation to a node embedding followed by a constraint operation that enforces equivariance with respect to molecular rotation, resulting in a valid three-component force vector. In some implementations, the uncertainty prediction head can generate variance estimates based on ensemble prediction methods or dropout-based approximations. The machine-learning models 160 can store intermediate node and edge embeddings across layers, allowing gradients to propagate backward during training for refinement of atomic features.

In some implementations, the machine-learning models 160 may be pre-trained (e.g., via the model trainer 155)using a noise-based training procedure that applies forward diffusion and reverse denoising processes to molecular structures 170. In some implementations, the forward process may add noise to conformer inputs across multiple timesteps, and the reverse process may learn to reconstruct the original conformer representation from progressively noisier states. For example, the machine-learning models 160 may process thousands of distinct molecular structures 170 sampled from different regions of chemical space, and the model trainer 155 can iteratively adjust the parameters of the machine-learning model 160 during reverse generation in order to learn embeddings of atomic environments under variable conditions.

The machine-learning models 160 may be fine-tuned using one or more training datasets 190 that include ground-truth quantum or classical simulation results. In some implementations, the training datasets 190 may store input fragments 192 linked with simulation results 194 including force vectors 179 and energy predictions 177 generated via high-accuracy methods processing functions 186. For example, the model updater 155 may apply transfer learning techniques in which updated weights are optimized against the training dataset 190 such that subsequent inference of force vectors 179 and energy values 177 for unobserved molecular structures 170 reflect higher accuracy relative to the pre-trained model. Example training processes for the machine-learning model 160 are described in connection with FIG. 7. Example implementations of the machine-learning model are described in connection with FIGS. 2 and 3.

Figure 2:
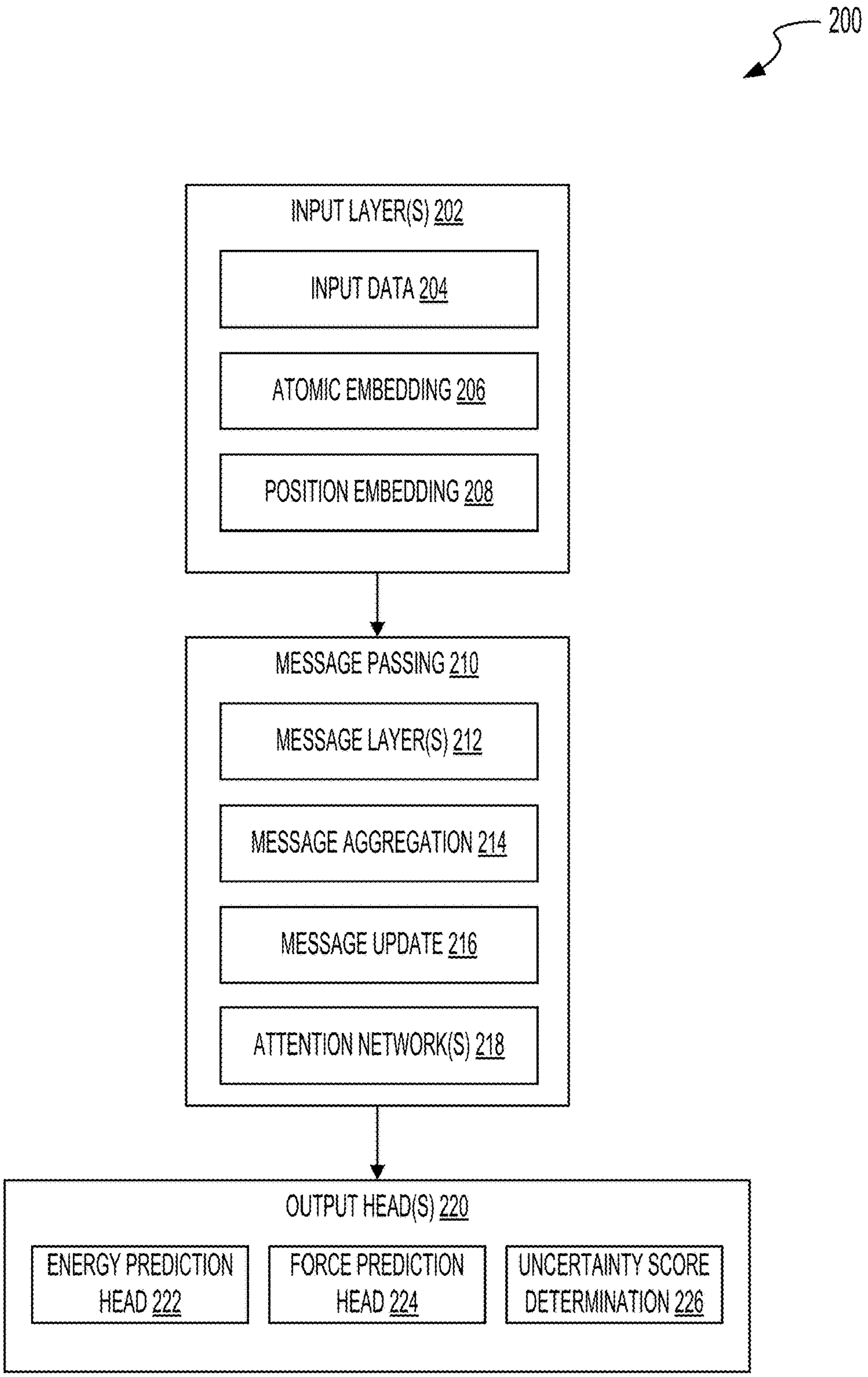
FIG. 2 illustrates an example architecture of a graph neural network for adaptive reaction network exploration, in accordance with one or more implementations.

Referring now to FIG. 2, illustrated is a block diagram of an example machine-learning model 200 for adaptive reaction network exploration, in accordance with one or more implementations. The machine-learning model 200 can include one or more input layers 202, message passing layers 210, and one or more output heads 220. The input layers 202 can include input data 204, atomic embedding layer(s) 206, and position embedding(s) 208. The message passing 210 can include one or more message layers 212, a message aggregation 214, a message update 216, and one or more attention networks 218. The output heads 220 can include an energy prediction head 222 and a force prediction head 224. Predictions generated via the energy prediction head 222 and the force prediction head 224 can be used in uncertainty score determination operations 226.

The machine-learning model 200 can receive an input atomic structure (e.g., the molecular structure 170) that is encoded as a graph data structure (e.g., a graph data structure 175) and can generate predicted energy values (e.g., energy predictions 177) and predicted force vectors (e.g., force predictions 179) for each atom (e.g., atom 172) of the structure. The input layers 202 can embed the node features and edge features of the graph data structure into latent vectors that are propagated through message passing 210 to update atomic feature vectors using information exchanged among bonded and non-bonded neighbors. Data resulting from the message passing layers can be provided to output heads, which generate corresponding predicted energy values and predicted force vectors for each atom in the molecular structure.

The input layers 202 can receive input data 204 representing raw descriptors of each atom of a molecular structure (e.g., feature vectors/descriptor data associated with nodes and edges of the graph data structure 175). The input data 204 can include any of the information included as part of a graph data structure 175 of FIG. 1. Each of the components of the input data 204 can be encoded into numerical formats such as one-hot vectors, integer identifiers, or learned embeddings, and can be passed to atomic embedding layers 206 for further transformation. The input data 204 may be provided, for example, by the model executor 145 of FIG. 1.

The atomic embedding layers 206 can be linear (e.g., fully connected) layers that are trained/updated to map the features included in the input data 204 into continuous vector representations. Each atomic embedding layer 206 can apply a learned parameter matrix that transforms discrete identifiers such as element type or hybridization into dense atom feature vectors. In some implementations, the atomic embedding layers 206 can output a latent vector where atoms of similar type and environment occupy similar positions in the embedding space. For example, two transition-metal atoms with the same oxidation state but different spin multiplicities can be represented as embedding vectors that are distinct but remain close by distance metrics defined within the latent space. Position embeddings 208 can then be generated and concatenated or added to the atomic embeddings produced by the atomic embedding layers 206.

The position embeddings 208 can encode spatial geometry such as absolute Cartesian coordinates, pairwise interatomic distances, bond angles between atomic triplets, and torsional descriptors of quadruplets of connected atoms. In some implementations, the position embeddings 208 can incorporate relative coordinate representations, distance matrix computations, and angular feature extraction to describe spatial features of atomic neighborhoods, while including periodic boundary handling for periodic crystal systems. For example, in a periodic crystal system the position embeddings 208 can incorporate lattice vectors and periodic image offsets to reflect translational symmetry across unit cell boundaries. In some implementations, the position embeddings 208 can be further expanded into radial basis functions or spherical harmonic coefficients to preserve SE(3) or SO(3) equivariance. For example, the radial basis expansion can apply Gaussian basis functions, Bessel function expansions, cutoff function implementations, and/or multi-scale representations to capture interatomic distances at different resolutions.

The machine-learning model 200, when executed, can implement message passing operations 210 that generate directed message vectors representing the influence of one atom on its neighbors within the graph data structure encoding the molecular data structure. The message passing operations 210 can include one or more message passing layers 212 that can be trained/updated to generate a message vector for each atom and each connected neighbor using both the neighbor's feature representation and the edge features that connect the atoms. As described herein, in some implementations, the edge features can include descriptors such as bond type, interatomic distance, or a relative position vector that encodes geometric displacement. For example, if a carbon atom is connected to an oxygen atom by a double bond, the message passing layers 212 can generate a message vector that incorporates the oxygen atom's embedding features, the double bond descriptor, and a displacement vector oriented from the carbon atom to the oxygen atom, according to the learned parameters of the message passing layers 212.

The message passing operations 210 can further include a message aggregation process 214 that combines the message vectors received by a central atom into a single interaction representation. The aggregation process 214 can be performed using summation, averaging, maximum selection, and/or an attention-weighted operation that assigns variable influence to different neighbor atoms. In some implementations, the aggregation 214 can enforce rotational and/or translational equivariance so that the orientation and magnitude of aggregated vectors are consistent under spatial transformations of the molecular structure. For example, message vectors generated for an iron atom in a coordination complex from six oxygen neighbors can be aggregated with weights based on the relative spatial positions of the oxygen atoms, generating a combined vector that encodes the three-dimensional coordination geometry. Once the aggregation process 214 is complete, the message passing operations 210 can apply a message update operation 216 in which the aggregated representation is combined with the atom's prior embedding, such as by a linear or fully connected transformation (e.g., via one or more fully connected/linear layers) that may include residual connections to preserve previous information.

The message passing operations 210 can include one or more attention networks 218 that assign variable weights to message vectors generated between nodes of the graph data structure. The attention networks 218 can compute a scalar coefficient for each neighbor relationship that quantifies the relative importance of the corresponding message vector during aggregation. In some implementations, the attention networks 218 can apply a learned linear transform to the concatenation of atom embeddings and edge features, followed by a nonlinear activation function to generate the scalar coefficient. For example, when two atoms are connected by a double bond and are separated by a specific interatomic distance, the attention networks 218 can output a higher weighting coefficient relative to a neighbor connected by a single bond at a longer distance. In some implementations, the scalar coefficients generated by the attention networks 218 can be normalized across all neighbors of each atom such that the weighted message aggregation operation preserves equivariance with respect to molecular rotations and translations.

The attention heads 220 can receive the refined per-atom feature vectors generated after message passing operations of the machine-learning model 200 and direct them toward specialized prediction tasks. The attention heads 220 can include an energy prediction head 222 and a force prediction head 224, each trained with distinct objectives while optionally sharing initial transformation layers. In some implementations, the energy prediction head 222 can map each atom's embedding to a scalar energy contribution, which can be summed across all atoms of a molecular structure to obtain a total system energy. For example, the energy prediction head 222 can apply one or more fully connected layers followed by nonlinear activations to produce a scalar value, scaled into physical energy units and trained against reference energies derived from quantum mechanical simulations or high-accuracy classical computations. The preservation of translational and rotational invariance in the processing layers of the energy prediction head 222 can ensure that displacing or rotating the entire molecular structure does not alter the predicted total energy.

The force prediction head 224 can operate on the same per-atom embeddings to generate a three-component vector corresponding to force components along x, y, and z axes. In some implementations, the force prediction head 224 can implement an equivariant transformation that rotates force vectors in correspondence with any spatial rotation applied to the molecular structure, thereby maintaining physical consistency. For example, the force prediction head 224 can map atomic embeddings through vector-valued layers that respect SE(3) symmetries and yield directional force components suitable for geometry optimization and molecular dynamics. In another example, the force vectors may be determined by applying automatic differentiation to energy values predicted by the energy prediction head 222, with an auxiliary loss function applied to maintain consistency between the two predictions. The values generated by the force prediction head 224 can therefore represent the negative gradient of the energy with respect to nuclear coordinates, producing atomic forces that inform trajectory propagation or conformer relaxation.

In one example, the machine-learning model 200 may be used in uncertainty score determination operations 226 to generate one or more uncertainty scores (e.g., uncertainty scores 180) for each atom of the input data 202. The uncertainty scores can be calculated according to the techniques described in connection with FIG. 1. In some implementations, the uncertainty score determination operations 226 may involve determining multiple complementary measures such as ensemble prediction variance, gradient sensitivity, and embedding distance to training data (e.g., distance to input fragments 192 in the training dataset 190). For example, ensemble variance can be determined by re-executing the machine-learning model 200 to generated predictions via the energy prediction head 222 and the force prediction head 224 under different parameter dropout conditions and measuring prediction divergence. In some implementations, gradient sensitivity can be calculated according to parameters of the current weights of the machine-learning model 200. In one example, embedding distance can be measured between feature vectors of new atomic environments and those present in a stored training dataset.

Figure 3:
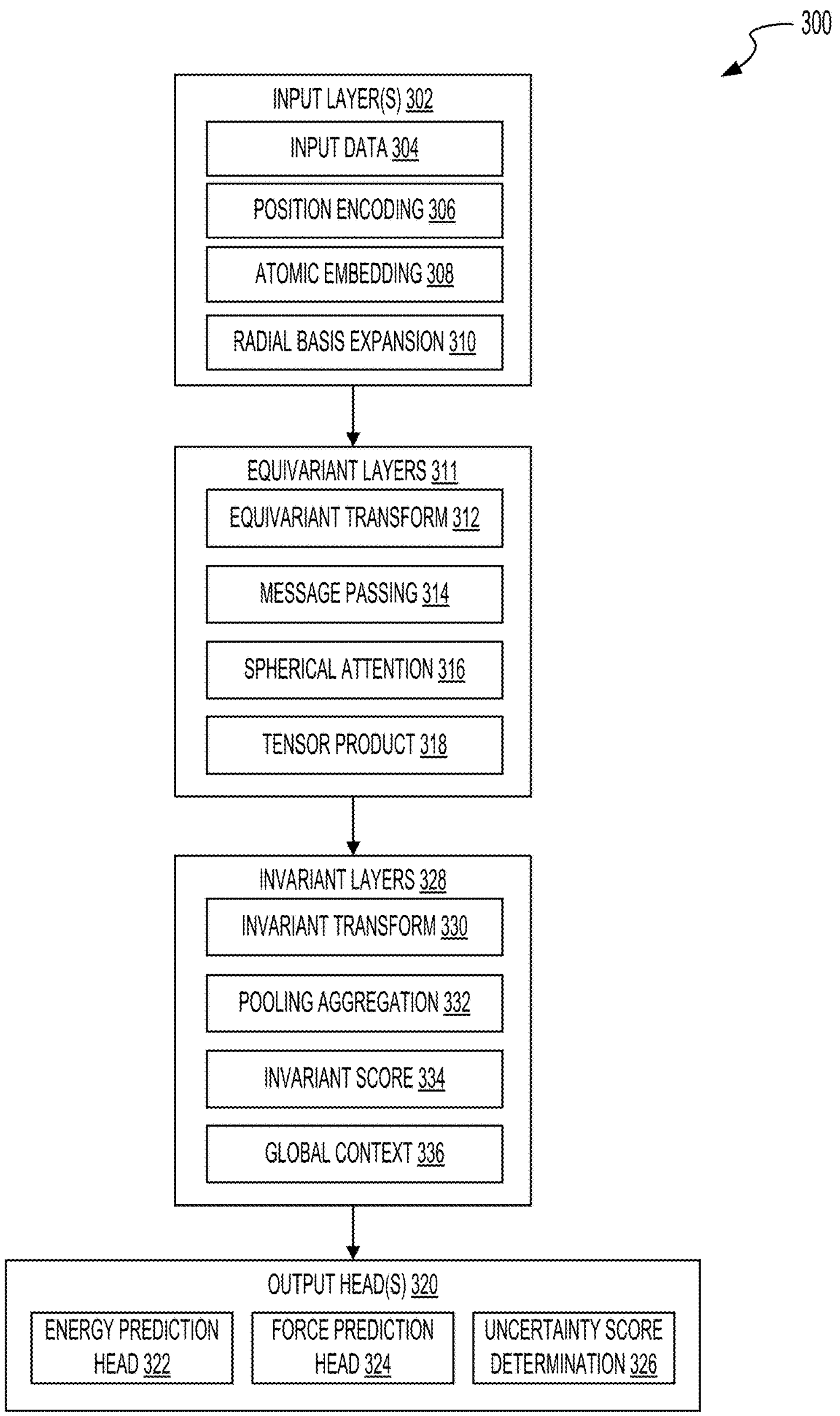
FIG. 3 illustrates an invariant graph neural network architecture for adaptive reaction network exploration, in accordance with one or more implementations.

Referring now to FIG. 3, illustrated is a block diagram of an example invariant graph neural network architecture implemented as a machine-learning model 300 for adaptive reaction network exploration, in accordance with one or more implementations. The machine-learning model 300 can include one or more input layers 302, equivariant layers 311, invariant layers 328, and one or more output heads 320. The input layers 302 can include input data 304, a position encoding 306, an atomic embedding 308, and a radial basis expansion 310. The equivariant layers 311 can include an equivariant transform 312, a message passing 314, a spherical attention 316, and a tensor product 318. The invariant layers 328 can include an invariant transform 330, a pooling aggregation 332, an invariant score 334, and a global context 336. The output heads 320 can include an energy prediction head 322 and a force prediction head 324. Predictions generated via the energy prediction head 322 and the force prediction head 324 can be used in uncertainty score determination operations 326.

The machine-learning model 300 can be implemented as an invariant graph neural network architecture for adaptive reaction network exploration. The machine-learning model 300 can receive molecular input data (e.g., molecular structure 170 encoded as graph data structure 175) and can be used to generate per-atom predictions including energy values (e.g., energy predictions 177), force vectors (e.g., force predictions 179), and uncertainty scores (e.g., uncertainty scores 180). The input layers 302 can embed atomic and bonding descriptors into latent feature vectors while applying position encoding 306 and radial basis expansion 310 to represent interatomic distances in continuous basis functions.

The equivariant layers 311 can propagate the latent feature vectors through operations such as equivariant transform operations 312, message passing operations 314, spherical attention operations 316, and tensor product operations 318 to maintain rotational and translational equivariance when processing vector and tensor features. The invariant layers 328 can transform the resulting equivariant embeddings into rotationally and translationally invariant representations using invariant transform 330, pooling aggregation 332, invariant score computation 334, and incorporation of global context 336. The output heads 320 can use the invariant and equivariant representations to generate per-atom scalar energy predictions, per-atom force vectors that are equivariant to spatial orientation, and corresponding uncertainty scores, each of which can be accessed for downstream processing operations as described herein.

The input layers 302 can receive input data 304 that specifies per-atom descriptors and environmental parameters as the initial representation for graph construction. The input data 304 can include a graph data structure (e.g., a graph data structure 175) of a molecular structure (e.g., a molecular structure 170) or fragment (e.g., fragment 182), which as described herein can include nodes that represent atoms (e.g., atoms 172). As described in connection with FIG. 2, the input data 304 (similar to input data 204) can include categorical values such as element type, formal charge, spin state, hybridization, and/or aromaticity flags for each atom, and can further include descriptors such as coordination numbers and/or neighbor distance histograms. In some implementations, the input data 304 can include indicators of electronic state such as closed-shell status, radical site assignment, and/or transition metal center designation with a defined spin multiplicity. The input data 304 may include any of the edge features described herein. Each of the values in the input data 304 can be transformed into or represented as one-hot encodings, integer identifiers, and/or floating-point features that can be accessed by the position encoding process 306, the atomic embedding process 308, and/or the radial basis expansion process 310 for generation of continuous latent vectors.

The atomic embedding process 308 can involve mapping the categorical and continuous values contained in the input data 304 into dense numerical vectors that define initial latent representations for individual atoms. In some implementations, the atomic embedding process 308 can involve applying trainable parameter matrices to categorical variables such as atom type, hybridization, or aromaticity flags so that atoms of related type or chemical environment occupy proximate locations in the latent space. For example, the atomic embedding process 308 can involve assigning distinct vector encodings to a carbon atom in an sp3 hybridization environment, a carbon atom in an aromatic ring, and/or a carbon atom in a carbonyl group, with the relative distances between the vectors reflecting learned chemical similarity.

The position encoding process 306 can involve concatenating or summing the vectors generated by the atomic embedding process 308 to incorporate spatial geometry into the per-atom representations. In some implementations, the position encoding process 306 can involve calculating interatomic distances, generating angular descriptors, or applying periodic offsets when structures are ordered in crystalline lattices. The position encoding process 306 can further involve incorporating a radial basis expansion process 310 for interatomic distances using Gaussian basis sets, Bessel functions, or related formulations, with cutoff values applied to restrict message passing to neighbors located within a defined interaction range. For example, the position encoding process 306 can involve concatenating periodic boundary offsets for crystalline lattices, inserting bond angle values for triplets of bonded atoms, or assigning torsional descriptors for quadruplets of bonded atoms, thereby maintaining invariance under translational or rotational transformations of the molecular structure.

The equivariant layers 311 of the machine-learning model 200 can be used to generate geometry-dependent feature representations that preserve equivariance under molecular rotation or translation. The equivariant transform operations 312 can map atom-level descriptors and geometric features (e.g., direction vectors, etc.) into SE(3) and/or SO(3) representation spaces that preserve transformation properties for downstream processing. In some implementations, the equivariant transform operations 312 can involve using linear transformation layers (e.g., fully connected layers, etc.) to embed atomic number encodings, charge values, and/or aromaticity flags while aligning relative position vectors into a tensor field representation. For example, the equivariant transform operations 312 can use linear layers to assign one-hot atomic type embeddings to a scalar space while converting displacement vectors between atoms into directional basis expansions, maintaining rotation-equivariant behavior. The transformed features can serve as input to the message passing operations 314, which can propagate updated embeddings between atoms over the edges of the graph data structure while preserving physical alignment of vectors and tensors under spatial changes.

The message passing operations 314 can generate directional message vectors between atomic nodes by combining embeddings with vector-valued functions of relative geometry such as interatomic distances, angular descriptors, or torsional measures. In some implementations, the message passing operations 314 can be executed across multiple stacked layers, with each layer applying a transformation to propagate updated directional embeddings through the graph data structure. For example, a first message passing layer can encode a displacement vector between a source atom and a neighbor atom together with scalar descriptors of bond order or interaction type, and subsequently pass the resulting embedding to a second message passing layer which applies additional parameterized functions to refine orientation information.

In some implementations, the message passing operations 314 can expand interatomic distances into basis function vectors such as Gaussian radial basis functions and propagate those across several layers to interpolate smoothly across variable bond lengths. For example, one layer can generate a ten-dimensional radial basis vector corresponding to successive distance intervals between two hydrogen atoms, and the next layer can concatenate the radial vector with the atomic embeddings of the hydrogen atoms to form the propagated directional message. In some implementations, the message passing operations 314 can incorporate angular descriptors derived from triplets of neighboring atoms across successive layers to preserve higher-order geometric relationships. For example, a first layer can compute a cosine value of a bond angle formed between a nitrogen atom and two carbon atoms, and a subsequent layer can append that scalar angle feature to the directional embedding when propagating information across the graph.

The spherical attention operations 316 can compute attention weights that are equivariant under SO(3) transformations by using angular similarities or spherical harmonic correlations between atom neighborhoods. In some implementations, the spherical attention operations 316 can include calculating angular correlation values by projecting relative orientation vectors between bonded or non-bonded atoms into a spherical harmonic basis and comparing coefficients across atom neighborhoods. For example, the spherical attention operations 316 can include generating spherical harmonic expansions of displacement vectors between a central atom and each neighbor atom, computing inner products between these expansions, and assigning attention coefficients proportional to the resulting correlation values. In some implementations, the spherical attention operations 316 can include normalizing the attention coefficients across all neighbors of an atom to preserve equivariance under rotation in SO(3) space. For example, the spherical attention operations 316 can include assigning higher weighting factors to neighbor atoms forming bond angles within a functional group, such as planar sp2 bonds with bond angles near 120 degrees, relative to atoms oriented at distant angular positions. In some implementations, the spherical attention operations 316 can include classifying neighbor pairs into angular bins determined by predefined spherical harmonic orders and applying weighting functions that increase attention for colinear or coplanar neighbor atoms and decrease attention for neighbors that fall into orthogonal or higher-order angular bins.

The tensor product operations 318 can be used to combine tensor features derived from different nodes and edges via the spherical attention operations 316 according to irreducible representation composition rules such as Clebsch-Gordan coefficient expansions. In some implementations, the tensor product operations 318 can include classifying incoming tensor features according to their rank and representation type before performing factorized multiplications that generate symmetric tensor constructions suitable for subsequent equivariant processing. For example, the tensor product operations 318 can include identifying a pair of directional embedding vectors, aligning their indices according to Clebsch-Gordan tables stored in memory, and executing a multiplication-expansion that produces higher-order representation coefficients cataloged by irreducible components.

The tensor product operations 318 can include classifying each resulting coefficient into the appropriate tensor order (e.g., scalar, vector, or higher-order tensor) and propagating the classified coefficients to subsequent equivariant layers 311 for message passing continuity. For example, the tensor product operations 318 can include merging two rank-one directional embeddings into rank-two tensors that capture angular correlations across triplets of atoms and storing the results in feature tensors used for message passing 314 as part of higher-order interaction modeling. In some implementations, the tensor product operations 318 can apply Wigner D-matrix transformations to rotate tensor features into a consistent orientation space during propagation, thereby preserving rotation-equivariant symmetry across combinations of atomic embeddings. For example, a directional embedding from atom A to atom B combined with an embedding from atom A to atom C can be aligned through tensor products, expanded into rank-two tensors using a Wigner D-matrix alignment, and classified into irreducible representations that capture the bond angle between atoms A, B, and C while preserving invariance under molecular rotations and translations. The use of Wigner D-matrix alignment can maintain a consistent coordinate frame across message passing iterations.

The invariant transform operations 330 can include converting vector-valued or tensor-valued features generated by the equivariant layers 311 into scalar features that remain unchanged under molecular rotation, translation, or permutation of atoms. In some implementations, the invariant transform operations 330 can include calculating vector magnitudes to remove directional dependence and produce scalar descriptors. For example, the invariant transform operations 330 can calculate the Euclidean norm of a displacement vector between two atoms to yield a distance value that does not vary under rotation of the molecular structure. In some implementations, the invariant transform operations 330 can include generating dot products or traces of tensors to distill orientation-dependent descriptors into invariant scalar features. For example, the invariant transform operations 330 can compute a dot product between two bond vectors to generate a scalar that reflects the bond angle defined by three atoms, without retaining frame-specific orientation.

The pooling aggregation operations 332 can include combining scalar features generated by the invariant transform operations 330 into aggregated descriptors that summarize atom-level or fragment-level properties in a permutation-invariant format. In some implementations, the pooling aggregation operations 332 can include summing scalar contributions from individual atoms to generate descriptors of total molecular properties. For example, the pooling aggregation operations 332 can add atomic energy contributions to obtain a scalar representing the total energy of the molecular system. In some implementations, the pooling aggregation operations 332 can include mean, minimum, or maximum reductions to compute descriptors that emphasize distributional characteristics across atoms. For example, the pooling aggregation operations 332 can compute the maximum predicted charge density among a group of atoms in order to characterize the extremal electronic feature of a functional group. In some implementations, the pooling aggregation operations 332 can include hierarchical pooling in which subgroups of atoms are pooled first, and the subgroup descriptors are pooled again at a higher level.

The invariant score operations 334 can include applying one or more transformations to descriptors generated by the pooling aggregation operations 332 to produce invariant scores suitable for downstream model tasks. In some implementations, the invariant score operations 334 can include applying a neural sub-network to learn nonlinear combinations of pooled features. For example, the invariant score operations 334 can apply a multi-layer perceptron to pooled distance and angle features in order to obtain descriptors representing rigidity or spatial compactness of molecular fragments. In some implementations, the invariant score operations 334 can include generating specialized kernels derived from pooled values, such as distance-based kernel functions that reflect average separation among defined groups of atoms. For example, the invariant score operations 334 can calculate an average interatomic distance in a fragment and map that scalar through a Gaussian kernel to generate a descriptor highlighting conformational compactness. In some implementations, the invariant score operations 334 can include scaling and normalization procedures to ensure that invariant scores remain comparable across molecular structures with different atom counts.

The global context operations 336 can include incorporating system-wide descriptors or environmental conditions into the invariant representation generated by the invariant score operations 334. In some implementations, the global context operations 336 can include concatenating pooled molecular descriptors with environment-level parameters to form a joint descriptor vector. For example, the global context operations 336 can concatenate invariant scores with explicit simulation metadata such as temperature or pressure to allow predictions conditioned on thermodynamic state. In some implementations, the global context operations 336 can include incorporating approximate long-range interactions into the joint invariant representation. For example, the global context operations 336 can include appending a descriptor (e.g., a vector, tensor, etc.) representing averaged electrostatic interactions derived from partial charges to improve accuracy of molecular property predictions.

The output heads 320 of the machine-learning model 300 can be similar in structure and operation to the output heads 220 of the machine-learning model 200. For example, the energy prediction head 322 can operate similarly to the energy prediction head 222 to generate per-atom scalar energy predictions (e.g., energy predictions 177), and the force prediction head 324 can operate similarly to the force prediction head 224 to generate per-atom force vectors (e.g., force predictions 179). In some implementations, the predictions generated using the energy prediction head 322 and the force prediction head 324 can be used in connection with the uncertainty score determination operations 326 to calculate uncertainty scores (e.g., uncertainty scores 180) on a per-atom basis, as described herein. The machine-learning model 300 of FIG. 3 and the machine-learning model 200 of FIG. 1 can be implemented as the machine-learning model 160 of FIG. 1, or any other machine-learning model described herein.

Referring back to FIG. 1, the data processing system 105 can implement the machine learning model 160 together with fragment selection and refinement operations to automatically generate accurate classifications for molecular structures 170 and/or fragments 182 that would otherwise require computationally intensive techniques. As described herein, the data processing system 105 can identify subsets of atoms 172 that correspond to regions where prediction error is likely, and can selectively route fragments 182 of those regions for refinement by quantum computing systems 132 or classical computing systems 130. Refined simulation results 194 paired with input fragments 192 can be stored in the training dataset 190 and supplied to the model updater 155 to apply transfer learning updates. By repeatedly incorporating targeted results into the training dataset 190, the machine learning model 160 can be adaptively improved to classify molecular environments that were previously difficult to predict, thereby reducing reliance on resource-intensive electronic structure calculations. An example overview of the refinement process for the machine-learning model 160 is described in connection with FIG. 4.

Figure 4:
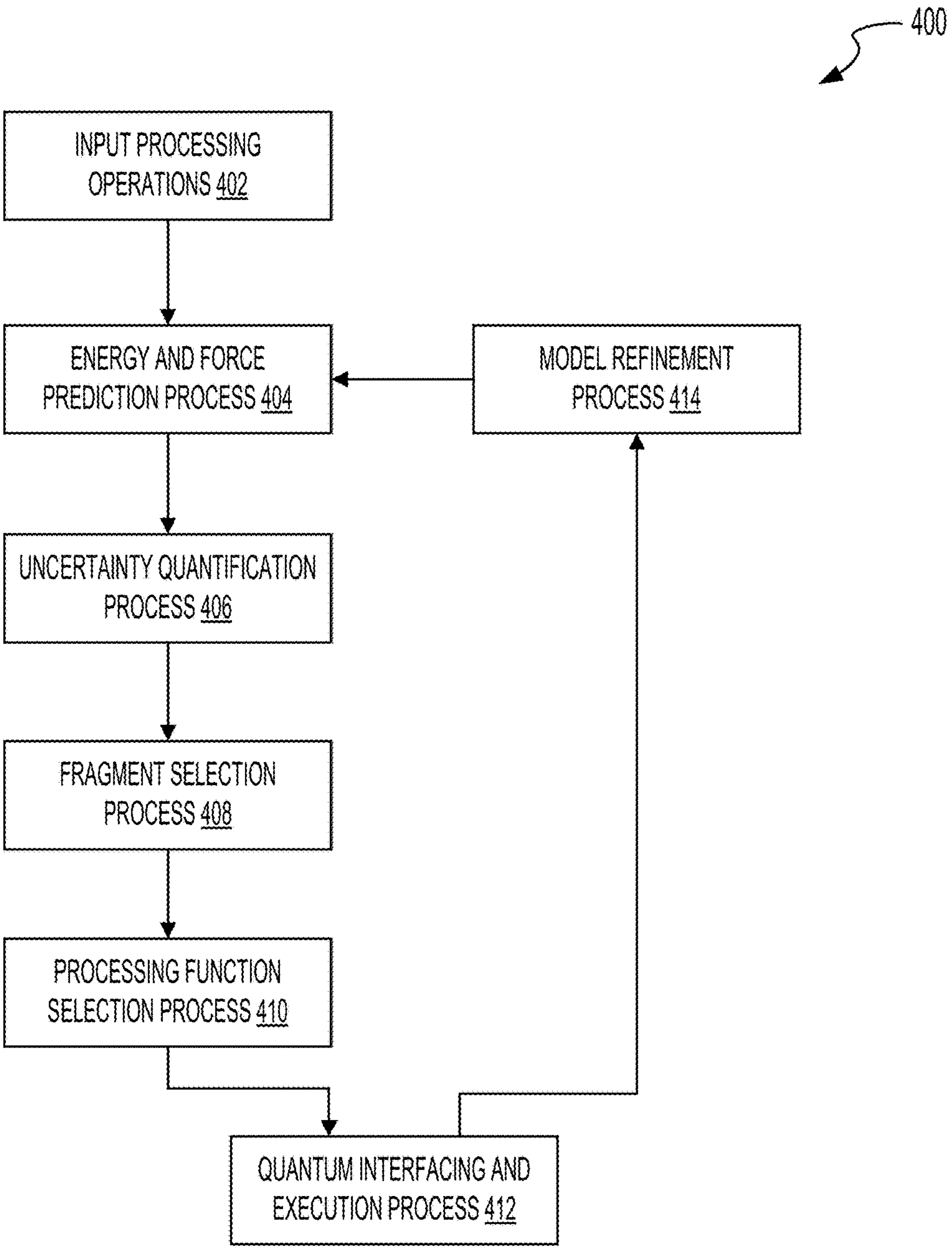
FIG. 4 illustrates a flow chart of an example process for updating a machine learning model using data derived from quantum computing operations, in accordance with one or more implementations.

Referring now to FIG. 4, illustrated is a method 400 of updating a machine learning model using data derived from quantum computing operations. Although the following description of the process 400 is described as being performed by the data processing system (e.g., the data processing system 105), it should be understood that the process 400 may be performed by any one of the components of the data processing system 105, including but not limited to the model executor 145. In brief overview of the method 400, the method 400 can include performing input processing operations (ACT 402), executing an energy and force prediction process (ACT 404), performing an uncertainty quantification process (ACT 406), executing a fragment selection process (ACT 408), performing a processing function selection process (ACT 410), executing a quantum interfacing and execution process (ACT 412), and performing a model refinement process (ACT 414).

The method 400, at ACT 402, can include performing input processing operations. To do so, any of the operations of the molecule obtainer 135 and/or the data structure generator 140 of FIG. 1 can be performed. In some implementations, ACT 402 may include performing any of the operations of the process 500 of FIG. 5 or the process 600 of FIG. 6. As part of performing input processing operations, the data processing system can obtain a three-dimensional molecular structure and encode its atomic identities, spatial coordinates, and bonding information into an in-memory representation. The data processing system can parse the provided structure file format such as XYZ, PDB, or MOL2 and extract atomic descriptors including charges and spin multiplicities. The data processing system can then map these extracted descriptors into arrays or tensors that are accessible for subsequent conversion into a graph data structure (e.g., a graph data structure 175), as described in connection with FIGS. 1-3.

The method 400, at ACT 404, can include executing an energy and force prediction process. To do so, any of the operations of the model executor 145 of FIG. 1 can be performed. In some implementations, ACT 404 can include performing any of the operations described in connection with FIGS. 11-13 can be performed. As part of executing the energy and force prediction process, the data processing system can provide the graph data structure representing the molecular structure as input to a graph neural network model (e.g., the machine-learning model 160). The data processing system can propagate node and edge features through successive message passing iterations to generate refined node embeddings, as described in connection with FIGS. 2 and 3. The data processing system can map each embedding to scalar energy contributions and vector force values, which are indexed per atom and retained in memory for downstream processing, as described in connection with FIGS. 1-3.

The method 400, at ACT 406, can include performing an uncertainty quantification process. To do so, any of the operations of the model executor 145 of FIG. 1 can be performed. In some implementations, ACT 406 can include performing any of the operations described in connection with FIG. 11 can be performed. As part of performing the uncertainty quantification process, the data processing system can re-execute the graph neural network model under parameter dropout conditions to obtain ensembles of predictions for each atom for the molecular structure. The data processing system can calculate the variance across these predictions to determine stability metrics. The data processing system can additionally compute gradient sensitivity scores representing the magnitude of output changes with respect to parameter perturbations. The data processing system can combine ensemble variance, gradient measures, and embedding distance to training data into a normalized uncertainty score that is stored in association with each atom's prediction. Further details of the uncertainty calculation process are described in connection with the model executor 145 of FIG. 1 and the method 1100 of FIG. 11.

The method 400, at ACT 408, can include executing a fragment selection process. To do so, any of the operations of the model executor 145 and/or the processing allocator 150 of FIG. 1 can be performed. In some implementations, ACT 408 can include performing any of the operations described in connection with FIG. 12. As part of executing the fragment selection process, the data processing system can cluster atoms into groups (e.g., fragments 182) based on both spatial proximity of coordinates and similarity of uncertainty scores. The data processing system can implement k-means clustering in a joint space defined by positional and uncertainty vectors or apply radius-based grouping thresholds to aggregate atoms into contiguous fragments, as described in further detail herein. Once clustering is complete, the data processing system can assign each fragment an average uncertainty score (e.g., an uncertainty score 184) computed by combining the atomic-level values, as described in further detail herein.

The method 400, at ACT 410, can include performing a processing function selection process. To do so, any of the operations of the processing allocator 150 of FIG. 1 can be performed. In some implementations, ACT 410 can include performing any of the operations described in connection with FIGS. 9-10. As part of performing the processing function selection process, the data processing system can compare each fragment's average uncertainty score against one or more predetermined thresholds. If a fragment exceeds a quantum threshold, the data processing system can select a quantum simulation method such as VQE or quantum phase estimation. If a fragment falls between thresholds, the data processing system can select a classical high-accuracy solver such as coupled cluster singles and doubles, and if below a lower threshold, the data processing system can assign machine learning outputs as sufficient predictions. In some implementations, a hybrid quantum-classical simulation approach may be used.

The method 400, at ACT 412, can include executing a quantum interfacing and execution process. To do so, any of the operations of the processing allocator 150 of FIG. 1 can be performed. In some implementations, ACT 412 can include performing any of the operations described in connection with FIGS. 9-10. In one example, the data processing system can generate a fragment Hamiltonian that encodes electron kinetic energy, electron-nuclear attraction, and electron-electron repulsion terms. Furthering this example, the data processing system can compile the Hamiltonian into Pauli operator form, map orbitals to qubit registers, and construct a parameterized circuit compatible with available quantum processor topology. The data processing system can transmit the compiled circuit to a quantum computing environment (e.g., a quantum system 132 of the distributed computing environment 120) for execution and receive measured expectation values that are post-processed into fragment energies and atomic force vectors (e.g., simulation results 194), as described herein.

The method 400, at ACT 414, can include performing a model refinement process. To do so, any of the operations of the model updater 155 of FIG. 1 can be performed. In some implementations, ACT 414 can include performing any of the operations described in connection with FIGS. 7-8. As part of performing the model refinement process, the data processing system can create records associating input fragments (e.g., input fragments 192) identified as having uncertainty values that exceed a predetermined threshold with corresponding simulation outputs (e.g., simulation results 194)generated at ACT 412 and stored them as a training example in a training dataset (e.g., a training dataset 190). The data processing system can execute transfer learning updates by fine-tuning the graph neural network model using the training dataset, as described in connection with FIGS. 1, 7, and 8. The data processing system can apply back-propagation using loss functions comparing predicted and simulation-derived forces and energies to adjust the model parameters for improved accuracy on previously high-uncertainty fragments. The updated machine-learning model can then be used in subsequent prediction operations (e.g., in connection with ACT 404).

Referring back to FIG. 1, and to the operations of the data processing system 105, the data processing system 105 can execute the molecule manager 135 can obtain a three-dimensional molecular structure 170 that includes atoms 172. The molecular manager 135 can include software, hardware, or combinations thereof. The molecular structure 170 can be obtained from external repositories that provide molecular modeling data (e.g., crystallographic databases, chemical data libraries, computational chemistry datasets, etc.). In some implementations, the molecular structure 170 can be supplied through one or more application programming interfaces (APIs) exposed by external computing systems that provide simulation-ready conformers and chemical property records. For example, the molecule manager 135 can receive API responses containing data expressed in formats such as XYZ, PDB, or MOL2, and convert the received information into an internal representation suitable for use by downstream processes involving the data structure generator 140. In some implementations, the molecular structure 170 can be obtained from experimental instruments, such as X-ray diffraction systems or nuclear magnetic resonance spectrometers, that provide structure files which can be accessed by the molecule manager 135.

The molecule manager 135 can in some implementations obtain the molecular structure 170 from computational processes executed on one or more external devices. For example, the molecular structure 170 can be acquired by running a prior density functional theory pipeline on a classical system, or a multi-reference simulation on a quantum system, and querying those results through API calls. In some implementations, the molecular structure 170 can be acquired from operator-provided input, in which an operator transmits digital structure files to the data processing system 105 for ingestion by the molecule manager 135. In yet other implementations, the molecular structure 170 can be generated internally through a structure generation or sampling routine executed locally, such as by initiating stochastic searches of torsional angles or normal mode sampling, and subsequently supplying candidate conformers to the molecule manager 135. In some implementations, obtaining the molecular structure 170 can involve generating conformers using a conformer generation process such as that described in connection with FIG. 5.

Figure 5:
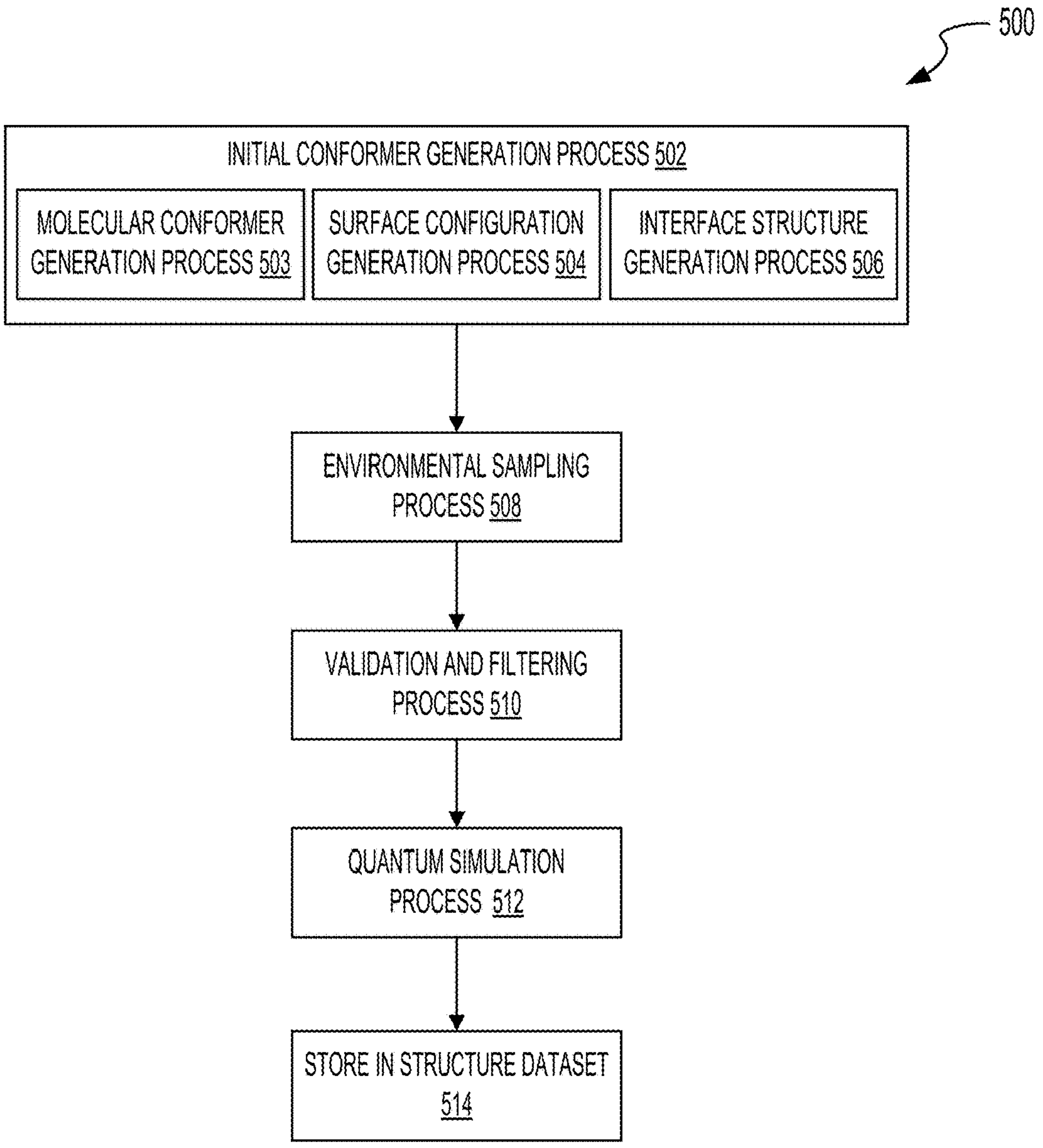
FIG. 5 illustrates a flow chart of a process for generating and validating molecular structures for quantum simulation and dataset generation, in accordance with one or more implementations.

Referring now to FIG. 5, illustrated is a process 500 of generating and validating molecular structures for quantum simulation and dataset generation. Although the following description of the process 500 is described as being performed by the data processing system (e.g., the data processing system 105), it should be understood that the process 500 may be performed by any one of the components of the data processing system 105, including but not limited to the molecule obtainer 135. The process 500 may be performed, for example, by the molecule obtainer 135 of FIG. 1 and/or the data processing system 105. In brief overview of the process 500, the process 500 can include performing an initial conformer generation process (ACT 502), performing an environmental sampling process (ACT 508), performing a validation and filtering process (ACT 510), performing a quantum simulation process (ACT 512), and storing results in a structure dataset (ACT 514).

The process 500, at ACT 502, can include performing an initial conformer generation process. The initial conformer generation process can include a molecular conformer generation process 503, a surface configuration generation process 504, and an interface structure generation process 506. As part of the initial conformer generation process 502, the data processing system can receive an input three-dimensional structure that serves as a starting point for conformer generation. In some implementations, the input structure can represent a molecule, a catalyst surface, or a molecule-surface interface. For example, the data processing system can access/obtain crystallographic coordinates of a catalyst slab, a molecular intermediate obtained during reaction exploration (e.g., a candidate conformer for a reaction between two or more reactants), and/or a reactant identified from prior simulation output. In some implementations, the data processing system can classify the received input structure into a molecular category, a surface category, or an interface category. For example, the data processing system can assign a standalone organic molecule to the molecular category, assign an adsorption site on a metallic slab to the surface category, and assign an adsorbed molecular species interacting with a lattice to the interface category. The selected classification determines which downstream procedural path within the initial conformer generation process 502 is applied to generate candidate conformer structures from the provided input geometry.

As part of the molecular conformer generation process 503, the data processing system can generate candidate conformers by applying vibrational, dynamical, and coordinate scanning operations to an initial molecular structure. In some implementations, the data processing system can execute a normal mode sampling operation in which vibrational modes of the molecule are computed. In one example, the vibrational modes of the molecule can be computed from a Hessian matrix of second derivatives and atoms, which can be displaced along the eigenvectors of the modes according to energy-weighted amplitudes. Furthering this example, the data processing system can displace atomic positions of the initial conformer along individual mode vectors and/or linear combinations of coupled mode vectors, and can apply anharmonicity corrections by scaling displacements according to higher-order terms in the potential expansion to generate candidate conformers representing low-energy distortions of the equilibrium geometry of the initial molecular structure.

In some implementations, the data processing system can apply molecular dynamics simulations in which Newtonian equations of motion are implemented at defined time steps to generate atomic trajectories within a defined ensemble. For example, the data processing system can implement temperature-replica exchange by propagating multiple trajectories at different temperatures and periodically attempting swaps between ensembles, and/or can apply metadynamics by depositing history-dependent biasing potentials along selected collective variables, followed by capturing trajectory snapshots at interval steps to generate conformer candidates characterized by torsional changes or reactive displacements. In some implementations, the data processing system can apply a reaction coordinate scanning process by incrementally adjusting one or more internal coordinates such as bond lengths, bond angles, or torsional orientations while performing local optimizations of remaining degrees of freedom in order to generate structural candidates near bond rearrangements or transition states. The results of such operations (e.g., the various candidate conformers generated) can be provided for processing in connection with the environmental sampling process 508.

As part of the surface configuration generation process 504, the data processing system can generate candidate structures by generating and/or modifying atomic arrangements corresponding to a crystalline lattice surface. In some implementations, the data processing system can perform a surface layer selection operation by identifying crystallographic indices specifying a facet orientation from a periodic cell and truncating a fixed number of top atomic layers, followed by cleaving terminations that represent distinct break conditions. For example, the data processing system can generate a slab representation by truncating a (111), (100), or (110) facet of a metallic lattice and selecting two or more atomic layers of depth to form a periodic surface for subsequent processing. In some implementations, the data processing system can apply an adsorption site mapping operation by identifying symmetry-unique coordinates on the selected facet using space group operations and assigning each site type, such as top, bridge, or hollow coordination, for further trial placements.

For example, the data processing system can insert adsorbate coordinates at identified lattice points, run geometry optimization to relax local structures, and retain binding arrangements that converge below an energy threshold. In some implementations, the data processing system can apply reconstruction processes by introducing explicit perturbations such as removing atoms to create vacancies, laterally shifting rows of atoms to introduce step edges, and/or displacing atomic clusters to approximate reconstructions under strain. For example, the data processing system can delete selected surface atoms to generate vacancy clusters and relax the lattice or shift close-packed rows to generate a stepped geometry variant. The results of such operations (e.g., the various candidate conformers generated) can be provided for processing in connection with the environmental sampling process 508.

As part of the interface structure generation process 506, the data processing system can generate molecule-surface interface geometries by constructing binding interaction states, orientational variants, and/or molecular coverage patterns. In some implementations, the data processing system can apply binding site analysis by matching functional group coordinates of a molecular structure to candidate adsorption site coordinates of the surface lattice and aligning orbitals according to predefined orientation rules. For example, the data processing system can place a donor group such as an amino functionality directly above a metal lattice site defined as an electron-accepting coordinate and maintain bond length constraints during orientation adjustments. In some implementations, the data processing system can implement an orientation sampling process by subjecting the coordinate frame of the input molecular structure to systematic rotational matrices and/or translational vectors relative to the surface cell and retaining orientations minimized according to energy thresholds. For example, the data processing system can rotate a planar organic molecule about multiple orthogonal axes above a metal facet and retain positions that converge to lower potential energies without significant overlap among van der Waals radii of surface atoms.

The process 500, at ACT 508, can include performing an environmental sampling process. The environmental sampling process can involve simulating the effects of solvents, temperatures, and/or pressure conditions. As part of simulating environmental conditions on the molecular structures generated at ACT 502 (and/or via operations 503, 504, or 506), the data processing system can generate solvent effects by surrounding a candidate molecular structure with explicit solvent molecules such as a layered water shell arranged around a biomolecule, or by applying implicit solvation models in which the environment is represented as a dielectric field. In some implementations, the data processing system can add structured solvent layers such as interfacial water aligned along a catalyst surface to simulate adsorption equilibria. The data processing system can further apply thermal perturbations by distorting atomic coordinates to mimic vibrational populations associated with thermal expansion or by introducing temperature-dependent reconstructions in crystalline slab surfaces. For example, the data processing system can vary atomic positions according to phonon displacement distributions (e.g., stored in configurations, randomly generated via simulations and/or random number generators, etc.), and/or can shift atomic rows in a surface lattice to model reconstructions observable at elevated temperatures. In some implementations, the data processing system can also simulate varying pressure conditions by altering interatomic distances to represent stress applied on a slab geometry and/or by varying adsorbate chemical potentials to correspond to different reaction environments. For example, the data processing system can modulate lattice constants of a surface unit cell to represent compression, and/or can simulate different equilibrium states along a phase diagram (e.g., selected from configuration memory according to the input molecular structure) by applying pressure-dependent sampling of atomic arrangements. This process can be repeated for any number of sampled molecular structures and for any number or combination of temperature, solvent, or pressure conditions (e.g., specified via configuration settings, input via requests, etc.).

The process 500, at ACT 510, can include performing a validation and filtering process. In doing so, the data processing system can assess whether generated conformers, configurations, and/or interfaces generated via ACTs 502-508 are chemically and physically plausible. As part of this operation, the data processing system can execute geometry validation to identify structural anomalies that violate standard bonding or spatial rules. In some implementations, the data processing system can detect unrealistic conformations such as overlapping atomic positions, non-permissible bond orders, or valence states inconsistent with the atomic type. For example, the data processing system can reject a structure in which two atoms occupy coordinates below a minimum van der Waals separation, identify and remove conformers containing atoms with excess coordination numbers not chemically permissible, and/or discard any conformers exhibiting non-physical chiral inversions. In some implementations, the data processing system can additionally enforce physical constraints by verifying conformance to atomic charge distributions, spin states, and/or coordination requirements relative to accepted chemical models. To do so, the data processing system can compare the attributes of the corresponding atoms of the molecular structures against one or more thresholds for each attribute (e.g., charge distribution, spin states, coordination requirements) and discard any conformers that fail to satisfy the corresponding thresholds.

The process 500, at ACT 512, can include performing a quantum simulation process. The quantum simulation process can be used to calculate the potential energy and force characteristics of each of the molecular structures (e.g., conformers) that were validated at ACT 510. The resulting values may be stored as part of a training dataset (e.g., the training dataset 190). In some implementations, the process 500 is executed to obtain variations of an input chemical structure without generating a training dataset from every conformer (e.g., during execution of the operations of FIG. 4, during selective fine-tuning of the machine-learning model 160, etc.), the data processing system may terminate execution of the process 500 following the validation and filtering process 510, rather than using quantum approaches (and/or hybrid approaches) to calculate per-atom potential energy and force vectors for each conformer. In some implementations, the quantum simulation process may include or involve the use of classical computing systems (e.g., to execute hybrid quantum-classical simulation operations).

To implement the quantum simulation process, the data processing system can apply selected ab initio or quantum algorithms (e.g., by instructing/controlling one or more quantum systems 132, etc.) to candidate conformers, surface structures, and/or interface geometries. In some implementations, the data processing system can use the quantum simulation process to execute (e.g., via a quantum system 132) a VQE on a fragment Hamiltonian to obtain ground state energy and gradient values. For example, the data processing system can use the quantum simulation process to perform quantum phase estimation for small fragments where qubit counts allow, and/or to apply error-mitigated algorithms such as zero-noise extrapolation or symmetry-based post-selection. In some implementations, the data processing system can use the quantum simulation process to generate force vectors and energy values at the quantum level of theory that serve as reference data for validating machine learning predictions and refining model weights in subsequent active learning loops.

As part of implementing such operations, the data processing system can identify a set of candidate conformers or fragments that have been validated for chemical plausibility at ACT 510, and can assign selection priorities to those conformers or fragments based on their chemical relevance, the diversity of configurations sampled, and resource cost estimates required for simulation. The data processing system can generate prioritization values by assigning numerical weights to chemical relevance attributes such as the presence of transition-metal centers, strained bonds, or multi-reference indicators. In some implementations, the data processing system can calculate diversity scores by measuring structural dissimilarity metrics across candidate conformers, such as computing root-mean-square deviations of atomic coordinates and/or comparing fragment connectivity graphs. For example, the data processing system can compare a transition-state conformer with a solvated intermediate conformer by evaluating their relative positioning in an embedding space and assigning higher diversity values to pairs with greater dissimilarity. In some implementations, the data processing system can determine resource cost estimates by evaluating expected qubit availability for quantum computing systems and memory/processing capacity for corresponding classical computing systems (e.g., obtained via communications with a distributed computing environment 120, etc.), and estimated runtime associated with selected solvers or quantum algorithms. For example, the data processing system can assign a lower priority to a conformer predicted to exceed available qubits under a quantum phase estimation algorithm while assigning a higher priority to a conformer predicted to be compatible with a VQE approach.

The data processing system can group conformers into batches and generate/update a quantum calculation queue, which can be scheduled for execution across one or more quantum systems. As part of generating the quantum calculation queue, the data processing system can classify prioritized conformers according to chemical heuristics, structural diversity scores, and resource requirements. In some implementations, the data processing system can apply batching rules that group conformers with similar qubit demands or Hamiltonian sizes to optimize allocation of quantum resources. For example, the data processing system can aggregate a set of small fragments (e.g., derived from generated molecular structures/conformers) requiring fewer than a defined number of qubits into a batch that is dispatched together, while separating larger fragments into dedicated queue entries. In some implementations, the data processing system can assign queue ordering by assigning weighted priority values that reflect chemical relevance indicators such as transition-state likelihood or strained bond characteristics. For example, a conformer exhibiting stretched metal-ligand bonds can be placed at a higher position in the queue than conformers representing stabilized reactants. The data processing system can further annotate each batch entry with metadata such as the selected quantum algorithm, expected circuit depth, and estimated execution duration to facilitate downstream scheduling across the quantum systems.

In some implementations, the data processing system can perform batch scheduling decisions such that high-priority candidates are routed for execution first on quantum systems 132. For example, conformers or fragments that exhibit transition-state characteristics, stretched bonds, or multi-reference indicators can be placed at the head of the quantum calculation queue, and can be executed using VQE, quantum phase estimation, or complete active space self-consistent field routines, depending on the number of qubits and circuit depth permitted by the available quantum hardware. The data processing system can generate evaluation metadata for each job in the quantum calculation queue that specifies an assigned priority level, a targeted algorithm (e.g., VQE, quantum phase estimation, complete active space self-consistent field, etc.), and an estimated resource usage value. In one example, a group of five conformer fragments can be bundled as a high-priority batch after diversity scoring and chemical heuristic checks, and can be dispatched to the quantum execution layer of the distributed computing environment 120 to generate reference energy values and force vectors.

The process 500, at ACT 514, can include storing results in a structure dataset (e.g., as part of the molecular data 170, as part of the training dataset 190, etc.). The data processing system can use the structure dataset to store quantum and/or classical simulation results associated with molecular conformers, surface structures, and/or interface geometries. For example, the data processing system can use the structure dataset to maintain individual records that link fragment and/or molecule identifiers with simulation results (e.g., energy values and per-atom force vectors), which may be used during training operations for one or more machine-learning models, as described herein. In some implementations, as part of storing the results in the structure dataset, the data processing system may perform dataset update operations similar to those described in connection with FIG. 6.

Figure 6:
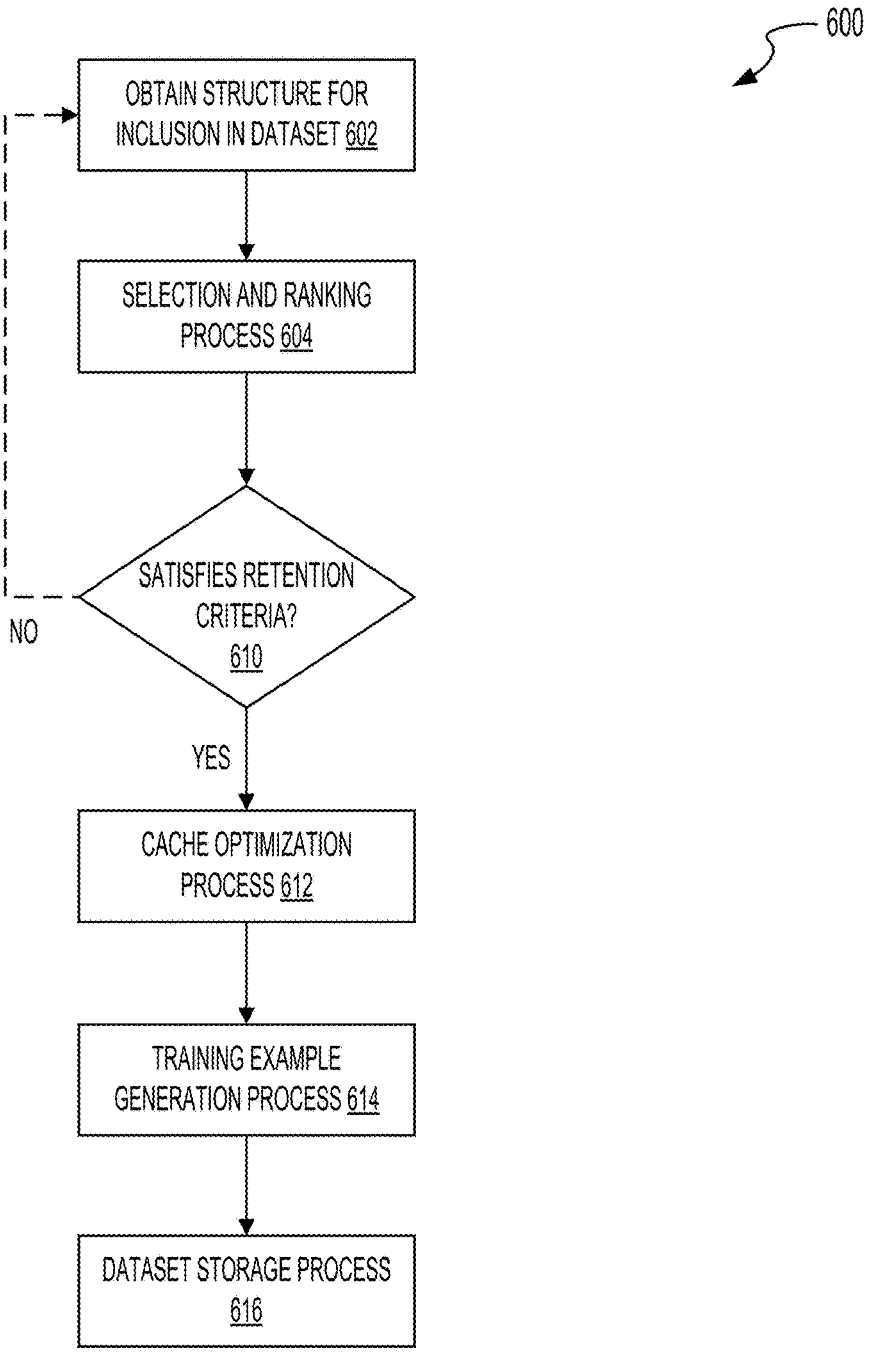
FIG. 6 illustrates a flow chart of an example process for generating and storing training examples in a dataset, in accordance with one or more implementations.

Referring now to FIG. 6, illustrated is a process 600 of generating and storing training examples in a dataset. Although the following description of the process 600 is described as being performed by the data processing system (e.g., the data processing system 105), it should be understood that the process 600 may be performed by any one of the components of the data processing system 105, including but not limited to the model executor 145. In brief overview of the method 600, the process 600 can include obtaining a structure for inclusion in a dataset (ACT 602), performing a selection and ranking process (ACT 604), determining whether the structure satisfies retention criteria (ACT 610), executing a cache optimization process (ACT 612), performing a training example generation process (ACT 614), and executing a dataset storage process (ACT 616).

The process 600, at ACT 602, can include obtaining a structure (e.g., a fragment 182 and/or a molecular structure 170 generated via the operations of FIG. 5, obtained via molecule obtainer 135, etc.) for inclusion in a dataset (e.g., the training dataset 190). The data processing system can obtain the molecular structure via any suitable process. In some implementations, the data processing system can receive the structure via an API (e.g., a request transmitted to the data processing system to include a structure in the dataset). In some implementations, the data processing system can obtain the structure via inter-process communication (e.g., from another process executing on the data processing system or computing system in communication with the data processing system). In some implementations, the data processing system can receive operator input specifying a structure (e.g., specifying a file type such as XYZ, PDB, MOL2, etc.) and can parse the received file to extract atom identity data, coordinate data, and/or metadata such as charge states or spin multiplicities.

In some implementations, the data processing system can retrieve the structure from a molecular database accessible to the data processing system. For example, the data processing system can issue a query specifying identifying metadata such as a compound identifier or reaction stage to a remote repository and receive stored conformer data that includes atomic connectivity records and position tensors. In other implementations, the data processing system can generate the structure internally by executing a conformer generation process such as process 500 of FIG. 5, and use the result as an obtained structure in connection with the operations with the process 600. For example, the data processing system can execute the conformer generation process to output a candidate geometry and automatically assign it as input to the dataset generation pipeline. In some implementations, the data processing system can combine multiple sources of input by merging retrieved conformers and operator-specified conformers into a common intermediate representation before inclusion in the dataset.

The process 600, at ACT 604, can include performing a selection and ranking process. As part of performing the selection and ranking process at ACT 604, the data processing system can compare structural descriptors of candidate fragments generated from one or more molecular structures obtained in ACT 602 against other candidate fragments and/or molecular structures obtained in ACT 602. In some implementations, the data processing system can generate fragments each candidate molecular structure obtained in ACT 602 using any suitable process, which may involve performing clustering operations described in connection with the model executor 135 of FIG. 1. In some implementations, the data processing system can operate on entire molecular structures in place of fragments during the selection and ranking process of ACT 604 and other operations of the process 600.

In some implementations, the data processing system can generate embedding vectors for each candidate fragment or molecular structure using feature extraction methods and/or one or more layers of a machine-learning model (e.g., input layers of the machine-learning model 160, the machine-learning model 200, the machine-learning model 300, etc.) that incorporate atom identity features, interatomic distance histograms, and/or angular descriptors. To calculate similarity values, the data processing system can calculate a pairwise Euclidean distance or cosine distance between the embedding of each candidate fragment or molecular structure and the embeddings of the other candidate fragments or molecular structures obtained in ACT 602, and can assign ranking scores according to the respective dissimilarity values. In some implementations, the data processing system can retain only the top-K candidate fragments or molecular structures associated with the largest dissimilarity values and discard fragments or molecular structures whose structural descriptors fall within a defined similarity threshold relative to those already retained.

In some implementations, the data processing system can iteratively traverse the set of candidate fragments and/or molecular structures obtained in ACT 602 and assign each candidate entry a uniqueness score relative to the other candidate entries under evaluation. The data processing system can apply clustering operations that group fragments or molecular structures with similarity scores below a defined threshold and designate a representative candidate from each group as the entry with the lowest average uncertainty score or the highest diversity metric. For example, the data processing system can calculate embedding distances for each candidate, identify clusters with near-duplicate coordinates or bonding environments, and retain only one (or top K) representative fragment or molecular structure from each such cluster.

The process 600, at ACT 610, can include determining whether the structure satisfies retention criteria. In doing so, the data processing system can compare one or more structural descriptors of the obtained structure against corresponding descriptors of entries maintained in an existing dataset. In some implementations, the data processing system can use atom-level features such as element type, spatial coordinates, bond connectivity, and environment embeddings to generate a structural descriptor (e.g., embedding) that uniquely characterizes the candidate structure, using the techniques described herein. The data processing system can calculate similarity metrics such as cosine similarity or Euclidean distance between that embeddings and vectors corresponding to previously retained entries in the dataset (e.g., the training dataset 190). If the similarity exceeds a predefined threshold, the data processing system can determine that the candidate structure has already been represented in the dataset and exclude the candidate structure from further processing. In doing so, the data processing system can restrict the fragment from storage in the training dataset in response to determining that the fragment is chemically equivalent to another fragment stored in the training dataset. In some implementations, if the entirety of a molecular structure is similar to another entry in the dataset, the process 600 can return to ACT 602 to obtain further structures for inclusion in the dataset. If the similarity does not exceed the threshold, the data processing system can proceed to ACT 612.

The process 600, at ACT 612, can include executing a cache optimization process. To do so, the data processing system can generate a structural descriptor for each candidate fragment obtained from the selection and ranking process at ACT 604. The data processing system can compare the structural descriptor (e.g., embedding) of the candidate fragment against one or more descriptors maintained in a cache that indexes previously processed fragments. In some implementations, the data processing system can compute a feature embedding for the candidate fragment based on atom identity, connectivity, interatomic distance distributions, and/or angular descriptors, and use this embedding as the structural descriptor for cache comparison. For example, if the data processing system determines that an embedding for a candidate fragment falls within a defined similarity threshold of an embedding already in the cache, the candidate fragment can be classified as redundant and excluded from duplicate simulation. In some implementations, the data processing system can directly retrieve associated energy and force values for a matching cached fragment and forward those values into the downstream training example generation process at ACT 614 without rerunning a quantum or classical simulation. For example, when two fragments generated from a larger molecular structure have identical atom types, coordinates, and bonding arrangements, the data processing system can detect that identity during the cache optimization process at ACT 612, access the cached simulation result, and bypass re-computation. The cache optimization process at ACT 612 can therefore reduce repetitive computation by storing fragment/molecule identifiers with corresponding simulation outputs and reusing those outputs when duplicate or near-duplicate fragments are detected.

The process 600, at ACT 614, can include performing a training example generation process. As part of performing the training example generation process, the data processing system can obtain an identified fragment or molecular structure and initiate a simulation procedure to generate ground-truth reference values. In some implementations, the simulation procedure can involve executing a quantum approach, a classical high-accuracy approach, or a hybrid quantum-classical approach, as described herein. The data processing system can receive resulting values for the identified fragment or molecular structure, including a total energy value and/or one or more per-atom force vector values. For example, the data processing system can receive from the simulation a per-atom potential energy expressed in electron volts and a set of three-component Cartesian force vectors for each atom included in the fragment. The data processing system can construct a training record by associating the atomic coordinates and atom types of the fragment/molecular structure with the corresponding energy value and force vectors, together with any relevant metadata values indicating simulation parameters.

The process 600, at ACT 616, can include executing a dataset storage process. As part of the dataset storage process, the data processing system can assign each training example generated at ACT 614 a record entry that includes atomic coordinates, atom types, and connectivity information received from the fragment or molecular structure input, together with energy values and force vectors generated during the training example generation process. In some implementations, the data processing system can store such record entries within a designated training dataset by writing the values into a structured container such as a serialized tensor array or hierarchical data format file that indexes each record by a unique identifier.

The data structure generator 140 can execute to generate the graph data structure 175 representative of the molecular structure 170. The data structure generator 140 can include software, hardware, or combinations thereof. The data structure generator 140 can transform the molecular structure 170 into the graph data structure 175 by converting the spatial and identity information associated with the atoms 172 into a machine-readable representation suitable for graph-based operations. In one example, the data structure generator 140 can receive the molecular structure 170 in any suitable formats (e.g., data structures, files such as XYZ, PDB, or MOL2, etc.) and convert the atomic positions and any associated metadata fields into contiguous arrays, tensors, vectors, and/or data structures that can be indexed.

In some implementations, the data structure generator 140 can construct adjacency data from the molecular structure 170 by applying distance cutoffs or using explicit connectivity fields when available. For example, the data structure generator 140 can parse a molecular structure 170, extract coordinate tensors for each atom 172, and generate an adjacency list of neighbors using either bond records included in the file or distance thresholds in cases where connectivity data is incomplete. In some implementations, an edge in the graph data structure 175 can be defined to connect two nodes whenever the corresponding atoms 172 share a recorded chemical bond or fall within a defined neighborhood distance cutoff. For example, the data structure generator 140 can assign an edge between two atoms 172 when the bond order is specified as single, double, triple, or aromatic, or when the atoms 172 are separated by less than a defined Euclidean distance in three-dimensional space. In some implementations, values describing environmental conditions such as charge state or boundary type included in the molecular structure 170 can be mapped into auxiliary fields (e.g., node data structure values, etc.) of the graph data structure 175 to permit downstream processing.

The data structure generator 140 can output the graph data structure 175 in one or more internal encodings such as adjacency matrices, edge lists, or serialized tensor formats. In some implementations, the data structure generator 140 can encode the molecular structure 170 into a hierarchical container in which primary indices identify atoms 172 and secondary indices define edges between atoms 172 derived during the conversion process. In one example, the data structure generator 140 can write adjacency information into a compressed sparse row matrix while storing coordinate arrays into a dense tensor, and/or record indexing metadata that preserves correspondence with the molecular structure 170. In some implementations, the data structure generator 140 can serialize the graph data structure 175 into formats such as JSON, HDF5, or a tensor-based format to be accessed by the machine learning model 160 during execution. For example, the data structure generator 140 can output a data structure including node feature arrays for atoms 172, edge indices representing connectivity, and metadata descriptors derived from the molecular structure 170, which can be used by the model executor 145 for generation of predictions.

To process a graph data structure 170, the data processing system 105 execute the model executor 145 to execute the machine learning model 160 to generate, for each atom 172, an energy prediction 177 and a force vector prediction 179. The model executor 145 can include software, hardware, or combinations thereof. To do so, the model executor 145 can access and provide the graph data structure 175 for a corresponding molecular structure 170 as input to the machine-learning model 160 and propagate atomic and bonding descriptors through successive operations of the machine learning model 160. In some implementations, the model executor 145 can apply message passing operations across nodes of the graph data structure 175 until each atom 172 is associated with a refined latent representation that encodes local and non-local environmental information, as described in connection with FIGS. 2 and 3. For example, the model executor 145 can apply one or more iterative propagation steps in which data from neighboring atoms is aggregated, updated, and reassigned to the atom 172 in order to incorporate influences from both directly bonded and spatially proximate atoms. The resulting latent representation can be passed through an energy prediction head (e.g., energy prediction head 222, energy prediction head 322, etc.) that maps the refined per-atom feature vector to a scalar energy contribution, which can be stored as the energy prediction 177 for each atom 172.

The model executor 145 can further (e.g., concurrently, via a separate head, etc.) generate directional outputs representing the force vector prediction 179 for each atom 172 based on the same or similar latent representations. In some implementations, the model executor 145 can apply an operation that constrains the output to be consistent with rotational properties of the molecular structure 170 by deriving force vectors as gradients of the predicted energy surface with respect to atomic positions. For example, the model executor 145 can perform an automatic differentiation step in which the change in predicted energy contributions relative to infinitesimal displacements of the three-dimensional coordinates of each atom 172 is calculated, yielding three-component force values (Fx, Fy, Fz). The resulting force vector prediction 179 for each atom 172 can be stored in association with the corresponding atom identifier in the storage 115.

The model executor 145 can use the generated energy prediction 177 and the generated force vector prediction 179 for each atom 172 to calculate an uncertainty score 180 for each atom 172. In some implementations, the model executor 145 can apply ensemble prediction variance to determine the stability of per-atom predictions under repeated perturbations of the graph neural network of the machine learning model 160. In some implementations, the model executor 145 can generate the uncertainty score 180 by applying parameter dropout to the machine-learning model 160 and iteratively generating energy predictions 177 and force predictions 179 using the same input molecular structure 170. For example, the model executor 145 can execute multiple forward passes of the same molecular graph while randomly applying parameter dropout to a subset of the learned weights during each pass, such as by setting a defined percentage of weights to zero to perturb the parameterization. In some implementations, the model executor 145 can maintain an ensemble of separately trained graph neural networks initialized with different random seeds or trained with different subsets of a dataset, and execute each model to obtain per-atom energy contributions and per-atom force vectors. The model executor 145 can then determine a variance measure for each atom 172 by comparing the distributions of predicted scalar energy contributions or the distributions of the directional components of predicted force vectors across the passes or models, where larger variance corresponds to higher uncertainty in the prediction.

In some implementations, the model executor 145 can calculate a gradient-based sensitivity score that quantifies how sensitive predictions for an atom 172 are to perturbations in the parameters of the graph neural network of the machine learning model 160. In some implementations, the model executor 145 can generate the uncertainty score 180 by calculating a gradient of a predicted value with respect to one or more parameters of the machine learning model 160 and determining a magnitude of the gradient. For example, the model executor 145 can freeze the trained weights of the machine learning model 160 and execute a single forward pass of a molecular graph to generate total predicted energy and per-atom forces, then apply automatic differentiation to compute parameter gradients with respect to the energy prediction 177 or the force vector prediction 179. The model executor 145 can identify the gradient values that correspond to each atom 172 and calculate a scalar magnitude, such as the L2 norm, across those gradient values. In some implementations, the model executor 145 can interpret larger gradient magnitudes as corresponding to an increased susceptibility of the per-atom prediction to parameter perturbations, thereby reflecting higher uncertainty for that atom 172.

In some implementations, the model executor 145 can determine a distance-to-training-data score by comparing an embedding vector for an atom 172 against embeddings of atomic environments from a training dataset 190. In some implementations, the model executor 145 can generate the uncertainty score 180 by determining a distance in an embedding space between an environment of an atom 172 and atomic environments in the training dataset 190, and using the distance in generating the uncertainty score 180. For example, the model executor 145 can obtain an embedding vector for each atom 172 from the output of the message passing layers of the graph neural network of the machine learning model 160, and can compute a similarity or distance metric such as cosine similarity or Euclidean distance relative to a stored reference database of training atom embeddings. The model executor 145 can select the nearest neighbor distance for each atom 172 and use the magnitude of that distance as an indicator of novelty in chemical space, where a larger minimum distance indicates an environment further outside of the training distribution. In some implementations, the model executor 145 can normalize the ensemble prediction variance, the gradient-based sensitivity magnitude, and the embedding distance metric to a common scale and compute a weighted combination of those values to generate the final uncertainty score 180 for each atom 172. The model executor 145 can store the calculated uncertainty score 180 for future use in fragment selection or refinement operations.

Once the uncertainty scores 180 have been generated, the model executor 145 can cluster the atoms 172 of the molecular structure 170 into a set of fragments 182 according to the respective position and the respective uncertainty score 180 of each atom 172 of the molecular structure 170. To do so, in one example implementation, the model executor 145 can represent each atom 172 as a composite vector formed from its spatial coordinates and its scalar uncertainty value, and the composite vectors can be normalized to a defined scale such that distance metrics reflect both geometric separations and uncertainty magnitudes. The model executor 145 can then apply similarity calculations (e.g., cosine similarity, Euclidean distance) across the composite vectors of atoms 172 to identify groupings where atoms exhibit both physical proximity and correlated uncertainty scores 180. Each grouping can be stored as a fragment 182 represented in a data structure that maintains a list of atom identifiers corresponding to the atoms 172 included in that fragment 182.

In some implementations, the model executor 145 can cluster the atoms 172 using a k-means function or a k-nearest neighbors function. When applying a k-means function, the model executor 145 can treat each composite vector as an input data point and iteratively assign atoms 172 to one of k centroids determined in the joint position-uncertainty representation. For example, atoms 172 with higher uncertainty scores 180 can be preferentially assigned to centroids positioned in uncertain regions, such that fragments 182 stored as lists of atoms 172 include those with elevated uncertainty values even when the atoms 172 are separated by marginal distances. When applying a k-nearest neighbors function, the model executor 145 can begin with high-uncertainty atoms 172 as seed entries and recursively include neighboring atoms 172 located within a defined Euclidean distance range and a defined uncertainty distance range. For example, if two atoms 172 are within 1.5 angstroms of spatial separation and within 0.05 normalized uncertainty units, both atom identifiers can be placed into the same stored fragment 182.

In some implementations, the model executor 145 can cluster the atoms 172 using a cluster radius configuration. The cluster radius can specify a cutoff in three-dimensional coordinate space beyond which atoms 172 are not included in a fragment 182, and the cluster radius can be adjusted dynamically relative to the average uncertainty scores 180 of the corresponding seed atoms. For example, for atoms 172 with very high uncertainty scores 180, the model executor 145 can apply a reduced cluster radius to generate fragments 182 stored as short lists of atom identifiers representing localized uncertain environments such as transition metal centers or strained bonds. For atoms 172 with moderate uncertainty scores 180, the model executor 145 can apply a larger cluster radius to expand the stored atom set of the fragment 182 so that surrounding atoms 172 participating in angular or torsional couplings are included. By applying radius-based cutoffs together with thresholds tied to uncertainty values, the model executor 145 can generate fragments 182 that are maintained as explicit data structures containing atom identifiers corresponding to both spatially proximate and uncertain regions of a molecular structure 170.

The model executor 145 can determine, for each fragment 182, an average uncertainty score 184 based on the uncertainty scores 180 of the atoms 172 in the fragment 182. In some implementations, the model executor 145 can determine the average uncertainty score 184 by summing the uncertainty scores 180 of the atoms 172 in the fragment 182 and dividing the sum by the number of atoms 172 in the fragment 182. For example, when a fragment 182 includes five atoms 172 with individual uncertainty scores 180 stored as normalized floating-point values, the model executor 145 can access each of the five values, add them to generate a total, and divide the total by the integer five to yield the average uncertainty score 184. The model executor 145 can implement this operation by performing indexed retrieval of each atom's uncertainty score 180 from a data structure, applying addition across all retrieved values, and executing a scalar division by the count of indexed entries. This can be repeated to calculate the average uncertainty score 184 for each fragment 182.

In some implementations, the model executor 145 can determine, for each fragment 182, a maximum uncertainty score 180 of the atoms in the fragment 182 and/or a variance of the uncertainty scores 180 of the atoms in the fragment 182. To determine the maximum uncertainty score 180, the model executor 145 can compare each atom-level uncertainty score 180 within a fragment 182 and record the largest value encountered during iteration. For example, when a fragment 182 includes three atoms 172 with uncertainty scores 180 of 0.12, 0.35, and 0.27, the model executor 145 can access each value sequentially, apply a conditional comparison at each step, and return 0.35 as the maximum uncertainty score 180. To calculate the variance, the model executor 145 can compute the mean of all uncertainty scores 180 in the fragment 182, subtract the mean from each individual uncertainty score 180 to obtain deviations, square each deviation, and divide the total of squared deviations by the number of atoms 172 in the fragment 182.

Uncertainty scores 184 for fragments can be used to efficiently identify portions of a molecular structure 170 that the machine-learning model 160 was unable to accurately predict. To obtain accurate estimates of force and energy for the atoms 172 of such fragments, the data processing system 105 communicate with the distributed computing environment 120 to perform simulation operations (e.g., quantum simulation operations, hybrid simulation operations, classical simulation operations, etc.). The simulation operations can be used to generate simulation results 194 for the corresponding fragment 182. The associated fragment 182, and its associated simulation results 194, can be paired and stored as a training example (e.g., a pair of an input fragment 192 and simulation results 194) in the training dataset 190. This can be repeated for multiple fragments, and the updated training dataset 190 can be used to update the machine-learning model 160 to more accurately predict energy and force vectors for input molecular structures 170.

The data processing system 105 can execute the processing allocator 150 to select one or more fragments 182 for further processing or simulation when the average uncertainty score 184 of the fragment 182 is greater than a threshold uncertainty score. The processing allocator 150 can include hardware, software, or combinations thereof. To perform these operations, the processing allocator 150 can access the fragment scores 184 generated by the model executor 145 for each fragment 182 of the molecular structure 170, and compare the retrieved fragment scores 184 against one or more predetermined thresholds maintained in the storage 115 and/or provided via input/requests/configuration settings. In some implementations, the processing allocator 150 can query the distributed computing environment 120 to obtain operational parameters of available classical computing systems 130 and quantum computing systems 132, including the maximum number of atoms processable in a fragment 182, the maximum number of qubits available in a quantum processor, or current task queue lengths.

For example, the processing allocator 150 can receive a response from a classical computing system 130 indicating maximum memory availability for high accuracy coupled cluster calculations, or a response from a quantum computing system 132 indicating current qubit counts and circuit depth constraints. The processing allocator 150 can use the uncertainty score 184 of each fragment 182 and the retrieved resource constraints to generate an allocation decision, such that fragments exceeding the quantum threshold are directed to a quantum computing system 132 only when sufficient qubits are available, while fragments 182 with mid-range uncertainty scores are scheduled for a high-accuracy simulation on a classical computing system 130 and/or hybrid processing approaches. In some implementations, the processing allocator 150 can maintain a priority ranking of fragments 182 based on both uncertainty score 184 and chemical relevance indicators, and can select the highest ranked fragment 182 that satisfies the resource availability information obtained from the distributed computing environment 120. The processing allocator 150 can select a processing function 186 for fragment 182 according to its uncertainty score 184. Further details of operations performed to select a processing function 186 for a fragment 182 are described in connection with FIG. 9.

Figure 9:
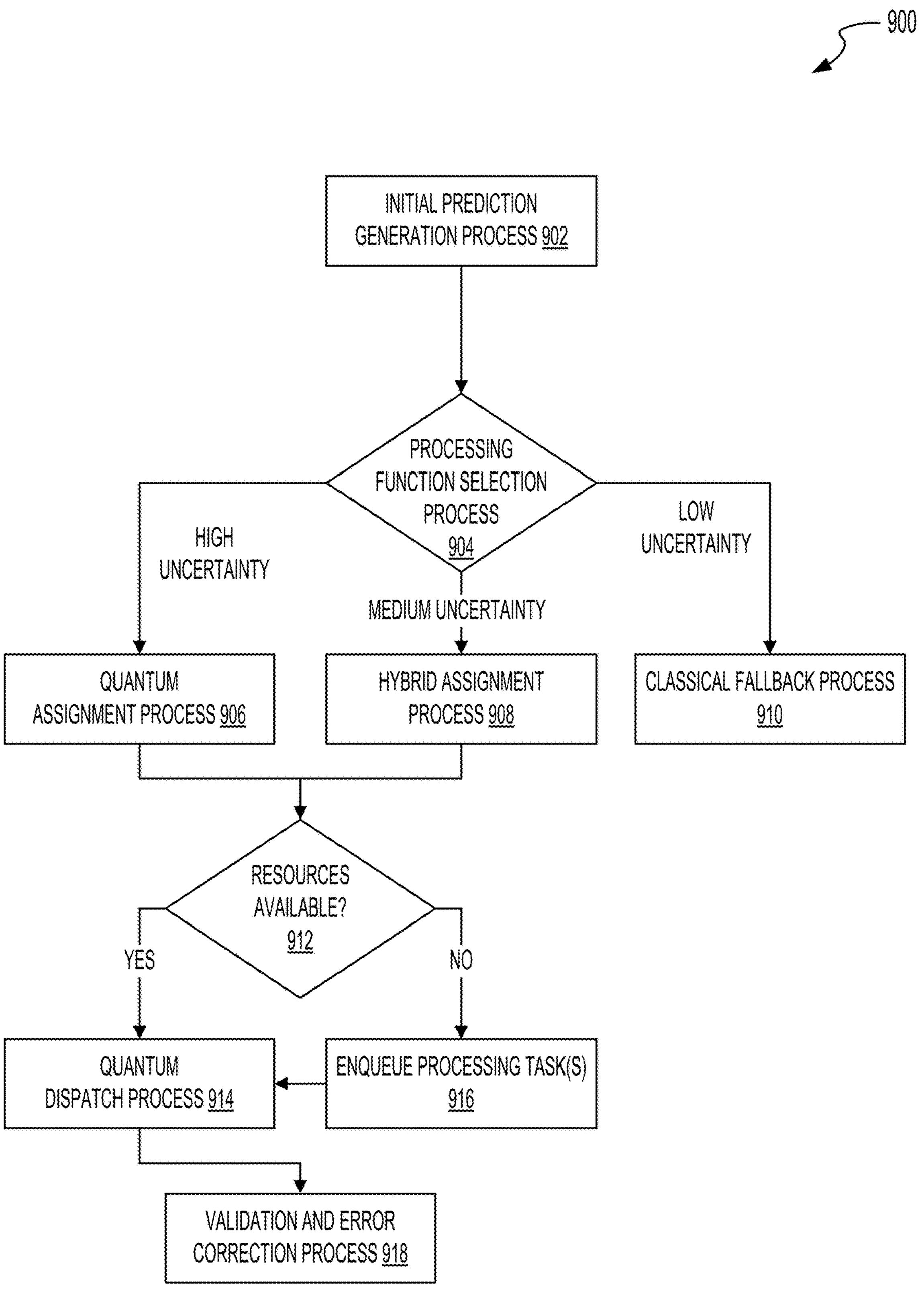
FIG. 9 illustrates a flow chart of a process for adaptive assignment of fragment simulation based on uncertainty scores, in accordance with one or more implementations.

Referring now to FIG. 9, illustrated is a process 900 for adaptive assignment of fragment simulation based on uncertainty scores, in accordance with one or more implementations. Although the following description of the process 900 is described as being performed by the data processing system (e.g., the data processing system 105), it should be understood that the process 900 may be performed by any one of the components of the data processing system 105, including but not limited to the processing allocator 150. In brief overview of the process 900, the process 900 can include performing an initial prediction generation process (ACT 902), executing a processing function selection process (ACT 904), performing a quantum assignment process (ACT 906) in response to determining high uncertainty, performing a hybrid assignment process (ACT 908) in response to determining medium uncertainty, and performing a classical fallback process (ACT 910) in response to determining low uncertainty. The process (ACT 900) can further include executing a resource availability decision (ACT 912), performing a quantum dispatch process (ACT 914) when resources are available, enqueueing processing tasks (ACT 916) when resources are not available, and performing a validation and error correction process (ACT 918).

The process 900, at ACT 902, can include performing an initial prediction generation process. As part of performing the initial prediction generation process, the data processing system can execute any operations described herein to obtain a molecular structure, transform the molecular structure into a graph data structure, and apply a graph neural network to generate per-atom energy predictions, force vector predictions, and uncertainty scores. The data processing system can cluster atoms into fragments based on their spatial coordinates and uncertainty scores, assign corresponding fragment uncertainty scores computed from the atom-level values, and maintain such fragments and associated scores for subsequent selection and routing operations in process 900.

The process 900, at ACT 904, can include executing a processing function selection process. As part of executing the processing function selection process, the data processing system can access the average uncertainty score calculated for each fragment and compare the retrieved score to at least one decision threshold maintained in memory. In some implementations, the processing allocator can compare the average uncertainty score of a fragment to a first threshold and a second threshold. In response to the average uncertainty score being greater than the second threshold, the processing allocator can select a quantum processing operation to process the fragment and execute ACT 906. For example, if the fragment includes atoms surrounding a transition-metal center and the calculated average uncertainty score surpasses the defined second threshold, the data processing system can direct the fragment to a quantum solver executed on one or more quantum computing systems. In some implementations, the fragment may be compared to one or more rules to select the processing function. For example, a configuration setting can specify that if a predetermined atom is present in the fragment, the fragment is to be assigned to quantum processing operation.

In some implementations, the processing allocator can select the at least one fragment based on a comparison of the number of atoms in the fragment to a maximum number of atoms processable via a component of the distributed computing environment. For example, when a fragment exceeds the qubit capacity available to the quantum computing systems, the data processing system can decline selection for quantum processing and reassign the fragment to an alternative solver path, such as a hybrid processing function (e.g., navigate to ACT 908). In some implementations, the data processing system can assign fragments exhibiting intermediate uncertainty values (e.g., between the first and second thresholds) to classical high-accuracy solvers executed on classical computing systems (e.g., at ACT 910). In some implementations, the data processing system can assign fragments exhibiting intermediate uncertainty values (e.g., between the first and second thresholds) to hybrid quantum classical solvers executed on both quantum and classical computing systems (e.g., at ACT 908).

In response to the average uncertainty score for the fragment being less than the first threshold, the data processing system can maintain reliance on the energy predictions and force predictions using fallback, lower-accuracy classical approaches (e.g., at ACT 910). In some implementations, if the uncertainty for a fragment is less than a lower threshold, the data processing system can retain the predictions generated by the machine-learning model (e.g., machine-learning model 160). For example, fragments derived from regions of hydrocarbons with well-represented bonding configurations and low uncertainty values can retain their predictions from the machine learning model, allowing the data processing system to complete the processing function selection process without dispatching additional simulation tasks.

The process 900, at ACT 906, can include performing a quantum assignment process in response to determining high uncertainty. As part of performing the quantum assignment process, the data processing system can identify a fragment having an average uncertainty score greater than a defined quantum threshold and prepare an electronic structure Hamiltonian for that fragment. The data processing system can select a quantum algorithm (e.g., a processing function 186) such as VQE or quantum phase estimation according to fragment size and available qubit resources. The data processing system can map atomic orbitals of the fragment to qubit registers, encode the Hamiltonian in Pauli operator form, and compile the quantum circuit into gate sequences compatible with the topology of the quantum computing system using any suitable simulation technique and/or quantum circuit generation technique. In some implementations, the data processing system can insert link atoms to cap truncated bonds and freeze boundary orbitals to maintain coherence with any excluded regions. For example, when a fragment includes a metal-ligand site with stretched bonds, the data processing system can assign hydrogen link atoms at the severed ligands, reduce the set of occupied orbitals to an active space, and generate a parameterized ansatz circuit for execution on the quantum computing system to obtain ground state energy and per-atom force vectors.

The process 900, at ACT 908, can include performing a hybrid assignment process in response to determining medium uncertainty. As part of performing the hybrid assignment process, the data processing system can select a fragment with an average uncertainty score between a first and second threshold and partition that fragment into a set of quantum region and a classical region. The data processing system can generate an embedding Hamiltonian for the quantum region while specifying boundary conditions derived from the classical region. The data processing system can generate a set of quantum tasks that include instructions to execute parameterized quantum subcircuits on a quantum computing system while applying a classical optimization routine (e.g., represented via corresponding classical computing tasks) on a classical computing system to minimize the expectation value of the Hamiltonian. For example, a catalytic pocket of a fragment can be assigned to the quantum region for variational Eigensolver execution, while solvent polarization effects can be calculated using a classical continuum solvation model with electrostatic charges passed into the quantum calculation. Other permutations and tasks/operations are also possible.

The process 900, at ACT 910, can include performing a classical fallback process in response to determining low uncertainty. As part of performing the classical fallback process, the data processing system can select a fragment having an average uncertainty score less than a defined lower threshold and assign it to a classical high-accuracy solver. The data processing system can prepare the fragment geometry, assign a selected basis set, and apply methods such as coupled cluster singles and doubles with perturbative triples or multi-configurational self-consistent field. In some implementations, the data processing system can apply density functional theory with hybrid functionals when the fragment includes standard covalent bonding environments. For example, when a fragment contains a hydrocarbon chain with low uncertainty values, the data processing system can optimize the geometry using density functional theory B3LYP functional with a triple-zeta basis set to generate energy values and per-atom force vectors. The resulting force and energy data can be associated with the fragment and routed into downstream operations without requiring quantum resources.

The process 900, at ACT 912, can include determining whether quantum resources are available to perform the quantum tasks enumerated in ACTs 908 and 910. As part of performing this determination, the data processing system can issue a query to a distributed computing environment (e.g., the distributed computing environment 120) to obtain current operational parameters for one or more quantum computing systems (e.g., quantum computing systems 132), including available qubit counts, maximum circuit depth values, coherence times, and queue lengths. In some implementations, the data processing system can parse the returned operational parameters and compare each parameter against minimum requirements derived from the fragment dimensions (e.g., total number of atomic orbitals mapped to qubits, expected entanglement depth required for the simulation algorithm, etc.). For example, when the selected fragment includes twelve atomic orbitals and the available quantum computing system exposes only eight qubits, the data processing system can determine that the resource availability check fails.

In some implementations, the data processing system can calculate estimated runtime durations for each pending quantum task by combining current queue length and per-circuit execution time metadata obtained from the distributed computing environment, and can determine resource availability only when the projected execution duration falls below a configured maximum runtime constraint. For example, when the data processing system determines that queueing and execution on the quantum system would exceed a threshold defined by system configuration configurations, the check can return a negative result, whereas when the estimated duration remains below the threshold, the check can return a positive result. If resources are available, the process 900 can proceed to ACT 914. If resources are not available, the process 900 can proceed to ACT 916.

The process 900, at ACT 914, can include performing a quantum dispatch process when resources are available. As part of performing the quantum dispatch process, the data processing system can generate a queue entry for the fragment that has been assigned to quantum processing, identify the selected quantum algorithm (e.g., processing function 186 such as VQE, quantum phase estimation, or complete active space self-consistent field), and compile the corresponding Hamiltonian representation. The data processing system can map atomic orbitals of the fragment to qubit registers, generate Pauli operator encodings for the Hamiltonian terms, and schedule parameterized circuit templates for execution on available qubit hardware. In some implementations, the data processing system can apply circuit transpilation routines that reorder or substitute gates to fit the topology of the quantum processor. For example, when a fragment Hamiltonian requires two-qubit operations among qubits not directly connected on the hardware graph, the data processing system can insert swap gates according to the compiled circuit depth constraints. The data processing system can transmit the compiled circuit instructions to the selected quantum computing system, receive the execution results representing expectation values or measurement outcomes, and compute per-atom energy or force values from the processed output.

The process 900, at ACT 916, can include enqueueing processing tasks when resources are not available. As part of enqueueing processing tasks, the data processing system can generate a task descriptor that includes metadata such as fragment identifier, uncertainty score value, algorithm selection, and required qubit count. The data processing system can insert this descriptor into a scheduling queue indexed by priority level according to uncertainty thresholds and chemical relevance indicators. In some implementations, the data processing system can apply batching logic that groups multiple fragments with similar Hamiltonian sizes or gate depth requirements into a common queue block for more efficient dispatch once resources become available. For example, if three fragments each require fewer than ten qubits for execution under a VQE approach, the data processing system can place all three into the same queue entry to be executed sequentially on one allocation of a quantum processor. The data processing system can record the queue position and monitor resource availability by repeatedly querying operational parameters of the distributed computing environment. When updated resource information indicates that sufficient qubits and circuit depth are available, the data processing system can remove the task descriptor from the queue and initiate dispatch according to the quantum dispatch process at ACT 914.

The process 900, at ACT 918, can include performing a validation and error correction process for the results of the quantum operations. As part of performing the validation and error correction process, the data processing system can compare computed observables from the quantum operations against predetermined physical invariants such as energy conservation or spin multiplicity constraints. In some implementations, the data processing system can recalculate a subset of expectation values using alternative circuit decompositions or basis set encodings and compare the recalculated values with the initially obtained results. For example, the data processing system can execute a VQE circuit using distinct ansatz parameterizations that span the same active space and evaluate whether the derived energy values converge within a defined tolerance range.

In some implementations, the data processing system can apply post-selection operations by discarding measurement outcomes that violate conservation rules such as total particle number or electron parity. For example, the data processing system can identify measurement bitstrings representing unphysical electron counts and exclude those results before calculating expectation values. In some implementations, the data processing system can apply error mitigation protocols such as zero-noise extrapolation by intentionally inserting identity gate sequences to vary effective circuit depth, recording the corresponding expectation values, and extrapolating to the zero-noise limit. For example, the data processing system can execute identical circuits at higher noise levels by repeating controlled-NOT operations multiple times and fit a linear regression through the derived energy values to estimate the result under noiseless conditions. In some implementations, the data processing system can execute redundancy checks by splitting a fragment Hamiltonian into independently solvable sectors, executing separate quantum tasks for each sector, and verifying whether reassembled energy contributions are consistent with the full Hamiltonian evaluation. For example, the data processing system can fragment a Hamiltonian describing a transition-metal site into spin-up and spin-down blocks, execute separate variational calculations, and recombine the values to confirm consistency with the original system energy.

Referring back to FIG. 1, upon selecting a processing function 186 for a given fragment using the techniques described in connection with FIG. 9, the processing allocator 150 can execute a processing function 186 for at least one fragment 182 selected for simulation/processing via the distributed computing environment 120. To do so, any of the operations described in connection with ACTs 906-918 of the process 900 of FIG. 9 can be performed. In some implementations, and as described herein, the processing allocator 150 can communicate with the components (e.g., classical systems 130, quantum systems 132) of the distributed computing environment 120 to execute hybrid quantum-classical computing tasks. Example approaches for communicating and coordinating execution of hybrid quantum-classical computing tasks are described in connection with FIG. 10.

Figure 10:
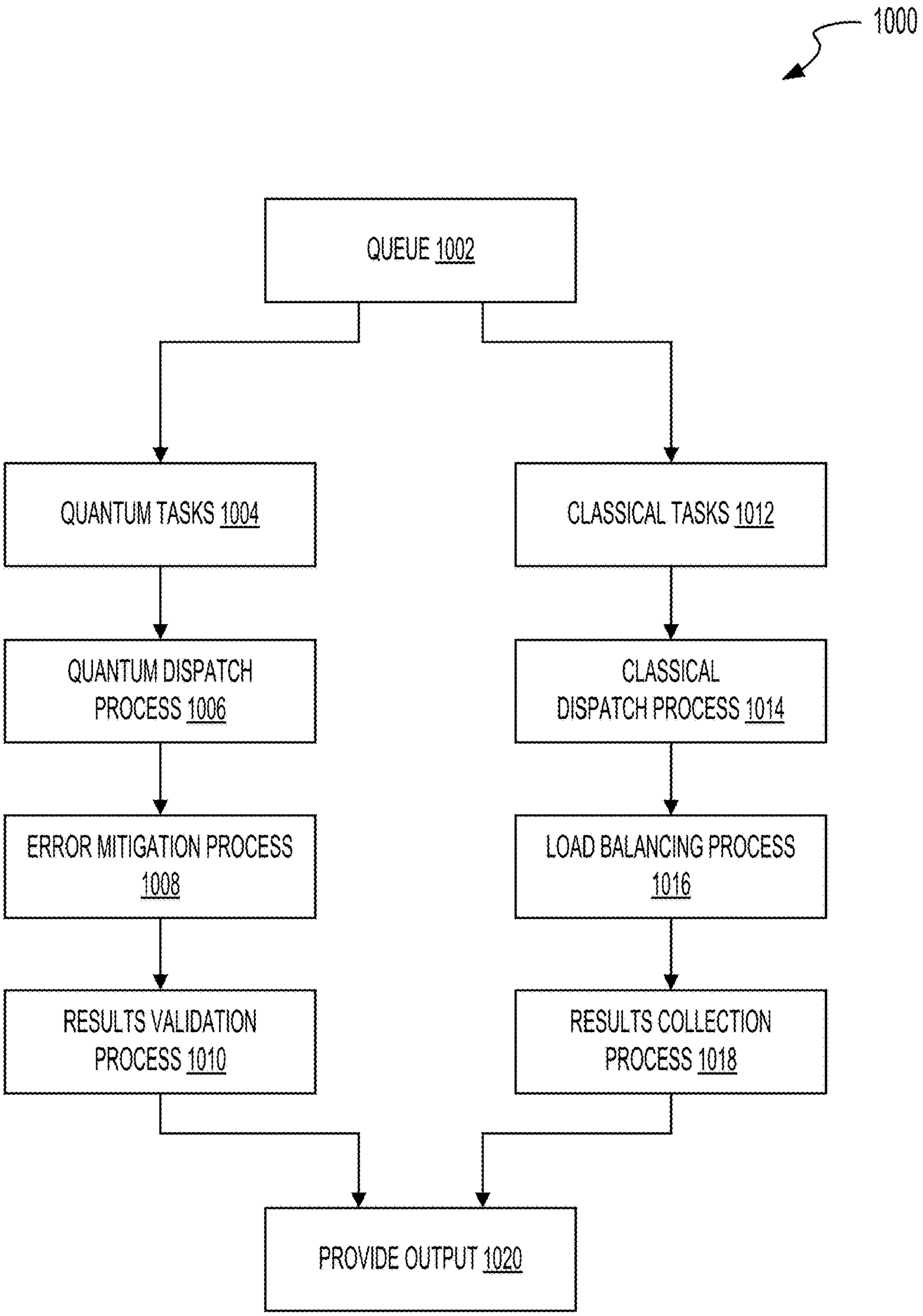
FIG. 10 illustrates a flow diagram of a heterogeneous resource management system for orchestrating quantum and classical computational tasks, in accordance with one or more implementations.

Referring now to FIG. 10, illustrated is a method 1000 of orchestrating quantum and classical computational tasks for adaptive reaction network operations. Although the following description of the process 1000 is described as being performed by the data processing system (e.g., the data processing system 105), it should be understood that the process 1000 may be performed by any one of the components of the data processing system 105, including but not limited to the processing allocator 150. In brief overview of the method 1000, the method 1000 can include accessing a global task queue (ACT 1002), routing quantum tasks (ACT 1004), performing a quantum dispatch process (ACT 1006), performing an error mitigation process (ACT 1008), performing a results validation process (ACT 1010), routing classical tasks (ACT 1012), performing a classical dispatch process (ACT 1014), performing a load balancing process (ACT 1016), performing a results collection process (ACT 1018), and providing an output (ACT 1020).

The method 1000, at ACT 1002, can include accessing a global task queue. As part of accessing the global task queue (e.g., a processing queue updated according to the techniques described in connection with FIG. 9), the data processing system can retrieve a prioritized set of task descriptors maintained in memory, where each descriptor specifies a fragment identifier, an assigned processing function, and estimated resource requirements. In some implementations, the data processing system can parse the task descriptors to classify them as either quantum tasks or classical tasks. For example, the data processing system can access descriptors stored as structured records, extract fields indicating quantum or classical operations, and prepare these records for branching to different schedulers according to their type. In some implementations, the data processing system can use the operations of the process 900 to select the type of processing (e.g., quantum, classical, hybrid) for a given fragment included in the queue.

The ACTs 1004-1010 of the method 1000 correspond to tasks that are to be implemented via a quantum computing system (e.g., quantum system 132). The method 1000, at ACT 1004, can include assigning quantum tasks for simulation operations involving fragments and/or molecular structures. To do so, the data processing system can select those task descriptors from the global queue that specify quantum-level methods such as a VQE or quantum phase estimation, and transfer them into a quantum task queue. In some implementations, the data processing system can perform a compatibility check, such as verifying that the fragment Hamiltonian size is below the available qubit limit of the quantum computing system. For example, the data processing system can evaluate the basis set size from the descriptor, compare it to a maximum qubit count parameter, and remove or subdivide any entries that exceed available resources.

The method 1000, at ACT 1006, can include performing a quantum dispatch process. As part of performing the quantum dispatch process, the data processing system can translate each fragment Hamiltonian into gate-level instructions compatible with the topology of the selected quantum computing system. In some implementations, the data processing system can apply circuit transpilation to reorder or substitute gates to reduce circuit depth. For example, the data processing system can take an encoded Hamiltonian term expressed as Pauli operators, map it onto logical qubits, and insert swap gates when physical qubit connectivity constraints require remapping.

As part of preparing the dispatch, the data processing system can assign basis states of the fragment Hamiltonian to physical qubits that are available on the quantum computing system. The data processing system can then segment the Hamiltonian into operator strings, encode each operator string into a sequence of primitive gate instructions, and apply optimization passes to minimize the total two-qubit gate count relative to the device topology. In some implementations, the data processing system can schedule the execution order of parameterized quantum circuits, insert calibration instructions for native gate operation, and generate a compiled job object. For example, the data processing system can map a four-qubit operator string to CNOT and single-qubit rotation gates, apply reordering such that only nearest-neighbor links are activated, and write the reordered circuits into the compiled job object that specifies the set of execution-ready instructions.

Once the compiled instructions are generated, the data processing system can transmit the job object to the quantum computing system 132 for execution. In some implementations, the data processing system can package the job object with metadata such as circuit depth, expected execution count, and/or qubit identifiers, and direct this package across a quantum interface to the quantum computing system (e.g., via communications with the distributed computing environment 120). For example, the data processing system can transmit a variational eigensolver ansatz circuit compiled into gate-level form together with its parameter vector to the quantum computing system 132, instruct the quantum computing system to perform repeated executions to accumulate statistical measurements, and receive expectation values measured from the quantum hardware into the data processing system for subsequent processing.

The method 1000, at ACT 1008, can include performing an error mitigation process. To perform error mitigation, the data processing system can adjust constructed circuits to extract modified measurement distributions that approximate noiseless values. In some implementations, the data processing system can repeat circuit execution with added identity gates inserted to change effective circuit depth, and then extrapolate measurement results back to the zero-noise condition. For example, the data processing system can execute a variational circuit three times with 1×, 2×, and 3× controlled-NOT layers, record the respective energy values, and estimate a corrected output by fitting a linear regression to the observed trend. Any other suitable error mitigation process may be implemented to reduce errors in the output of the quantum system.

The method 1000, at ACT 1010, can include performing a results validation process. As part of the results validation process, the data processing system can verify that computed observables remain consistent with physical constraints such as particle number or spin multiplicity. In some implementations, the data processing system can recalculate selected expectation values with an alternative basis encoding and compare the outputs. For example, the data processing system can split a Hamiltonian into electron spin-up and spin-down blocks, execute both subproblems, and confirm that the recombined energy equals the full Hamiltonian energy within a defined tolerance.

The ACTs 1004-1010 of the method 1000 correspond to tasks that are to be implemented via a classical computing system (e.g., classical system 130). Such tasks may be performed alone (e.g., as solely classical tasks) or as part of hybrid quantum-classical processing. The method 1000, at ACT 1012, can include assigning classical tasks. As part of assigning classical tasks, the data processing system can access descriptors from the global task queue 1002 to identify entries marked for classical execution and transfer them into the classical task queue 1012. The data processing system can parse each descriptor to extract algorithm identifiers, such as coupled cluster singles and doubles, configuration interaction, or density functional theory, and associate the extracted identifiers with pre-defined processor compatibility profiles. In some implementations, the data processing system can determine whether a task is computationally parallelizable, memory-intensive, or scalar-oriented and use that classification to select a CPU node or GPU node for dispatch. For example, the data processing system can assign tensor contraction workloads required by a coupled cluster calculation to a GPU node, while routing mean-field self-consistent field tasks to a CPU cluster. The data processing system can then generate a scheduling record that specifies the selected node address, required memory allocation, and algorithm parameters, and place that record into the classical task queue 1012 for retrieval during the classical dispatch process 1014.

The method 1000, at ACT 1014, can include performing a classical dispatch process. As part of performing the classical dispatch process, the data processing system can select a computing node from among available classical computing systems (e.g., classical computing systems 130) by accessing processor load values, memory availability indicators, and algorithm identifiers included in a task descriptor. In some implementations, the data processing system can generate a scheduling record that encodes a node address, a required memory allocation size, and one or more algorithm parameters, and transmit that record to the selected classical computing system 130 for execution. The data processing system can transmit the selected task inputs to the distributed computing environment (e.g., distributed computing environment 120) and/or the classical computing systems thereof and can initiate execution at the node according to the allocation parameters established in the scheduling record.

The method 1000, at ACT 1016, can include performing a load balancing process. As part of performing the load balancing process, the data processing system can access operational parameters from multiple classical computing systems such as processor load, memory availability, and task queue depth. The data processing system can compare those parameters against execution requirements specified in each task descriptor, including expected memory usage and required computational precision. In some implementations, the data processing system can assign segments of matrix operations, integral evaluations, and/or tensor contractions to different nodes based on those comparisons. For example, the data processing system can route a task descriptor implementing high parallel floating-point throughput to a GPU node while dispatching a linear algebra routine characterized by memory-bound operations to a CPU cluster. The data processing system can reassign queued tasks when monitored resource parameters drop below a defined utilization threshold to balance workloads across available classical computing systems. Any suitable load balancing algorithm can be used. In some implementations, the operations of ACT 1016 may be performed by one or more classical computing systems 130 of the distributed computing environment 120 of FIG. 1 (e.g., an orchestrator node).

The method 1000, at ACT 1018, can include performing a results collection process. During results collection, the data processing system can retrieve computed energies and force vectors generated by tasks from both the quantum task queue and the classical task queue and combine them into a unified record. In some implementations, the data processing system can convert heterogeneous outputs into normalized data tensors. For example, the data processing system can gather force vectors expressed in basis-dependent units from different algorithms, transform them into Cartesian coordinates in electron volts per angstroms, and output them in a consistent format. In some implementations, the data processing system can merge multiple partial outputs for a single fragment by summing per-atom energy contributions and reconciling overlapping atom records using a weighted average. For example, the data processing system can receive quantum-computed forces on three atoms of a catalytic site, receive classical-computed forces on the remaining atoms of the same fragment, and align those results to generate a unified Cartesian force tensor indexed across all atoms of the fragment. In some implementations, the data processing system can detect when different tasks compute disjoint subsets of atoms belonging to one molecular fragment and concatenate the corresponding vectors before numerical normalization.

The method 1000, at ACT 1020, can include providing an output. As part of providing the output, the data processing system can store the combined quantum and classical simulation results in a training dataset maintained in memory. The data processing system can associate each stored entry with the corresponding fragment identifier and the simulation method used to generate the results. The stored results can be accessed in downstream processing operations, for example, during training/fine-tuning of a machine learning model and/or during subsequent fragment selection operations as described in further detail herein.

Referring back to FIG. 1, the resulting output of the processing function 186 can be stored as simulation results 194 as part of a training dataset 190. In particular, the processing allocator 150 can store the simulation results 194 generated by executing the processing functions 186 in the training dataset 190 together with corresponding input fragments 192 (e.g., the fragment 182 from which the simulation results 194 are generated) as a training example/entry. To do so, any of the operations described in connection with FIG. 6 can be performed, for example, to verify that added simulation results 194 and input fragments 192 are not duplicates of training examples previously added to the training dataset 190. In some implementations, the processing allocator 150 can store, in the training dataset 190, metadata specifying a molecular configuration of the corresponding fragment 182, the uncertainty score 184 for the fragment 192, and any simulation parameters used to generate the corresponding simulation results 194. The training dataset 190 can be used to train the machine-learning model 160, thereby improving the performance of the machine-learning model 160 with respect to fragments 182 that were previously difficult to classify (e.g., having higher average uncertainty scores 184).

The data processing system 105 can execute the model updater 155 to update the machine learning model 155. In some implementations, the model updater 155 can update the machine-learning model 160 in response to determining that the number of entries/training examples in the training dataset 190 exceeds a threshold. The model updater 155 can update the machine learning model 160 using the simulation results 194 generated from execution of the selected processing functions 186 on input fragments 192. In some implementations, the model updater 155 can obtain pairs of input fragments 192 and corresponding simulation results 194 from the training dataset 190 and use them to perform transfer learning updates on the machine learning model 160. In one example, the model updater 155 can provide atomic features from an input fragment 192 to the machine learning model 160 and generate corresponding per-atom energy predictions 177 and force predictions 179 according to the techniques described herein. The model updater 155 can calculate a difference between the simulation results 194 and the predicted energy predictions 177 and force predictions 179 for the same atoms of the input fragment 192. The model updater 155 can use the calculated differences as loss values (e.g., a mean squared error loss, vector-based loss, etc.) on energy predictions 177 and force predictions 179, and accumulate such losses across the atoms of the fragment 182.

In some implementations, the model updater 155 can compute a combined loss function that assigns distinct weights to energy losses and force vector losses before applying gradient updates to the machine learning model 160. For example, the model updater 155 can weight force vector losses more heavily than energy losses when the simulation results 194 indicate strong deviations in atomic forces near reactive bonds, or may increase the relative contribution of energy terms when validation sets contain equilibrium conformers. In another example, the model updater 155 can apply auxiliary loss terms to recalibrate the uncertainty estimates generated by the machine learning model 160, such that the ensemble variance or gradient sensitivity scores more accurately track the divergence between predictions and simulation results 194. The model updater 155 can then execute backpropagation using the calculated loss values and update parameters of the machine learning model 160 until convergence criteria are satisfied, thereby fine-tuning the machine learning model 160 to improve accuracy of predictions for molecular structures that include fragments 182 with characteristics similar to those in the training dataset 190. Further details of the fine-tuning/update process for the machine-learning model 160 are described in connection with FIG. 8.

Prior to fine-tuning, in some implementations, the model trainer 150 may perform one or more pre-training operations for the machine-learning model 160 prior to performing update/fine-tuning operations using the training dataset 190. For example, the model trainer 150 can receive molecular structures expressed as graph data structures and apply a forward noising process in which random perturbations are introduced to atomic positions or bonding descriptors across multiple timesteps. The model trainer 150 can then implement a reverse generation process that updates the parameters of the machine-learning model 160 to learn to reconstruct the original structural representation from progressively noisier states by minimizing a self-supervised loss function computed between reconstructed and target molecular graphs. In some implementations, the model trainer 150 can perform iterative parameter updates during this reverse generation by backpropagating error signals through message passing layers while adjusting latent embeddings to encode chemically relevant invariances. For example, the model trainer 150 can expand interatomic distance features into radial basis functions, propagate them through equivariant layers of the machine-learning model 160, and update atomic embeddings until the reconstruction loss converges within predefined thresholds. Further details of the pre-training process are described in connection with FIG. 7.

Figure 7:
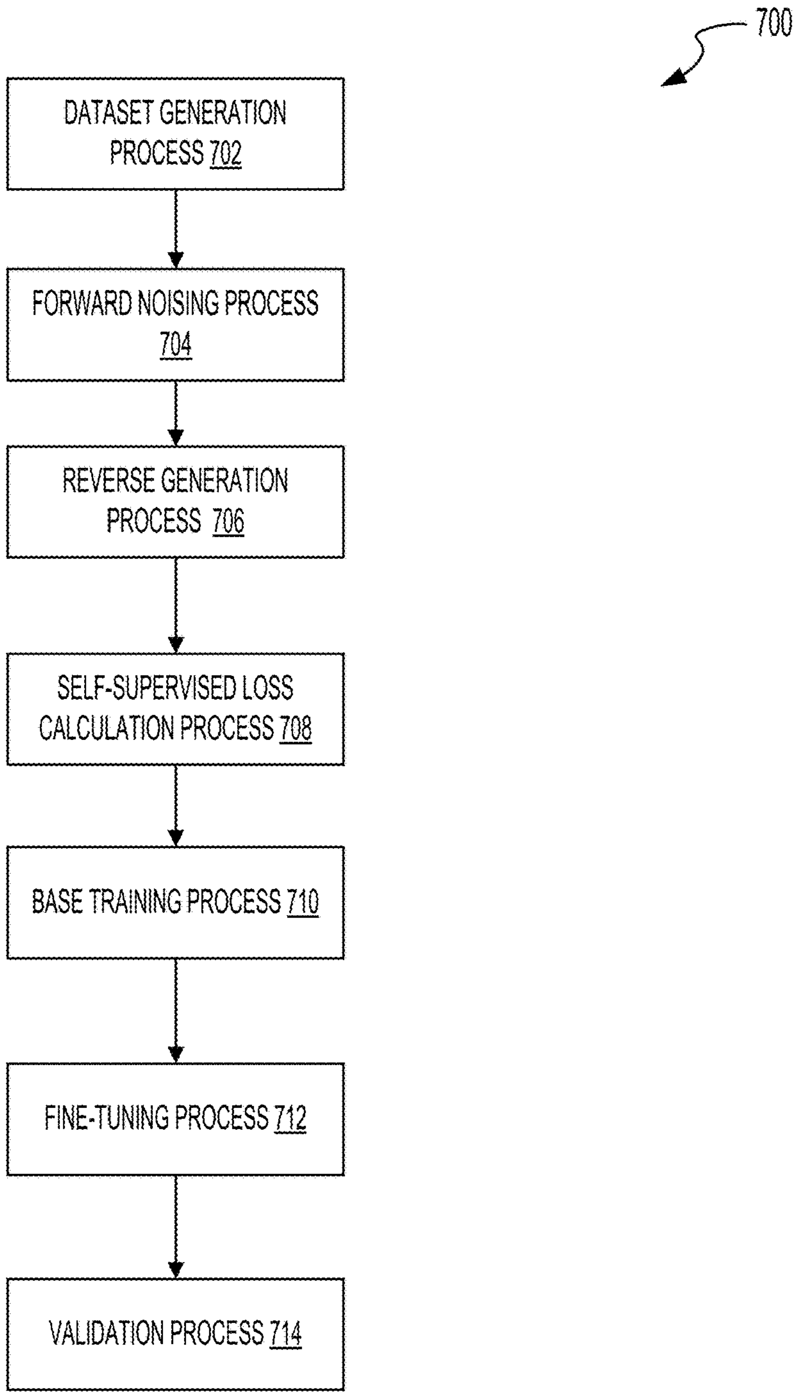
FIG. 7 illustrates a flow chart of a training pipeline used for pre-training and fine-tuning a machine learning model, in accordance with one or more implementations.

Referring now to FIG. 7, illustrated is a method 700 of performing pre-training and fine-tuning of a machine learning model for adaptive reaction network exploration. Although the following description of the process 700 is described as being performed by the data processing system (e.g., the data processing system 105), it should be understood that the process 700 may be performed by any one of the components of the data processing system 105, including but not limited to the model updater 155. In brief overview of the method 700, the method 700 can include performing a dataset generation process (ACT 702), executing a forward noising process (ACT 704), executing a reverse generation process (ACT 706), calculating a self-supervised loss during a self-supervised loss calculation process (ACT 708), performing a base training process (ACT 710), executing a fine-tuning process (ACT 712), and conducting a validation process (ACT 714).

The method 700, at ACT 702, can include performing a dataset generation process. As part of performing the dataset generation process, the data processing system can obtain one or more molecular structures that specify atom types, spatial coordinates, and bonding connectivity, such as structures generated from conformer generation operations at ACT 502. The data processing system can transform each molecular structure into a graph data structure (e.g., using the operations of the data structure generator 140 of FIG. 1) by assigning node features based on atom identity, charge, aromaticity, or hybridization, and edge features based on interatomic distances, bond orders, or angular descriptors. The resulting processed structures can be retained as input records that associate each graph representation with identifiers for further refinement operations.

The method 700, at ACT 704, can include executing a forward noising process. As part of executing the forward noising process, the data processing system can receive molecular conformer structures obtained during the dataset generation process at ACT 702 and incrementally perturb atomic coordinates across a sequence of timesteps. In some implementations, the data processing system can apply Gaussian noise vectors to each atom position, where the variance of the Gaussian distribution increases with timestep index, thereby generating a progressively degraded representation of the molecular structure. For example, at an initial timestep the data processing system can generate a displacement vector ($\Delta x$, $\Delta y$, $\Delta z$) for each atom sampled from a zero-mean Gaussian distribution with a small standard deviation, add the displacement vector to the corresponding atom's coordinate, and record the perturbed structure as timestep one in the noising schedule.

At each subsequent timestep, the data processing system can increase the standard deviation according to a predefined noise schedule, such as linear variance growth or cosine-based schedules, and resample displacements for all atoms to generate the perturbed structure for that timestep. In some implementations, the data processing system can integrate additional perturbations to angular descriptors or bond length values stored in the graph data structure of the molecular structure by applying random offsets bounded by chemically reasonable ranges, thereby diffusing both coordinate and bonding representations over the noising trajectory. For example, the data processing system can apply a random perturbation of 0.02 angstroms to each bond length at timestep one, increase to 0.05 angstroms at timestep two, and continue scaling the perturbation magnitude up to a maximum cutoff defined in configuration memory. The data processing system can iterate through a predefined number of timesteps, such as 1000 iterations, recording the molecular graph representation at each step until the structure approaches a fully randomized distribution. The forward noising process can therefore transform ordered molecular data into progressively noisier variants that establish the trajectory used during the reverse generation process at ACT 706.

The method 700, at ACT 706, can include executing a reverse generation process. As part of executing the reverse generation process, the data processing system can use the noisy molecular structures generated during the forward noising process at ACT 704 as inputs and apply a parameterized graph neural network to iteratively reconstruct progressively less degraded versions of the molecular structure at each timestep. The data processing system can initiate the process at the final timestep that contains molecular structures in a maximally randomized state and apply the graph neural network to predict denoised coordinates and connectivity tensors, which can then be passed as inputs for the previous timestep. In some implementations, the data processing system can apply conditional updates based on timestep embeddings that identify the specific stage in the reverse trajectory, such that the predicted atomic coordinates and bonding descriptors correspond to the statistical characteristics of one step closer to the original, uncorrupted conformer.

For example, the data processing system can provide an embedding vector of timestep index t into the neural network layers, use this index to condition the transformation weights, and generate outputs that represent an approximation of the less noisy structure expected at timestep $t-1$. In some implementations, the data processing system can repeat this procedure across all timesteps in decreasing order until the trajectory converges to a final reconstructed conformer representation that approximates the original molecular structure provided at ACT 702. For example, the data processing system can iteratively apply 1000 denoising updates, where each update includes predicting three-dimensional atomic coordinates, re-applying graph connectivity rules based on atomic distances, and recomputing node feature embeddings that reflect updated bonding descriptors. In some implementations, the data processing system can apply alignment and/or normalization constraints during each denoising step so that atomic coordinates remain consistent in scale and orientation across timesteps. For example, the data processing system can rescale atomic position tensors after each step, or apply center-of-mass normalization to minimize drift during the iterative reverse trajectory.

The method 700, at ACT 708, can include calculating a self-supervised loss during a self-supervised loss calculation process. To do so, the data processing system can obtain reconstructed molecular graphs generated in ACT 706 and compare them against the corresponding target structures obtained in ACT 702. In one example, the data processing system can calculate deviations between predicted atomic coordinates and target atomic coordinates using an L2 norm across each atom in three-dimensional space. In some implementations, the data processing system can calculate deviations between predicted bonding descriptors such as bond order, aromaticity flags, and/or torsional measures and their respective target values.

In one example, the data processing system can calculate a mean squared error value between predicted Cartesian position vectors and the ground-truth vectors for every atom of the conformer representation. Any suitable loss function may be used to calculate the self-supervised loss. In some implementations, the data processing system can combine positional error terms with bond connectivity mismatch values and angular deviation penalties into a composite scalar loss function. The data processing system can propagate the composite scalar loss backwards through the graph neural network parameters using automatic differentiation routines, thereby assigning gradient values to each trainable parameter according to the contribution of prediction error. Such operations enable the parameters of the machine learning model to be updated in subsequent training operations in order to reduce error in reconstruction during future iterations.

The method 700, at ACT 710, can include performing a base training process. To perform ACT 710, the data processing system can apply the gradients obtained from the self-supervised loss calculation process of ACT 708 to update parameter weights of the graph neural network using an optimization algorithm such as stochastic gradient descent or Adam. The data processing system can adjust embeddings of atom types, edge features, and positional encodings by incrementally modifying their associated weight matrices so that the predictions of atomic positions, bond connectivity, and angular descriptors more closely approximate those of the target structures. In some implementations, the data processing system can apply minibatch training in which a subset of conformer graphs are selected and passed through the network, after which weight updates are calculated and applied before the next batch is processed.

For example, the data processing system can sample fifty conformers from the dataset at ACT 702, pass them through the network to generate noisy-to-clean reconstructions, calculate a batch loss from ACT 708, and adjust network parameter weights accordingly. In some implementations, the data processing system can monitor convergence within each epoch by tracking the reduction in training loss values across multiple minibatches, and continue performing parameter updates until the loss stabilizes below a defined tolerance. The repetition of ACT 702 through ACT 710 can be performed any number of times until a pretraining condition is satisfied, where the pretraining condition can include a defined number of completed epochs, stabilization of self-supervised reconstruction loss below a designated threshold, or attainment of parameter initialization suitable for fine-tuning with fragment-level quantum and classical data.

The method 700, at ACT 712, can include executing a fine-tuning process. As part of executing the fine-tuning process, the data processing system can obtain input fragments 192 and corresponding simulation results 194 from the training dataset 190 and provide those records to the machine learning model 160 as described in connection with the model updater 155. The data processing system can generate loss values by comparing predicted energy predictions 177 and force predictions 179 against the simulation results 194, and can apply gradient updates to the parameters of the machine learning model 160 according to those loss values. In some implementations, the data processing system can assign distinct weights to energy and force terms in a combined loss function and adjust learning rates during parameter updates, for example, by executing the model parameter update process 804 of FIG. 8. In some implementations, the data processing system can further adjust the architecture of the machine learning model 160 through the architecture adaptation process 810 of FIG. 8, for example, by changing message passing depth, embedding dimensions, and/or other hyper parameters of the machine-learning model when convergence criteria are not satisfied.

The method 700, at ACT 714, can include conducting a validation process. As part of conducting the validation process, the data processing system can select a validation portion of the training dataset 190 and execute inference of the machine learning model 160 on stored input fragments 192 without applying further parameter updates. The data processing system can calculate validation error values such as mean squared error of predicted energies or vector deviations of predicted atomic forces, and compare those error values against convergence criteria such as the convergence criteria of FIG. 8. In some implementations, the data processing system can repeat ACT 712 and ACT 714 iteratively, such that weights or structure of the machine learning model 160 are updated until validation error values stabilize below defined thresholds. In some implementations, the data processing system can apply this validation loop specifically on training datasets generated from conformers, fragments, or molecular structures selected at ACT 502-ACT 514 of FIG. 5, thereby refining the machine learning model 160 for classes of chemical systems that include transition-state conformers, solvent-modified fragments, or surface-bound intermediates.

Figure 8:
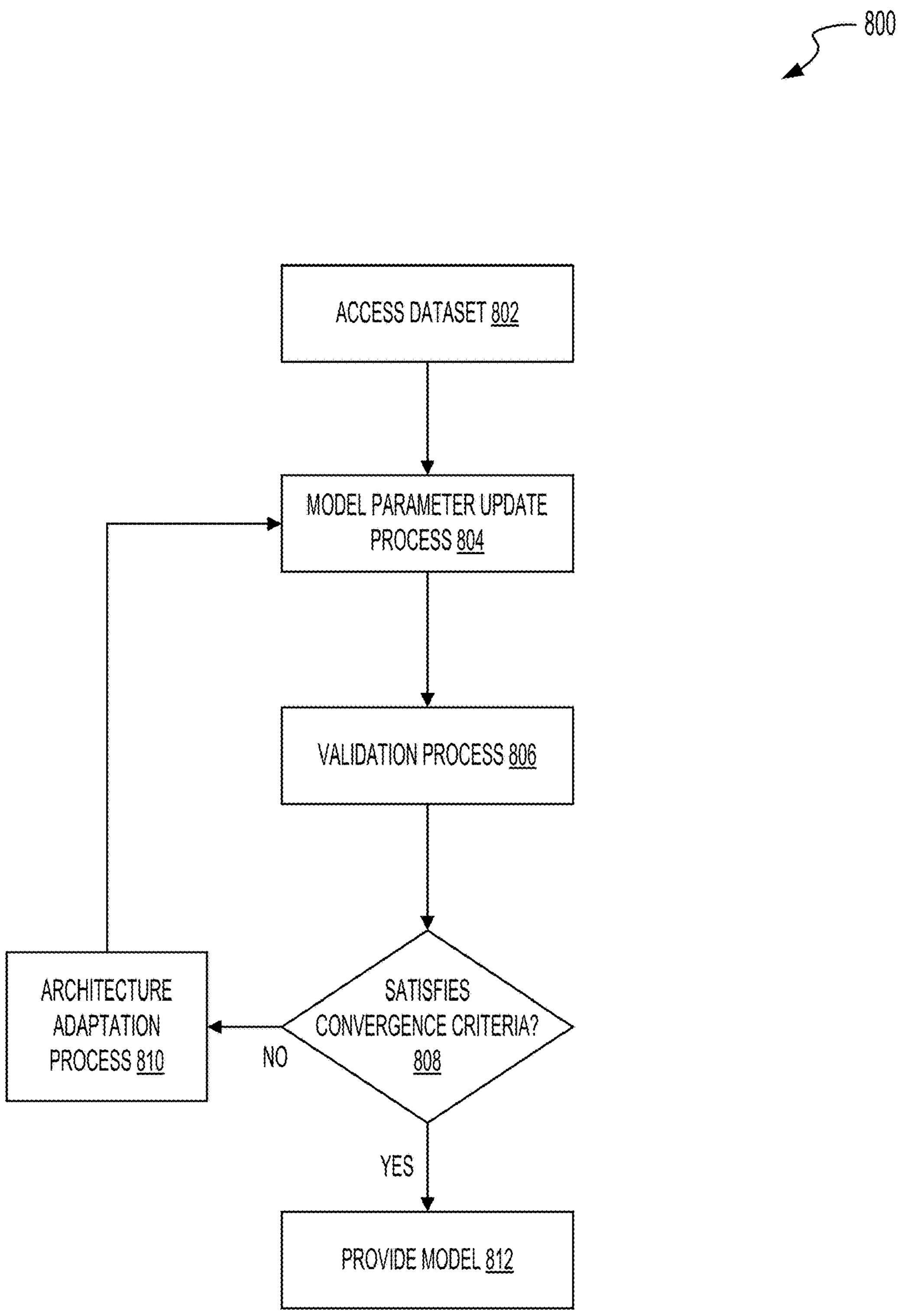
FIG. 8 illustrates a flow chart of an adaptive model refinement process including iterative parameter and architecture updates, in accordance with one or more implementations.

Referring now to FIG. 8, illustrated is a method 800 of fine-tuning a machine-learning model for adaptive model refinement. Although the following description of the process 800 is described as being performed by the data processing system (e.g., the data processing system 105), it should be understood that the process 800 may be performed by any one of the components of the data processing system 105, including but not limited to the model updater 155. In brief overview of the method 800, the method 800 can include accessing a dataset (ACT 802), performing a model parameter update process (ACT 804), executing a validation process (ACT 806), determining whether convergence criteria are satisfied (ACT 808), performing an architecture adaptation process when convergence criteria are not satisfied (ACT 810), and providing the model once the convergence criteria are satisfied (ACT 812).

The method 800, at ACT 802, can include accessing a dataset (e.g., a training dataset 190). Accessing the dataset may include identifying a dataset of conformers, molecular structures, or fragments that had average uncertainty scores (e.g., uncertainty scores 184) that exceeded a threshold. The dataset can include pair training examples including a molecular structure and a prediction target (e.g., simulation results 184, including simulated per-atom potential energy and simulated per-energy force vectors). In some implementations, the data processing system can generate the dataset using techniques described in connection with FIGS. 1, 5, and/or 6. Accessing the dataset may include accessing a set of training examples and a set of validation examples (e.g., a validation set) identified in the dataset.

The method 800, at ACT 804, can include performing a model parameter update process. To do so, the data processing system can obtain input fragments (e.g., input fragments 192) and corresponding simulation results (e.g., simulation results 194) from the training dataset and provide the fragment as input to the machine learning model (e.g., the machine-learning model 160). The data processing system can execute the machine learning model to generate predicted energy values (e.g., energy prediction 177) and force vectors (e.g., force prediction 179) for the same input fragment and compare those predicted values to the simulation results stored in the training dataset. The data processing system can calculate a loss function that includes scalar deviations for energy predictions and vector deviations for force predictions. The data processing system can compute gradients of the loss function with respect to the parameters of the machine learning model (e.g., using back-propagation) and apply iterative parameter updates using an optimization algorithm such as stochastic gradient descent or Adam. For example, the data processing system can adjust the learned weight matrices of the message passing layers and the transformation matrices of the output heads in successive mini-batches of training records until the evaluated loss function stabilizes below a convergence tolerance. In some implementations, the data processing system can apply fine-tuning operations by updating only specific layers, such as the attention networks or the output heads, while maintaining fixed weights in the earlier embedding layers. For example, the data processing system can lock the learned representations in the atomic embedding layers and update only the force prediction head and the uncertainty prediction head in order to adapt the model to newly generated fragments without altering the underlying embeddings that generalize across chemical space.

The method 800, at ACT 806, can include executing a validation process. To do so, the data processing system can access a validation subset of the training dataset that was withheld from use during the parameter update process. The data processing system can provide fragments of the validation set to the machine learning model and obtain predicted per-atom energy values and three-component force vectors. The data processing system can compare those predictions against the reference values (e.g., simulation results 194) and compute error measures such as mean squared error for energy predictions and vector norm deviations for force predictions. In some implementations, the data processing system can calculate separate error statistics for high-uncertainty fragments and low-uncertainty fragments to evaluate whether fine-tuning adjustments improved performance across both categories. In some implementations, the data processing system can monitor the validation error across multiple evaluation epochs and store corresponding validation error metrics for each epoch. Validation error metrics may be generated at other points, according to hyperparameters of the training process.

The method 800, at ACT 808, can include determining whether convergence criteria are satisfied. The data processing system can compare validation error values obtained during ACT 806 against predefined criteria stored in configuration memory, which may include but are not limited to maximum loss tolerance values or plateau thresholds associated with a defined number of iterations. In some implementations, the data processing system can calculate a rolling average of validation mean squared error across multiple epochs and determine whether the average remains below a specified loss threshold. For example, the data processing system can compare a calculated energy prediction error of 0.008 electron volts against a configured cutoff of 0.01 electron volts and determine that the convergence condition is satisfied.

In some implementations, the data processing system can compare the relative change in gradient magnitude between consecutive training checkpoints to an improvement threshold, such as less than a 1% reduction, to detect whether model performance has plateaued. For example, when the validation loss decreases from 0.012 electron volts to 0.0119 electron volts across five iterations, the data processing system can determine that the performance improvement falls below the convergence tolerance and identify that the criteria are satisfied. If the criteria are not satisfied, the data processing system can execute ACT 810 to adapt the architecture of the machine learning model, whereas if the criteria are satisfied, the data processing system can execute ACT 812 to provide the current model state.

The method 800, at ACT 810, can include performing an architecture adaptation process when convergence criteria are not satisfied. As part of performing the architecture adaptation process, the data processing system can identify one or more hyperparameters of the machine learning model that affect architecture performance, such as the number of message passing layers, the dimensionality of embedding vectors, or the attention head count in the output layer. The data processing system can select new candidate hyperparameter sets either by random sampling of values within predefined ranges or by applying successive narrowing techniques in which prior trial results inform the next sampling interval. In some implementations, the data processing system can apply hyperparameter optimization techniques, for example, grid search or Bayesian optimization, to generate candidate configurations for layer depth, neuron width, or activation type.

For example, the data processing system can execute a random sampling procedure that can iteratively generate candidate machine-learning models, each with a different number of message passing iterations, and then train those models on a retained fragment dataset using the operations of ACTS 804-808 until a validation loss threshold is reached. In some implementations, the machine-learning model may be pre-trained using the operations described in connection with FIG. 7 prior to performing fine-tuning/updating according to the operations of ACTS 804-808. In another example, the data processing system can implement a successive halving procedure by generating a large initial set of hyperparameter combinations for embedding dimensionality, evaluating their performance on a preliminary training subset, discarding values that fail to reach a performance threshold, and retaining only top-performing candidates for complete retraining. The data processing system can select one of the resulting candidate architectures based on the lowest measured validation error relative to prior model states and replace the current architecture with the updated configuration before returning to the model parameter update process at ACT 804.

The method 800, at ACT 812, can include providing the model once the convergence criteria are satisfied. To do so, the data processing system can access the parameter weights and architecture state that resulted from the most recent parameter update and validation processes. The data processing system can store the parameter weights, architecture descriptors, and configuration metadata into one or more data structures to be stored/maintained in memory. The data processing system can then provide the machine-learning model for use in subsequent inference operations (e.g., the operations described in connection with FIG. 1).

Figure 11:
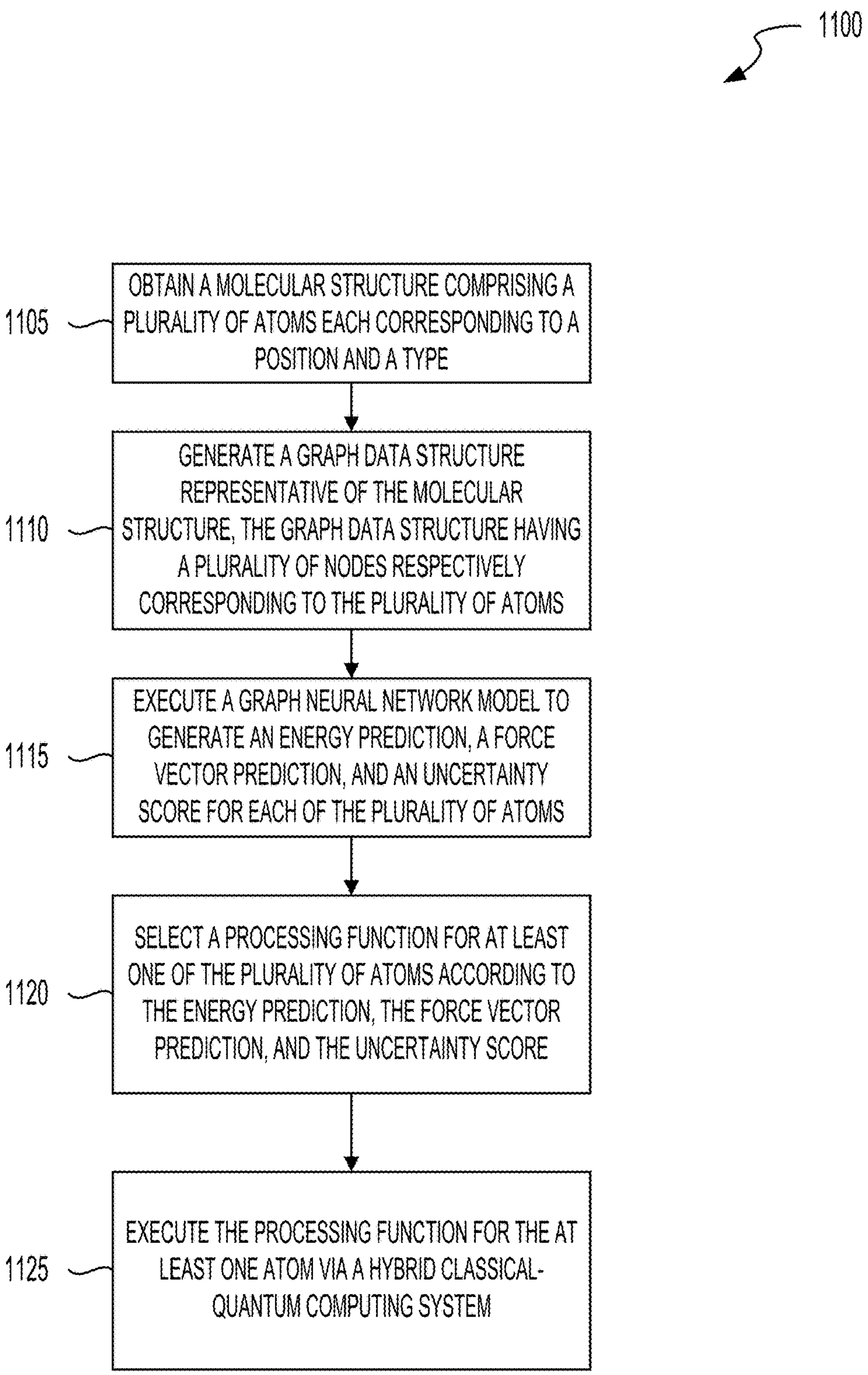
FIG. 11 illustrates a flow chart of a method for using machine learning models to generate per-atom uncertainty estimates for adaptive reaction network exploration, in accordance with one or more implementations.

Referring now to FIG. 11, illustrated is a method 1100 of using machine-learning models to generate per-atom uncertainty estimates for adaptive reaction network exploration. Although the following description of the method 1100 is described as being performed by the data processing system (e.g., the data processing system 105), it should be understood that the method 1100 may be performed by any one of the computing systems/devices described herein. In brief overview of the method 1100, the method 1100 can include obtaining a molecular structure comprising a plurality of atoms, each corresponding to a position and a type (ACT 1105), generating a graph data structure representative of the molecular structure, the graph data structure having a plurality of nodes respectively corresponding to the plurality of atoms (ACT 1110), executing a graph neural network model to generate an energy prediction, a force vector prediction, and an uncertainty score for each of the plurality of atoms (ACT 1115), selecting a processing function for at least one of the plurality of atoms according to the energy prediction, the force vector prediction, and the uncertainty score (ACT 1120), and executing the processing function for the at least one atom via a hybrid classical-quantum computing system (ACT 1125).

The method 1100, at ACT 1105, can include obtaining a molecular structure (e.g., molecular structure 170) comprising a plurality of atoms (e.g., atoms 172), each corresponding to a position and a type. To do so, any of the operations of the molecule obtainer 135 of FIG. 1 can be performed. In some implementations, any of the operations of the processes 500 and 600 of FIGS. 5 and 6 can be performed. In one example, the data processing system can receive atomic coordinate data and atom identity information from a file representation such as XYZ, PDB, or MOL2. In some implementations, the data processing system can parse the file to extract for each atom a Cartesian coordinate in three-dimensional space and an associated atomic type encoded as an integer atomic number or symbolic identifier. In some implementations, the data processing system can ingest structural metadata describing connectivity of atoms, solvent conditions, or thermodynamic ensemble state descriptors and associate those values with the molecular structure record to preserve the environment context for downstream processing, as described herein.

The method 1100, at ACT 1110, can include generating a graph data structure (e.g., graph data structure 175) representative of the molecular structure. To do so, any of the operations of the data structure generator 140 of FIG. 1 can be performed. The graph data structure can include a plurality of nodes respectively corresponding to the plurality of atoms of the molecular structure obtained in ACT 1105. In one example, the data processing system can generate a node in the graph data structure for each atom extracted, with the node storing node attributes such as atomic type, charge, hybridization flag, and/or aromaticity designation, as described herein. The data processing system can create a plurality of edges connecting pairs of nodes to represent bonding and/or proximity relationships between atoms, as described in connection with FIG. 1. In some implementations, each edge can be associated with an edge feature such as an interatomic distance calculated as a Euclidean norm between coordinates, a relative position vector describing displacement from one atom to the other, and/or a bond type categorical identifier such as single, double, triple, or aromatic. For example, the data processing system can determine that two atoms separated by less than a threshold distance are bonded, can assign them a single bond classification, and can create an edge record encoding both the bond type and the numerical distance. In some implementations, the data processing system can generate edges for non-bonded neighbors located within a defined radius and encode interatomic distance and angular alignment information as edge features.

The method 1100, at ACT 1115, can include executing a graph neural network model (e.g., the machine-learning model 160) to generate an energy prediction (e.g., energy prediction 177), a force vector prediction (e.g., force prediction 179), and an uncertainty score (e.g., uncertainty score 180) for each of the plurality of atoms. To do so, any of the operations described in connection with the model executor 155 of FIG. 1 can be performed. In some implementations, ACT 1115 can include performing any of the operations described in connection with FIGS. 2 and 3. The data processing system can provide the graph data structure as input to the graph neural network model, which can propagate messages along edges to update node embeddings via message passing operations, as described herein. In one example, the energy prediction can be generated as a scalar value associated with each atom that can be aggregated to obtain a molecular total.

In some implementations, the force vector prediction can be generated as a three-component vector per atom by applying rotationally equivariant transformations or by computing gradients of the predicted energy surface with respect to atomic coordinates, as described in connection with FIG. 3. The uncertainty score can be determined through multiple complementary methods, as described in connection with FIG. 1. In some implementations, the data processing system can generate the uncertainty score by applying parameter dropout during inference to create perturbed predictions and calculate ensemble prediction variance. In some implementations, the data processing system can compute gradients of predicted energies or forces with respect to the weights of the graph neural network model and determine the magnitudes of those gradients as sensitivity-based uncertainty scores. In some implementations, the data processing system can compare an embedding vector representing an atomic environment to a set of reference embeddings from the training dataset, calculate a distance metric such as Euclidean distance or cosine similarity, and incorporate that distance into the uncertainty score.

The method 1100, at ACT 1120, can include selecting a processing function (e.g., a processing function 186) for at least one of the plurality of atoms according to the energy prediction, the force vector prediction, and the uncertainty score. To do so, any of the operations described in connection with the model executor 155 of FIG. 1 can be performed. In some implementations, ACT 1120 can include performing any of the operations described in connection with FIGS. 9 and 12. In one example, the data processing system can cluster the atoms according to their uncertainty scores into a plurality of fragments, as described in connection with ACT 1215 of FIG. 12. Each fragment can be associated with an average uncertainty score (e.g., an average uncertainty score 184), as described herein.

The data processing system can classify the uncertainty score of each fragment and compare the score against a first threshold to decide whether the graph neural network prediction is sufficient or whether a higher-fidelity simulation is triggered. In some implementations, and as described in connection with FIG. 9, the data processing system can assign the fragment to be simulated using a quantum computing function (e.g., a processing function 186) when the uncertainty score exceeds a first threshold. In some implementations, the data processing system can direct the fragment to be simulated using a classical computing function when the uncertainty score fails to exceed the first threshold. In other implementations, the data processing system can apply a second threshold and assign a fragment with an uncertainty score between the first and second thresholds to a high-accuracy classical method such as coupled cluster singles and doubles with perturbative triples [CCSD(T)]. In another example, the data processing system can assign a fragment to be simulated using a hybrid quantum-classical operation, as described herein.

The method 1100, at ACT 1125, can include executing the processing function for the at least one atom via a hybrid classical-quantum computing system. To do so, any of the operations described in connection with the model executor 155 of FIG. 1 can be performed. In some implementations, ACT 1125 can include performing any of the operations described in connection with FIGS. 9 and 12. In one example, the data processing system can segment the molecular structure of the fragment including the at least one atom into a quantum region and an environment region, transmit an encoded Hamiltonian of the quantum region to a quantum processing unit (e.g., a quantum system 132 of the distributed computing environment 120) to perform an eigensolver calculation, and concurrently execute classical approximation routines such as density functional theory or force field propagation on the environment region. In some implementations, the data processing system can use boundary treatments such as capping open bonds with hydrogen link atoms, freezing orbitals at the edges of the quantum region, and fitting point charges to represent the electrostatic potential of the classical environment, as described herein.

Figure 12:
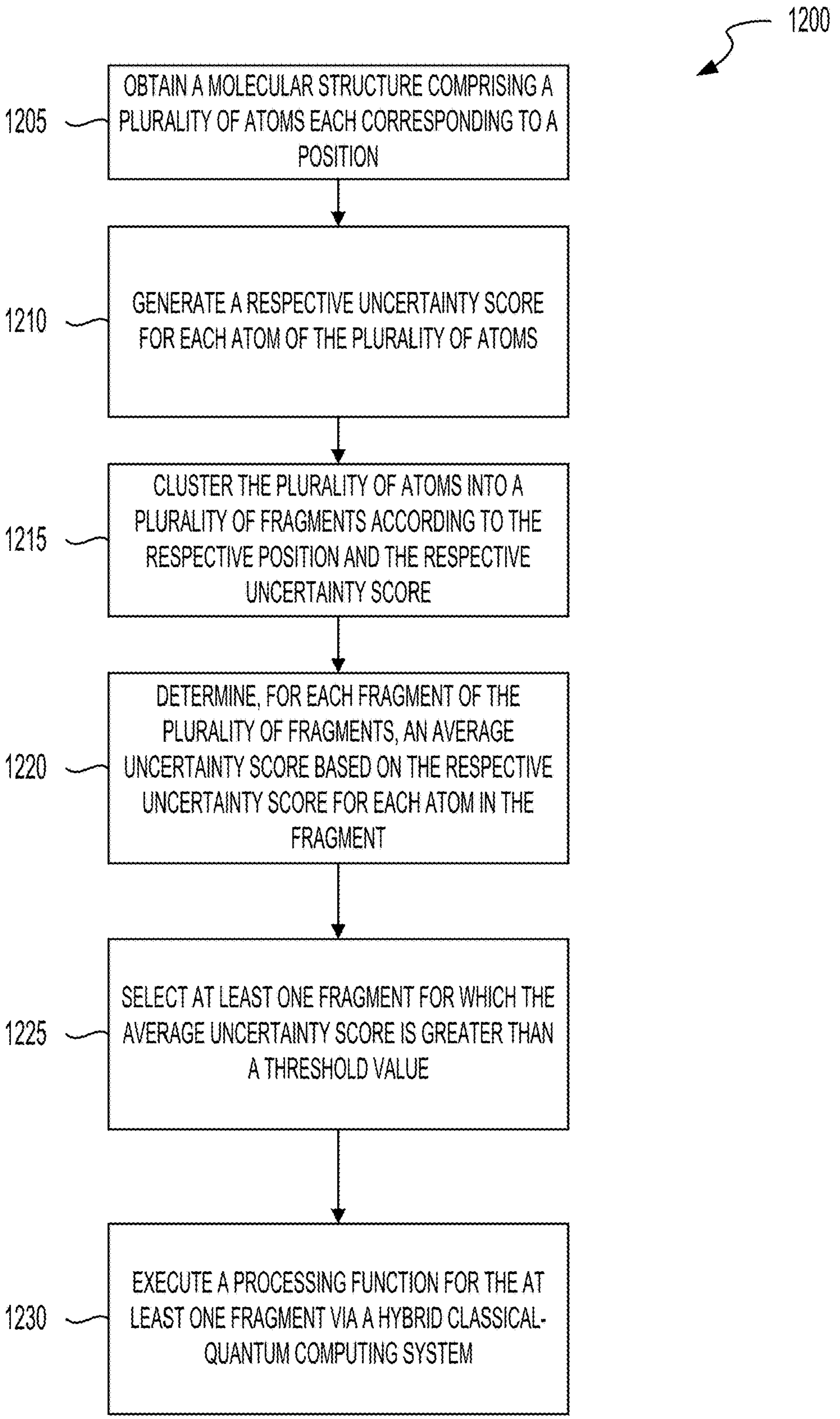
FIG. 12 illustrates a flow chart of a method for fragment generation based on uncertainty scores for adaptive reaction network exploration, in accordance with one or more implementations.

Referring now to FIG. 12, illustrated is a method 1200 of fragment generation based on uncertainty scores for adaptive reaction network exploration. Although the following description of the method 1200 is described as being performed by the data processing system (e.g., the data processing system 105), it should be understood that the method 1200 may be performed by any one of the computing systems/devices described herein. In brief overview of the method 1200, the method 1200 can include obtaining a molecular structure comprising a plurality of atoms each corresponding to a position (ACT 1205), generating a respective uncertainty score for each atom of the plurality of atoms (ACT 1210), clustering the plurality of atoms into a plurality of fragments according to the respective position and the respective uncertainty score (ACT 1215), determining for each fragment an average uncertainty score based on the respective uncertainty scores of the atoms in the fragment (ACT 1220), selecting at least one fragment for which the average uncertainty score is greater than a threshold value (ACT 1225), and executing a processing function for the at least one fragment via a hybrid classical-quantum computing system (ACT 1230).

The method 1200, at ACT 1205, can include obtaining a molecular structure (e.g., molecular structure 175) comprising a plurality of atoms (e.g., atoms 175) each corresponding to a position. To do so, any of the operations described in connection with the molecule obtainer 135 of FIG. 1 can be performed. In some implementations, ACT 1205 can include performing any of the operations described in connection with FIGS. 5 and 6. To do so, the data processing system can access input conformer data generated via one or more conformer generation processes, received from an external computing system through an API, received via operator input to the data processing system, and/or from any other sources of data described herein. As described herein, the data processing system can parse the input structure stored in a format such as XYZ, PDB, or MOL2 to extract the identity of each atom and its corresponding three-dimensional Cartesian coordinates.

In some implementations, the data processing system can access metadata associated with the molecular structure such as atom charge state, spin multiplicity, solvent model identifiers, and/or crystallographic environment descriptors. For example, the data processing system can obtain a record specifying a carbon atom with coordinates (x1, y1, z1), a spin multiplicity of two, and a partial charge of −0.25. The data processing system may store the resulting values in a temporary data structure that indexes each atom of the plurality of atoms with a numeric identifier and associates its position and type for downstream processing operations. In some implementations, the data processing system can generate a graph data structure (e.g., a graph data structure 175) representing the molecular structure.

The method 1200, at ACT 1210, can include generating a respective uncertainty score (e.g., uncertainty score 180) for each atom of the plurality of atoms. To do so, the data processing system may execute any of the operations of the model executor 145 of FIG. 1. In one example, the data processing system can provide the graph data structure generated for the molecular structure as input to a graph neural network model (e.g., the machine learning model 160). The data processing system can propagate node and edge descriptors through multiple message passing iterations and generate distinct output heads that yield per-atom values for energy and force. The data processing system can execute the operations of FIG. 11 to derive the uncertainty scores for each atom. For example, the data processing system can generate an uncertainty score using parameter dropout, where weights of the graph neural network are randomly zeroed during multiple forward passes and the variance in predictions is calculated as the score.

In another example, the data processing system can calculate a gradient of a predicted energy value or force vector with respect to network parameters and determine the L2 norm of such gradient values as a sensitivity-based uncertainty score. In another example, the data processing system can determine a distance between the embedding vector corresponding to an atomic environment and embedding vectors stored from training dataset atoms, and use that distance as part of the uncertainty score. In some implementations, the data processing system can combine ensemble variance, gradient sensitivity, and embedding distance into a weighted composite value that can be stored in association with the atom to serve as the uncertainty score.

The method 1200, at ACT 1215, can include clustering the plurality of atoms into a plurality of fragments (e.g., fragments 182) according to the respective position and the respective uncertainty score. To do so, the data processing system may execute any of the operations of the model executor 145 and/or the processing allocator 150 of FIG. 1. For example, the data processing system can retrieve the uncertainty score and position coordinates for each atom and forming composite feature vectors that are processed by a clustering algorithm. In some implementations, the data processing system can cluster the atoms according to a k-means function where each atom is iteratively assigned to one of k centroids initialized in the joint uncertainty-position space. In some implementations, the data processing system can cluster the atoms according to a k-nearest neighbors function where high-uncertainty atoms are treated as seeds and neighboring atoms within a defined Euclidean and uncertainty distance are recursively added. In some implementations, the data processing system can cluster the atoms according to a cluster radius configuration by defining a numerical threshold in the spatial coordinate space and aggregating atoms into a fragment if they fall within that radius of a seed atom. The data processing system may store the atom indices of each cluster together with identifiers linking them to the parent molecular structure, preserving references for downstream uncertainty score operations.

The method 1200, at ACT 1220, can include determining for each fragment an average uncertainty score (e.g., the uncertainty score 184) based on the respective uncertainty scores (e.g., uncertainty scores 180) of the atoms in the fragment. To do so, the data processing system may execute any of the operations of the model executor 145 of FIG. 1. For example, the data processing system can access the uncertainty score stored for each atom in the fragment generated at ACT 1215, summing the values of the uncertainty scores, and dividing by the atom count of that fragment. For example, when a fragment contains four atoms with uncertainty scores of 0.12, 0.14, 0.09, and 0.10, the data processing system can calculate the total as 0.45 and divide by four to yield an average uncertainty score of 0.1125. In some implementations, the data processing system can determine a maximum uncertainty score of the fragment by accessing all atom-level uncertainty values and selecting the largest value among them. In some implementations, the data processing system can determine a variance by computing the mean of the uncertainty scores and dividing the squared deviations from the mean by the number of atoms in the fragment. The resulting values can be referenced in fragment selection operations that occur in later ACTs of the method 1200.

The method 1200, at ACT 1225, can include selecting at least one fragment for which the average uncertainty score is greater than a threshold value. To do so, the data processing system may execute any of the operations of the processing allocator 150. In some implementations, ACT 1225 can include performing any of the operations described in connection with FIGS. 9 and 10. For example, the data processing system can compare the average uncertainty scores to one or more configured threshold values. In some implementations, the data processing system can implement a two-threshold system where a first threshold is used to determine whether refinement is required and a second threshold is used to determine whether a fragment is routed to a quantum computing system. In some implementations, the data processing system can select a fragment for processing using a high-accuracy classical computing function when the fragment average uncertainty score is greater than the first threshold but less than the second threshold. In some implementations, the data processing system can select a fragment for processing by a quantum computing system when the fragment average uncertainty score is greater than the second threshold. In some implementations, the data processing system can assign a fragment for simulation via a hybrid quantum-classical processing function in response to determining that the fragment average uncertainty score is greater than the first threshold but less than the second threshold. In some implementations, the data processing system can compare the number of atoms in a fragment to the maximum number of atoms processable on a quantum processing unit and reject fragments exceeding such limits from quantum assignment.

The method 1200, at ACT 1230, can include executing a processing function (e.g., a processing function 186) for the at least one fragment via a hybrid classical-quantum computing system (e.g., the distributed computing environment 120). To do so, the data processing system may execute any of the operations of the processing allocator 150 of FIG. 1. In some implementations, ACT 1230 can include performing any of the operations described in connection with FIGS. 9 and 10. The data processing system can communicate selected fragments to a quantum computing system 132, a classical computing system 130, or a hybrid execution path (e.g., via corresponding quantum and classical tasks). In some implementations, the data processing system can simulate the fragment using a quantum circuit selected according to a topology of a quantum processing unit.

In one example, the data processing system can select a VQE circuit when the circuit depth predicted from the Hamiltonian is within qubit fidelity constraints, and can select a fragmented VQE or classical fallback when the depth exceeds thresholds. In some implementations, the data processing system can apply error-mitigation techniques such as zero-noise extrapolation or post-selection of measurement outcomes before generating per-atom fragment energies and/or per-atom force vectors. For example, the data processing system can execute the same variational circuit multiple times with scaled two-qubit gate counts, plot the corresponding energy values against the noise scale, and extrapolate back to a zero-noise value as the refined result. The processed outputs can be recorded for use in various training operations described herein.

Figure 13:
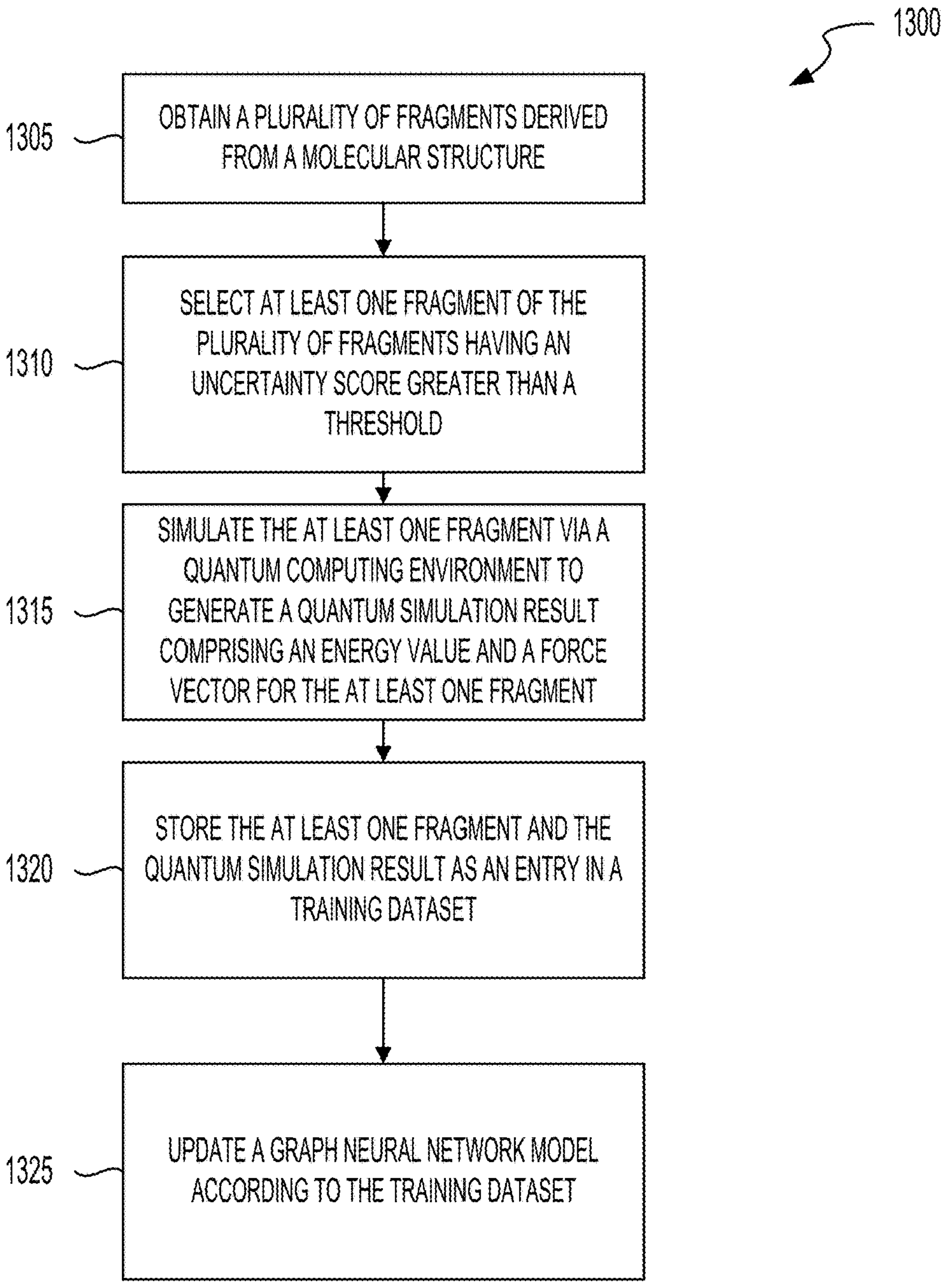
FIG. 13 illustrates a flow chart of a method for updating machine learning models using output from quantum systems for adaptive reaction network exploration, in accordance with one or more implementations.

Referring now to FIG. 13, illustrated is a method 1300 of updating machine-learning models using output from quantum systems for adaptive reaction network exploration. Although the following description of the method 1300 is described as being performed by the data processing system (e.g., the data processing system 105), it should be understood that the method 1300 may be performed by any one of the computing systems/devices described herein. In brief overview of the method 1300, the method 1300 can include obtaining a plurality of fragments derived from a molecular structure (ACT 1305), selecting at least one fragment having an uncertainty score greater than a threshold (ACT 1310), simulating the selected fragment using a quantum computing environment to generate a quantum simulation result (ACT 1315), storing the fragment and quantum simulation result in a training dataset (ACT 1320), and updating a graph neural network model according to the training dataset (ACT 1325).

The method 1300, at ACT 1305, can include obtaining a plurality of fragments derived from a molecular structure. To do so, any of the operations of the model executor 145 and/or the processing allocator 150 of FIG. 1 can be performed. In some implementations, ACT 1305 can include performing any of the operations described in connection with FIG. 12. As part of this operation, the data processing system can first obtain a molecular structure (e.g., the molecular structure 170) and generate a graph data structure (e.g., graph data structure 175) that encodes node attributes corresponding to atoms and edge attributes corresponding to interatomic relationships of the molecular structure. The data processing system can generate a respective uncertainty score for each atom according to one or more of the techniques described in FIG. 11, and use those values with spatial position information to cluster atoms into a plurality of fragments. In some implementations, the data processing system can apply k-means clustering, k-nearest-neighbor clustering, or radius-based grouping to identify a subset of contiguous atoms whose coordinates and uncertainty measures satisfy defined thresholds. For example, the data processing system can select atoms with closely spaced coordinates and uncertainty scores above a baseline value, group them into a unit, and store this set of atom indices as a fragment. By repeating such operations across the molecular structure, the data processing system can generate the plurality of fragments, each with a corresponding aggregate uncertainty value calculated from the per-atom scores. In some implementations, the fragments and corresponding may be obtained from other data sources (e.g., API requests, inter-process communication, operator input, repositories/databases, etc.). Uncertainty scores may be provided with fragments and/or generated according to the techniques described in connection with FIGS. 11 and 12.

The method 1300, at ACT 1310, can include selecting at least one fragment having an uncertainty score greater than a threshold. To do so, any of the operations described in connection with the processing allocator 150 of FIG. 1 can be performed. In some implementations, ACT 1310 can include performing any of the operations described in connection with FIGS. 9 and 12. The data processing system can compare each fragment's uncertainty score against a first threshold to determine whether it requires refinement. The data processing system can additionally compute a second threshold value and classify fragments according to whether their scores are below the first threshold, between the first and second thresholds, or greater than the second threshold. For example, a fragment with a score below the first threshold can be retained at the machine-learning prediction level and/or a fallback classical operation, a fragment with an intermediate score can be directed to a high-accuracy classical simulation function and/or a hybrid quantum-classical function, and a fragment above the second threshold can be assigned to a quantum simulation function. In this way the data processing system can select one or more fragments for quantum processing, and can also select one or more other fragments for classical high-accuracy processing, depending on the relationship of the uncertainty score to both thresholds.

The method 1300, at ACT 1315, can include simulating the selected fragment using a quantum computing environment (e.g., a distributed computing environment 120, a quantum computing system 132) to generate a quantum simulation result (e.g., simulation results 194). To do so, any of the operations described in connection with the processing allocator 150 and/or the quantum computing systems 132 of FIG. 1 can be performed. In some implementations, ACT 1315 can include performing any of the operations described in connection with FIGS. 9 and 10. In one example, the data processing system can instantiate a Hamiltonian representation for the selected fragment that includes electron kinetic energy, electron-nuclear attraction terms, and electron-electron repulsion terms. The data processing system can select a candidate quantum algorithm from a plurality of candidate quantum algorithms based on accuracy ranking and resource compatibility, such as quantum phase estimation when qubits are available, VQE for moderate sizes, and/or fragmented VQE when circuit depth constraints are exceeded. In one example, the data processing system can map the fragment orbitals to qubits of the quantum computing system and compile a circuit encoding the Hamiltonian into operations in Pauli operator form. In some implementations, the data processing system can apply one or more error mitigation functions, such as zero-noise extrapolation or symmetry-based post-selection, prior to using the output as the quantum simulation result. The generated result can include a total energy value and per-atom force vectors for the fragment at quantum-level accuracy, accessed by the data processing system and prepared for storage.

The method 1300, at ACT 1320, can include storing the fragment (e.g., as an input fragment 192) and quantum simulation result (e.g., simulation results 194) in a training dataset (e.g., a training dataset 190). To do so, any of the operations described in connection with the storage 115 of FIG. 1 can be performed. In some implementations, ACT 1320 can include performing any of the operations described in connection with FIG. 6. The data processing system can generate a record containing the atomic coordinates, atom types, and connectivity of the fragment, as well as the quantum simulation result including ground state energy and per-atom force vectors. In some implementations, the fragment may be stored in a graph data structure format. In some implementations, the data processing system can store additional metadata values associated with the entry, including the molecular configuration of the fragment, the associated uncertainty score used for selection, and/or simulation parameters (e.g., basis set, cutoff thresholds, etc.). In some implementations, the data processing system can restrict storage of one or more fragment when it is determined that the fragment is chemically equivalent to another fragment already stored in the training dataset, by comparing structural descriptors and/or embeddings, as described herein. For second fragments simulated using classical approaches, the data processing system can store the input fragment and classical simulation result as additional entries in the training dataset. Such entries can include, for example, results from coupled cluster or multi-configurational self-consistent field calculations along with corresponding force vector outputs.

The method 1300, at ACT 1325, can include updating a graph neural network model (e.g., the machine-learning model 160) according to the training dataset. To do so, any of the operations of the model updater 155 of FIG. 1 can be performed. In some implementations, ACT 1325 can include performing any of the operations described in connection with FIGS. 7 and 8. The data processing system can access pairs of fragments and simulation results stored in the training dataset and calculate loss values between predicted energies and forces (e.g., energy predictions 177, force predictions 179, etc.) from the graph neural network model and the corresponding simulation outputs. In some implementations, the data processing system can train/retrain/update/fine-tune the model once a number of entries in the training dataset exceeds a defined threshold. For example, when the dataset accumulates 500 new high-uncertainty fragment entries, the data processing system can initiate transfer learning procedures from current weights and apply gradient updates using the new simulation results. The updated graph neural network model can be fine-tuned with weighted losses that emphasize forces or energies depending on fragment environment characteristics. In some implementations, the data processing system can evaluate performance of the updated graph neural network model against a validation dataset that includes fragments not present in the training dataset, compute error statistics such as mean squared error on energy or force predictions, and retain the updated parameter set when convergence criteria are satisfied, as described in connection with FIG. 8. Once trained, the updated graph neural network can be used in connection with subsequent inference operations.

Figure 14:
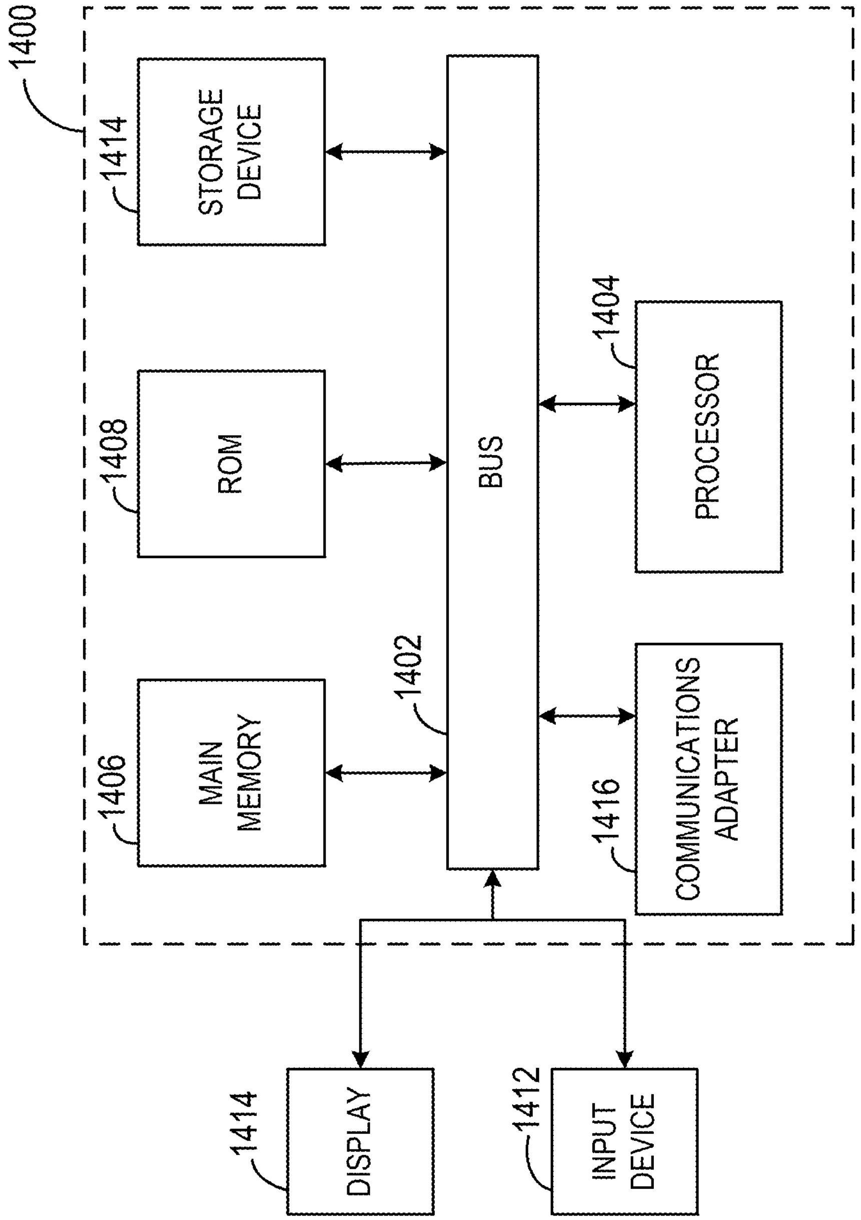
FIG. 14 is a block diagram illustrating an example computing system architecture suitable for implementing components of a hierarchical quantum-classical scheduling system, in accordance with one or more implementations.

FIG. 14 is a component diagram of an example computing system suitable for use in the various implementations described herein, according to an example implementation. For example, the computing system 1400 may implement the data processing system 145, one or more of the classical systems 130, the classical computing system 1528, or various other example systems and devices described in the present disclosure.

The computing system 1400 includes a bus 1402 or other communication component for communicating information and a processor 1404 coupled to the bus 1402 for processing information. The computing system 1400 also includes main memory 1406, such as a RAM or other dynamic storage device, coupled to the bus 1402 for storing information, and instructions to be executed by the processor 1404. Main memory 1406 can also be used for storing position information, temporary variables, or other intermediate information during execution of instructions by the processor 1404. The computing system 1400 may further include a ROM 1408 or other static storage device coupled to the bus 1402 for storing static information and instructions for the processor 1404. A storage device 1410, such as a solid-state device, magnetic disk, or optical disk, is coupled to the bus 1402 for persistently storing information and instructions.

The computing system 1400 may be coupled via the bus 1402 to a display 1414, such as a liquid crystal display, or active-matrix display, for displaying information to a user. An input device 1412, such as a keyboard including alphanumeric and other keys, may be coupled to the bus 1402 for communicating information, and command selections to the processor 1404. In another implementation, the input device 1412 has a touch screen display. The input device 1412 can include any type of biometric sensor, or a cursor control, such as a mouse, a trackball, or cursor direction keys, for communicating direction information and command selections to the processor 1404 and for controlling cursor movement on the display 1414.

In some implementations, the computing system 1400 may include a communications adapter 1416, such as a networking adapter. Communications adapter 1416 may be coupled to bus 1402 and may be configured to enable communications with a computing or communications network or other computing systems. In various illustrative implementations, any type of networking configuration may be achieved using communications adapter 1416, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 1400 in response to the processor 1404 executing an implementation of instructions contained in main memory 1406. Such instructions can be read into main memory 1406 from another computer-readable medium, such as the storage device 1410. Execution of the implementation of instructions contained in main memory 1406 causes the computing system 1400 to perform the illustrative processes described herein. One or more processors in a multi-processing implementation may also be employed to execute the instructions contained in main memory 1406. In alternative implementations, hard-wired circuitry may be used in place of or in combination with software instructions to implement illustrative implementations. Thus, implementations are not limited to any specific combination of hardware circuitry and software.

Figure 15:
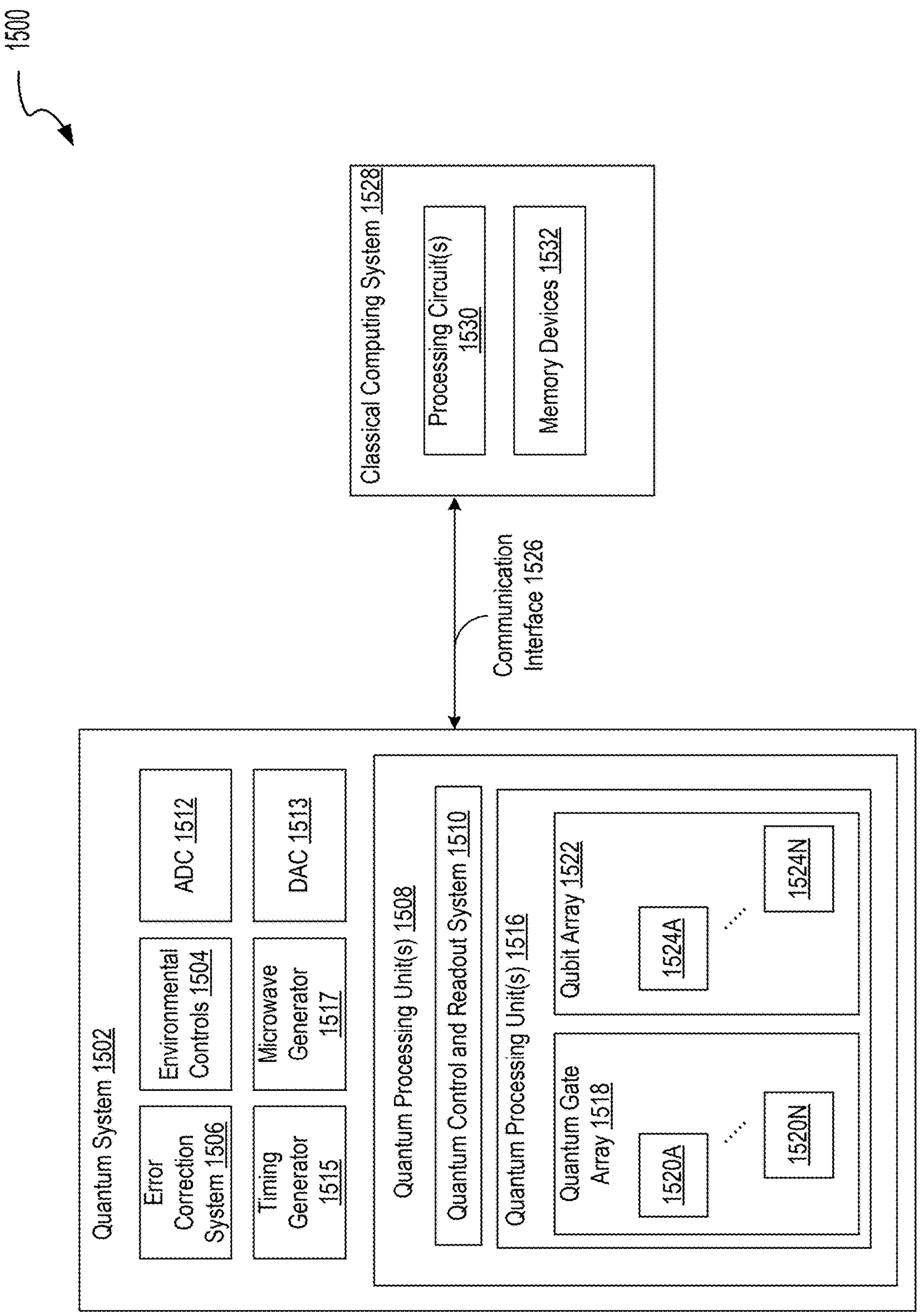
FIG. 15 is a block diagram illustrating the architecture of a hybrid quantum-classical computing system including quantum and classical subsystems and their interconnections, in accordance with one or more implementations.

Referring now to FIG. 15, illustrated is a block diagram of an example quantum system 1500 including a quantum system 1502 integrated with a classical computing system 1528, in accordance with one or more implementations. The quantum system 1502 can include environmental controls 1504, a quantum error correction system 1506, at least one analog-to-digital converter 1512, at least one digital-to-analog converter 1513, a timing generator 1515, a microwave generator 1517, and at least one quantum device 1508, at least one quantum control and readout system 1510, at least one quantum processing unit 1516, at least one quantum gate array 1518, one or more quantum gate elements 1520A-1520N, at least one qubit array 1522, and one or more qubits 1524A-1524N. The system 1500 can further include at least one communication interface 1526. The system 1500 can include a computing system 1528, which can include one or more processing circuits 1530 and one or more memory devices 1532.

The system 1500 or portions thereof may be provided in a controlled environment. For example, the ambient environment can correspond to a controlled environment having an ambient temperature near room temperature (e.g., 60 degrees Fahrenheit (° F.) to 80° F., etc.). The ambient environment is not limited to the range of room temperatures. For example, the ambient environment of the qubit array 1522 can correspond to an environment having a temperature within the range of 0 Kelvin (K) to 150 K, corresponding to a superconducting temperature ambient environment.

The classical computing system 1528 can include at least one processor and a memory (e.g., a processing circuit). The classical computing system 1528 may be used to implement one or more of the classical systems 130 of FIG. 1. The memory can store processor-executable instructions that, when executed by processor(s), cause the processor(s) to perform one or more of the operations described herein. The processing circuit(s) 1530 may include a general-purpose processor (e.g., a CPU, etc.), an ASIC, a GPU, a TPU, an FPGA, the like, or combinations thereof. The memory may include, but is not limited to, electronic, optical, magnetic, or any other storage or transmission device capable of providing the processor with program instructions. The memory devices 1532 may further include a high-speed memory device (e.g., high-bandwidth memory devices, high-bandwidth RAM/VRAM, etc.), memory chips, ASIC, FPGA, ROM, RAM, EEPROM, EPROM, flash memory, optical media, and/or any other suitable memory from which the processor(s) can read instructions and/or data. The instructions may include code from any suitable computer programming language. The classical computing system 1528 can include one or more computing devices or servers that can perform various functions as described herein. The classical computing system 1528 can include any or all of the components and perform any or all of the functions of any computing system described herein.

The quantum computing system 1500 can include at least one communication interface 1526. The communication interface 1526 can be used to exchange information between components of the quantum system 1502 and the classical computing system 1528. The communication interface 1526 can facilitate the transmission of instructions, signals, status information, conditions, states, and any other information necessary for coordinating tasks and operations across the quantum and classical subsystems. This interface can include one or more digital, analog, or similar communication channels. The communication interface 1526 can include all connections, protocols, and supporting hardware or software to implement communication between the classical and quantum parts of the system, allowing for hybrid computational workflows.

The quantum computing system 1500 can include the quantum system 1502. The quantum system 1502 may be used to implement any of the quantum system(s) 132 of FIG. 1. The quantum system 1502 can be configured to provide the physical infrastructure necessary for quantum information processing and execution of quantum algorithms. The quantum system 1502 can include components and subsystems required to support quantum operations and establish the proper physical environment for the operation of quantum processing elements. In some implementations, the quantum system 1502 can be coupled to the environmental controls 1504 and the quantum error correction system 1506 to maintain appropriate operational conditions and support reliable quantum circuit execution. The quantum system 1502 can interoperate with the quantum control and readout system 1510 and can be interfaced, via the communication interface 1526, with the classical computing system 1528. The quantum system 1502 can include one or more environmental controls 1504.

The quantum system 1502 can include one or more environmental controls 1504. The environmental controls 1504 can be configured to maintain precise physical conditions necessary for stable and reliable quantum operations. The environmental controls 1504 can comprise a range of subsystems designed to regulate factors such as temperature, pressure, humidity, magnetic fields, electromagnetic interference, and radiation, all of which can affect the performance and coherence time of quantum devices. For example, in superconducting quantum processors, environmental controls 1504 can include cryogenic refrigeration units or dilution refrigerators that cool the quantum hardware to millikelvin temperatures to enable superconductivity and minimize thermal noise. In trapped ion or neutral atom systems, environmental controls 1504 can encompass vacuum chambers to minimize atomic collisions and laser stabilization systems to control various optical devices.

In some implementations, in addition to temperature and pressure regulation, the environmental controls 1504 can incorporate active magnetic shielding to prevent external fields from disturbing qubit operations, as well as vibration isolation platforms to reduce mechanical noise. These control systems may be controlled by controllers or integrated electronics. The integration of environmental controls 1504 within the quantum system 1502 can support achieving low error rates and consistent quantum circuit execution in the quantum computing system 1500.

The quantum system 1502 can include a quantum error correction system 1506. The quantum error correction system 1506 can be a system configured to detect and correct errors arising during quantum computation or storage. The quantum error correction system 1506 can consist of dedicated circuits, hardware modules, or physical subsystems, as well as supporting software, that are designed to implement error correction protocols, such as surface codes, concatenated codes, or other stabilizer codes, in order to preserve the fidelity of quantum states and protect against decoherence, gate errors, or environmental noise. Hardware suitable for quantum error correction can encompass ancillary qubits, syndrome measurement circuits, control electronics, and real-time feedback systems, while error correction software can execute operations for syndrome extraction, error diagnosis, and corrective feedback. In some implementations, the quantum error correction system 1506 can include cryogenic controllers, programmable logic devices, and/or firmware to facilitate the detection and correction of quantum errors.

The analog-to-digital converter 1512 can receive analog measurement signals generated by the quantum control and readout system 1510 and can convert the received analog signals into corresponding digital data. The analog-to-digital converter 1512 can sample the analog input at a predetermined rate and can generate digital output values that represent the amplitude or phase of the measurement signal at each sample point. In some implementations, the analog-to-digital converter 1512 can store the generated digital data in memory devices 1532 or can transmit the digital data to the classical computing system 1528 for subsequent processing, storage, or calibration analysis.

The digital-to-analog converter 1513 can receive digital control data from the classical computing system 1528 or the quantum control and readout system 1510 and can convert the received digital data into corresponding analog control signals. The digital-to-analog converter 1513 can generate analog voltage or current signals that are applied to the quantum processing unit 1516 to implement control operations such as qubit drive, flux bias, or readout pulse generation. In some implementations, the digital-to-analog converter 1513 can adjust the amplitude, frequency, or phase of the analog output according to the digital input values of the control and readout system 1510.

The timing generator 1515 can generate timing reference signals that coordinate the operation of the quantum processing unit 1516, the quantum control and readout system 1510, and the classical computing system 1528. The timing generator 1515 can produce clock signals, trigger pulses, or synchronization markers that define the timing of control pulses, measurement windows, or calibration experiments. In some implementations, the timing generator 1515 can store timing configuration data in memory devices 1532 or can receive timing instructions to align calibration operations with processor activity.

The microwave generator 1517 can generate microwave signals used to implement control pulses for qubit operations in the quantum processing unit 1516. The microwave generator 1517 can produce signals at specified frequencies, amplitudes, and phases according to control instructions received from the classical computing system 1528 or the calibration controller. In some implementations, the microwave generator 1517 can modulate the generated signals to produce shaped pulses for gate operations, readout, or calibration experiments, and can transmit the microwave signals to the quantum processing unit 1516 via a drive line controller or other signal routing hardware.

The quantum system 1502 can include at least one quantum device 1508. The quantum device 1508 can be configured to perform quantum computations by executing quantum circuits and manipulating quantum information. The quantum device 1508 can serve as the primary computational element within the quantum system 1502, orchestrating the application of quantum gates, qubit operations, and measurement processes required by quantum algorithms. The quantum device 1508 can be composed of specialized physical subsystems, such as superconducting resonators, trapped-ion arrays, photonic circuits, semiconductor quantum dots, neutral atom arrays, topological qubits, or other device architectures capable of realizing and controlling qubit states. In some implementations, the quantum device 1508 can interact with quantum control and readout system 1510 to receive gate instructions, perform operations at the hardware level, and provide measurement results to the classical computing system 1528. The quantum device 1508 can also be integrated with the quantum error correction system 1506, the quantum memory 1514, and the quantum gate array 1518 within the quantum system 1502 to enable reliable, high-fidelity execution of quantum algorithms in the quantum computing system 1500.

The quantum device 1508 can include a quantum control and readout system 1510. The quantum control and readout system 1510 can manipulate and measure quantum states within the quantum system 1502. The quantum control and readout system 1510 can generate and deliver control signals, such as microwave pulses, laser fields, or voltage pulses, by receiving timing references from the timing generator 1515, analog signals from the digital-to-analog converter 1513, and microwave signals from the microwave generator 1517. The quantum control and readout system 1510 can facilitate the implementation of quantum gates, entanglement protocols, and qubit initialization necessary for quantum algorithm execution by coordinating the sequencing and timing of control pulses with the timing generator 1515. The quantum control and readout system 1510 can coordinate the timing and sequencing of these operations with high precision via the other components of the quantum system 1502. In some implementations, the quantum control and readout system 1510 can receive digital control data from the classical computing system 1528, convert the data to analog signals using the digital-to-analog converter 1513, and deliver the resulting pulses to the quantum device 1508. In addition, the quantum control and readout system 1510 may facilitate qubit initialization to specified states (e.g., |0>, |+>), as well as the measurement of specific qubits or quantum registers, such as the most significant qubits or all relevant outputs, measuring expectation values, bitstring outcomes, or the full quantum register state.

In addition to control, the quantum control and readout system 1510 can perform high-fidelity measurement and readout of qubit states, converting quantum information into classical data that can be further processed by the classical computing system 1528. The measurement systems can vary by technology, including, but not limited to, microwave resonators, lasers, photonic, or single-photon detectors. The quantum control and readout system 1510 can receive analog measurement signals from the quantum device 1508, amplify and filter the signals, and digitize the measurement data using the analog-to-digital converter 1512 to obtain accurate and reliable state information following quantum operations or quantum circuit execution. The quantum control and readout system 1510 can interface with the classical control electronics 1532 to facilitate the transfer of measurement results and control data between quantum and classical subsystems.

The quantum device 1508 can include at least one quantum processing unit 1516. The quantum processing unit 1516 can include a logical or physical arrangement of quantum gates and qubits designed to execute specific quantum algorithms or operations. The quantum processing unit 1516 can define the sequence and connectivity of quantum gate elements, such as single-qubit operations or multi-qubit entangling operations, which act on the qubit array 1522 to manipulate quantum states according to a task. The configuration and parameters of the quantum processing unit 1516 can include operational parameters or specific gate configurations.

The quantum processing unit 1516 can include one or more qubits 1524A-1524N. The qubits 1524 can function as the fundamental units of quantum information, each capable of being realized using various quantum technologies. The qubits 1524 can be implemented using superconducting circuits, trapped ions, photonic platforms, semiconductor quantum dots, neutral atom arrays, or other physical systems. The qubits 1524 can be initialized to a specific state, such as $|0\rangle$ or $|1\rangle$, a point on a Bloch sphere, or to other suitable state such as $|+\rangle$ or $|-\rangle$. The qubits 1524 can also be prepared in a superposition of these states, such as $|\psi\rangle=\alpha|0\rangle+\beta|1\rangle$, where a and p represent amplitudes. The qubits 1524 can exist in standalone states or in entangled states with other qubits. Other characteristics of the qubits, such as coherence time, control fidelity, and error rates, can influence the execution of quantum operations and the design of error correction protocols.

The qubit 1524 can store information in various forms, such as a state vector, density matrix, or probability distribution. The qubit 1524 can support representation in multiple bases including, but not limited to, Z or computational, X or Hadamard, or Pauli-Y bases. A system of qubits can collectively represent the state of the quantum circuit, including configurations for advanced algorithms. In some implementations, during quantum processing, qubits in superposed and entangled states can exist and be manipulated via quantum gates. In some implementations, measurement of one or more qubits (e.g., qubits in a superposition state) by the measurement system will collapse the qubit into a defined state following the principles of quantum mechanics including wave function collapse and the observer effect. The measurement and sometimes collapse of a qubit state can result in a quantum state that is available for classical or further quantum processing.

The quantum processing unit 1516 can include at least one qubit array 1522 composed of one or more qubits 1524A-1524N. The qubit array 1522 can be organized into one or more quantum registers. Each quantum register can serve as a collection of qubits for computation, storage, or manipulation within the quantum processing unit 1516. Quantum registers and/or qubits in the qubit array 1522 can be actively addressed and controlled by the quantum gate array 1518 and associated gate elements 1520A-1520N during the execution of quantum algorithms, facilitating various computational tasks. In some implementations, the quantum memory 1514 may be used in conjunction with the qubit array 1522 to store the state of quantum registers at various points, such as when not actively in use. In some implementations, the qubit array 1522 can store a quantum state and can be prepared in various basis states or superpositions in accordance with principles of quantum mechanics. Each qubit in the array can support initialization to specific states and may be configured to store any representation of a quantum state, such as a probability distribution, vector, or density matrix.

The quantum processing unit 1516 can include one or more quantum gate elements 1520A-1520N in at least one quantum gate array 1518. The quantum gate elements 1520 can implement various quantum operations. For example, the quantum gate elements 1520 can include single-input quantum gates, such as Pauli-X (X), Pauli-Y (Y), Pauli-Z (Z), Hadamard (H), T, or RY/RZ rotation gate, as well as multiple-input gates like the controlled-NOT (CNOT) gates. Each quantum gate element can correspond to any quantum operator required by the circuit and may function in accordance with stored or received instructions. The gate elements 1520 can act on entangled or non-entangled qubits, support the formation of quantum registers, and be dynamically grouped as required by the algorithm.

The quantum gates elements 1520 can be physically realized through precise manipulations of qubits tailored to the specific hardware platform. For example, in superconducting qubit systems, gates can be implemented using microwave pulses to drive transitions between qubit states. Other possible physical realizations of gates, not limited to these, include the use of laser pulses in trapped-ion systems, beam splitters for photonic qubits, and the control of magnetic or electric fields in spin or semiconductor qubit systems. Beyond their direct function in quantum state manipulation, the quantum gate elements 1520A-1520N may also structurally include or be associated with additional logic circuits, electronic devices, and memory and may be composed in alignment with the specific connectivity and architecture of the quantum hardware in use. Any supporting devices such as interface electronics, memory, and control circuitry can be included within the quantum gate elements or the broader quantum gate array 1518 to support quantum gate operations.

The quantum gate array 1518 can include a set of one or more quantum gate elements 1520A-1520N. The quantum gate array 1518 can be configured to perform a variety of quantum operations as required by algorithms executed within the quantum processing unit 1516. The quantum gate array 1518 can be designed to match and connect with the underlying connectivity of the quantum processing unit (QPU), such that physical and logical gate operations are compatible with available qubit arrangements and connectivity. The quantum gate array 1518 can provide a mechanism for applying specified transformations to qubit states according to the quantum algorithm being executed, such as for encoding, data classification, or other computational tasks. The configuration and operation of the quantum gate array 1518 can be controlled by various components described herein, such as the quantum control and readout system 1510.

At least one aspect relates to a system. The system can obtain a three-dimensional molecular structure comprising a plurality of atoms, each atom corresponding to a position and a type. The system can generate a graph data structure representative of the three-dimensional molecular structure, the graph data structure comprising a plurality of nodes respectively corresponding to the plurality of atoms. The system can execute a graph neural network model to generate, for each of the plurality of atoms, an energy prediction, a force vector prediction, and an uncertainty score associated with the energy prediction or the force vector prediction. The system can select a processing function for at least one atom of the plurality of atoms according to the energy prediction, the force vector prediction, and the uncertainty score for each atom of the plurality of atoms. The system can execute the processing function for the at least one atom via a hybrid classical-quantum computing system.

In some implementations, the graph data structure further comprises a plurality of edges connecting pairs of the plurality of nodes, each edge representing a relationship between at least two atoms. In some implementations, each edge of the plurality of edges is associated with at least one edge feature comprising an interatomic distance between the at least two atoms, a relative position vector between the at least two atoms, or a bond type. In some implementations, the system can generate the uncertainty score at least in part by applying a parameter dropout to the graph neural network model. In some implementations, the system can generate the uncertainty score at least in part by calculating a gradient of a predicted value with respect to one or more parameters of the graph neural network model and determining a magnitude of the gradient as at least part of the uncertainty score. In some implementations, the system can generate the uncertainty score at least in part by determining a distance in an embedding space between an environment of the at least one atom and a plurality of atomic environments in a training data set for the graph neural network model, and generating the uncertainty score at least in part using the distance.

In some implementations, the system can select the processing function based on a comparison of the uncertainty score for the at least one atom to a first threshold. In some implementations, the system can select a quantum computing function in response to the uncertainty score exceeding the first threshold. In some implementations, the system can select a classical computing function in response to the uncertainty score failing to exceed the first threshold. In some implementations, the system can compare the uncertainty score for the at least one atom to a second threshold and select a high-accuracy classical computing function in response to the uncertainty score being between the first threshold and the second threshold.

At least one other aspect relates to a method. The method can include obtaining a three-dimensional molecular structure comprising a plurality of atoms, each atom of the plurality of atoms corresponding to a position and a type. The method can include generating a graph data structure representative of the three-dimensional molecular structure, the graph data structure comprising a plurality of nodes respectively corresponding to the plurality of atoms. The method can include executing a graph neural network model to generate, for each of the plurality of atoms, an energy prediction, a force vector prediction, and an uncertainty score associated with the energy prediction or the force vector prediction. The method can include selecting a processing function for at least one atom of the plurality of atoms according to the energy prediction, the force vector prediction, and the uncertainty score for each atom of the plurality of atoms. The method can include executing the processing function for the at least one atom via a hybrid classical-quantum computing system.

In some implementations, the graph data structure further comprises a plurality of edges connecting pairs of the plurality of nodes, each edge representing a relationship between at least two atoms. In some implementations, each edge of the plurality of edges is associated with at least one edge feature comprising an interatomic distance between the at least two atoms, a relative position vector between the at least two atoms, or a bond type. In some implementations, the method can include generating the uncertainty score at least in part by applying a parameter dropout to the graph neural network model. In some implementations, the method can include generating the uncertainty score at least in part by calculating a gradient of a predicted value with respect to one or more parameters of the graph neural network model and determining a magnitude of the gradient as at least part of the uncertainty score. In some implementations, the method can include generating the uncertainty score at least in part by determining a distance in an embedding space between an environment of the at least one atom and a plurality of atomic environments in a training data set for the graph neural network model, and generating the uncertainty score at least in part using the distance.

In some implementations, the method can include selecting the processing function based on a comparison of the uncertainty score for the at least one atom to a first threshold. In some implementations, the method can include selecting a quantum computing function in response to the uncertainty score exceeding the first threshold. In some implementations, the method can include selecting a classical computing function in response to the uncertainty score failing to exceed the first threshold.

At least one other aspect relates to a non-transitory computer-readable medium storing instructions. The instructions can cause one or more processors to obtain a three-dimensional molecular structure comprising a plurality of atoms, each atom corresponding to a position and a type. The instructions can cause the one or more processors to generate a graph data structure representative of the three-dimensional molecular structure, the graph data structure comprising a plurality of nodes respectively corresponding to the plurality of atoms. The instructions can cause the one or more processors to execute a graph neural network model to generate, for each of the plurality of atoms, an energy prediction, a force vector prediction, and an uncertainty score associated with the energy prediction or the force vector prediction. The instructions can cause the one or more processors to select a processing function for at least one atom of the plurality of atoms according to the energy prediction, the force vector prediction, and the uncertainty score for each atom of the plurality of atoms. The instructions can cause the one or more processors to execute the processing function for the at least one atom via a hybrid classical-quantum computing system.

At least one aspect relates to a system. The system can obtain a molecular structure comprising a plurality of atoms, each atom of the plurality of atoms having a respective position. The system can generate a respective uncertainty score for each atom of the plurality of atoms. The system can cluster the plurality of atoms into a plurality of fragments according to the respective position and the respective uncertainty score of each atom of the plurality of atoms. The system can determine, for each fragment of the plurality of fragments, an average uncertainty score based on the respective uncertainty score of each atom of the fragment. The system can select at least one fragment for which the average uncertainty score is greater than a threshold uncertainty score. The system can execute a processing function for the at least one fragment via a hybrid classical-quantum computing system.

In some implementations, the system can cluster the plurality of atoms according to a k-means function or a k-nearest neighbors function. In some implementations, the system can cluster the plurality of atoms according to a cluster radius configuration. In some implementations, the system can determine the average uncertainty score for each fragment of the plurality of fragments by summing the respective uncertainty score of each atom of the fragment and dividing the sum by a number of atoms in the fragment. In some implementations, the system can select the at least one fragment based on a comparison of a number of atoms in the at least one fragment to a maximum number of atoms processable via a processing component of the hybrid classical-quantum computing system.

In some implementations, the threshold uncertainty score is a first threshold uncertainty score, and the system can compare the average uncertainty score of the at least one fragment of the plurality of fragments to a second threshold uncertainty score. In some implementations, the system can select the at least one fragment for processing using a high-accuracy classical computing function in response to the average uncertainty score being between the first threshold uncertainty score and the second threshold uncertainty score. In some implementations, the system can compare the average uncertainty score for at least one second fragment of the plurality of fragments to the second threshold uncertainty score. In some implementations, the system can select the at least one second fragment for processing by a quantum processing operation in response to the average uncertainty score of the at least one second fragment being greater than the second threshold uncertainty score.

In some implementations, the system can simulate the fragment using a quantum circuit selected according to a topology of a quantum processing unit of the hybrid classical-quantum computing system. In some implementations, the system can determine a maximum uncertainty score and a variance of uncertainty scores for each fragment of the plurality of fragments. In some implementations, the system can generate the respective uncertainty score for each atom of the plurality of atoms using a graph neural network model.

At least one other aspect relates to a method. The method can include obtaining a molecular structure comprising a plurality of atoms, each atom of the plurality of atoms having a respective position. The method can include generating a respective uncertainty score for each atom of the plurality of atoms. The method can include clustering the plurality of atoms into a plurality of fragments according to the respective position and the respective uncertainty score of each atom of the plurality of atoms. The method can include determining, for each fragment of the plurality of fragments, an average uncertainty score based on the respective uncertainty score of each atom of the fragment. The method can include selecting at least one fragment for which the average uncertainty score is greater than a threshold uncertainty score. The method can include executing a processing function for the at least one fragment via a hybrid classical-quantum computing system.

In some implementations, the method can include clustering the plurality of atoms according to a k-means function or a k-nearest neighbors function. In some implementations, the method can include clustering the plurality of atoms according to a cluster radius configuration. In some implementations, the method can include determining the average uncertainty score for each fragment of the plurality of fragments by summing the respective uncertainty score of each atom of the fragment and dividing the sum by a number of atoms in the fragment. In some implementations, the method can include selecting the at least one fragment based on a comparison of a number of atoms in the at least one fragment to a maximum number of atoms processable via a processing component of the hybrid classical-quantum computing system.

In some implementations, the threshold uncertainty score is a first threshold uncertainty score. In some implementations, the method can include comparing the average uncertainty score of the at least one fragment of the plurality of fragments to a second threshold uncertainty score. In some implementations, the method can include selecting the at least one fragment for processing using a high-accuracy classical computing function in response to the average uncertainty score being between the first threshold uncertainty score and the second threshold uncertainty score. In some implementations, the method can include comparing the average uncertainty score for at least one second fragment of the plurality of fragments to the second threshold uncertainty score. In some implementations, the method can include selecting the at least one second fragment for processing by a quantum processing operation in response to the average uncertainty score of the at least one second fragment being greater than the second threshold uncertainty score.

In some implementations, the method can include simulating the fragment using a quantum circuit selected according to a topology of a quantum processing unit of the hybrid classical-quantum computing system. In some implementations, the method can include determining a maximum uncertainty score and a variance of uncertainty scores for each fragment of the plurality of fragments.

At least one other aspect relates to a non-transitory computer-readable medium storing instructions. The instructions can cause one or more processors to obtain a molecular structure comprising a plurality of atoms, each atom of the plurality of atoms having a respective position. The instructions can cause the one or more processors to generate a respective uncertainty score for each atom of the plurality of atoms. The instructions can cause the one or more processors to cluster the plurality of atoms into a plurality of fragments according to the respective position and the respective uncertainty score of each atom of the plurality of atoms. The instructions can cause the one or more processors to determine, for each fragment of the plurality of fragments, an average uncertainty score based on the respective uncertainty score of each atom of the fragment. The instructions can cause the one or more processors to select at least one fragment for which the average uncertainty score is greater than a threshold uncertainty score. The instructions can cause the one or more processors to execute a processing function for the at least one fragment via a hybrid classical-quantum computing system.

At least one aspect relates to a system. The system can obtain a plurality of fragments derived from a molecular structure, each fragment comprising a subset of atoms of the molecular structure and having a respective uncertainty score generated by a graph neural network (GNN) model. The system can select at least one fragment of the plurality of fragments having an uncertainty score greater than a threshold. The system can simulate the at least one fragment via a quantum computing environment to generate a quantum simulation result comprising an energy value and at least one force vector for the at least one fragment. The system can store the at least one fragment and the quantum simulation result as an entry in a training dataset. The system can update the GNN model according to the training dataset.

In some implementations, the system can simulate at least one second fragment using a classical computing system to generate a classical simulation result. In some implementations, the system can store the at least one second fragment and the classical simulation result as a second entry in the training dataset. In some implementations, the threshold is a first threshold, and the system can select a high-accuracy simulation function in response to a second uncertainty score of the at least one second fragment being between the first threshold and a second threshold. In some implementations, the system can generate a respective uncertainty score for each fragment of the plurality of fragments.

In some implementations, the system can store, in the training dataset, metadata specifying a molecular configuration of the at least one fragment, the uncertainty score for the at least one fragment, and simulation parameters used to generate the quantum simulation result. In some implementations, the system can restrict at least one second fragment from storage in the training dataset in response to determining that the at least one second fragment is chemically equivalent to a fragment stored in the training dataset. In some implementations, the system can evaluate performance of the updated GNN model based on a validation dataset comprising a set of fragments not present in the training dataset. In some implementations, the system can simulate the at least one fragment using a quantum algorithm selected according to an accuracy ranking of a set of candidate quantum algorithms. In some implementations, the system can apply an error mitigation function to an output of the quantum computing environment to generate the quantum simulation result. In some implementations, the system can update the GNN model in response to a number of entries in the training dataset exceeding a second threshold.

At least one other aspect relates to a method. The method can be performed, for example, by one or more processors coupled to non-transitory memory. The method can include obtaining a plurality of fragments derived from a molecular structure, each fragment comprising a subset of atoms of the molecular structure and having a respective uncertainty score generated by a GNN model. The method can include selecting at least one fragment of the plurality of fragments having an uncertainty score greater than a threshold. The method can include simulating the at least one fragment via a quantum computing environment to generate a quantum simulation result comprising an energy value and at least one force vector for the at least one fragment. The method can include storing the at least one fragment and the quantum simulation result as an entry in a training dataset. The method can include updating the GNN model according to the training dataset.

In some implementations, the method can include simulating at least one second fragment using a classical computing system to generate a classical simulation result. In some implementations, the method can include storing the at least one second fragment and the classical simulation result as a second entry in the training dataset. In some implementations, the threshold is a first threshold, and the method can include selecting a high-accuracy simulation function in response to a second uncertainty score of the at least one second fragment being between the first threshold and a second threshold. In some implementations, the method can include generating a respective uncertainty score for each fragment of the plurality of fragments.

In some implementations, the method can include storing, in the training dataset, metadata specifying a molecular configuration of the at least one fragment, the uncertainty score for the at least one fragment, and simulation parameters used to generate the quantum simulation result. In some implementations, the method can include restricting at least one second fragment from storage in the training dataset in response to determining that the at least one second fragment is chemically equivalent to a fragment stored in the training dataset. In some implementations, the method can include evaluating performance of the updated GNN model based on a validation dataset comprising a set of fragments not present in the training dataset. In some implementations, the method can include simulating the at least one fragment using a quantum algorithm selected according to an accuracy ranking of a set of candidate quantum algorithms. In some implementations, the method can include applying an error mitigation function to an output of the quantum computing environment to generate the quantum simulation result.

At least one other aspect relates to a non-transitory computer-readable memory. The non-transitory computer-readable memory can store instructions that, when executed, cause one or more processors to obtain a plurality of fragments derived from a molecular structure, each fragment comprising a subset of atoms of the molecular structure and having a respective uncertainty score generated by a GNN model. The instructions can cause the processors to select at least one fragment of the plurality of fragments having an uncertainty score greater than a threshold. The instructions can cause the processors to simulate the at least one fragment via a quantum computing environment to generate a quantum simulation result comprising an energy value and at least one force vector for the at least one fragment. The instructions can cause the processors to store the at least one fragment and the quantum simulation result as an entry in a training dataset. The instructions can cause the processors to update the GNN model according to the training dataset in response to a number of entries in the training dataset exceeding a second threshold.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system, comprising:

one or more processors coupled to non-transitory memory and communicably coupled with a classical computing system and a quantum computing system, the one or more processors configured to:
- obtain a three-dimensional molecular structure comprising a plurality of atoms, each atom of the plurality of atoms corresponding to a position and a type;
- generate a graph data structure representative of the three-dimensional molecular structure, the graph data structure comprising a plurality of nodes respectively corresponding to the plurality of atoms;
- execute a graph neural network (GNN) model to generate, for each of the plurality of atoms:
  - (i) an energy prediction,
  - (ii) a force vector prediction, and
  - (iii) an uncertainty score associated with the energy prediction or the force vector prediction;
- select a processing function for at least one atom of the plurality of atoms according to the energy prediction, the force vector prediction, and the uncertainty score for each atom of the plurality of atoms at least by:
  - generating a fragment comprising two or more of the plurality of atoms:
  - retrieving a maximum memory availability value from the classical computing system and a current qubit count and circuit depth constraint from the quantum computing system; and
  - selecting a hybrid processing function for the fragment based on the maximum memory availability value, the current qubit count and circuit depth constraint, and an uncertainty score for the fragment generated based on the uncertainty scores of each of the two or more atoms; and execute the processing function for the at least one atom via a hybrid classical-quantum computing system by using the quantum computing system to process a first portion of atoms of the fragment and the classical computing system to process a second portion of atoms of the fragment.

2. The system of claim 1, wherein the graph data structure further comprises a plurality of edges connecting pairs of the plurality of nodes, each edge of the plurality of edges representing a relationship between at least two atoms of the plurality of atoms.

3. The system of claim 2, wherein each edge of the plurality of edges is associated with at least one edge feature comprising an interatomic distance between the at least two atoms, a relative position vector between the at least two atoms, or a bond type.

4. The system of claim 1, wherein the one or more processors are further configured to:

generate the uncertainty score at least in part by applying a parameter dropout to the GNN model.

5. The system of claim 1, wherein the one or more processors are further configured to:

generate the uncertainty score at least in part by:

calculating a gradient of a predicted value with respect to one or more parameters of the GNN model, and determining a magnitude of the gradient as at least part of the uncertainty score.

6. The system of claim 1, wherein the one or more processors are further configured to:

generate the uncertainty score at least in part by:

determining a distance in an embedding space between an environment of the at least one atom and a plurality of atomic environments in a training data set for the GNN model, and generating the uncertainty score at least in part using the distance.

7. The system of claim 1, wherein the one or more processors are further configured to:

select the processing function based on a comparison of the uncertainty score for the at least one atom to a first threshold.

8. The system of claim 7, wherein the one or more processors are further configured to:

select a quantum computing function in response to the uncertainty score exceeding the first threshold.

9. The system of claim 7, wherein the one or more processors are further configured to:

select a classical computing function in response to the uncertainty score failing to exceed the first threshold.

10. The system of claim 9, wherein the one or more processors are further configured to:

compare the uncertainty score for the at least one atom to a second threshold; and select a high-accuracy classical computing function in response to the uncertainty score being between the first threshold and the second threshold.

11. A method, comprising:

obtaining, by one or more processors coupled to non-transitory memory and communicably coupled with a classical computing system and a quantum computing system, a three-dimensional molecular structure comprising a plurality of atoms, each atom of the plurality of atoms corresponding to a position and a type;

generating, by the one or more processors, a graph data structure representative of the three-dimensional molecular structure, the graph data structure comprising a plurality of nodes respectively corresponding to the plurality of atoms;

executing, by the one or more processors, a graph neural network (GNN) model to generate, for each of the plurality of atoms:

(i) an energy prediction, (ii) a force vector prediction, and (iii) an uncertainty score associated with the energy prediction or the force vector prediction;

selecting, by the one or more processors, a processing function for at least one atom of the plurality of atoms according to the energy prediction, the force vector prediction, and the uncertainty score for each atom of the plurality of atoms at least by:

generating a fragment comprising two or more of the plurality of atoms;

retrieving a maximum memory availability value from the classical computing system and a current qubit count and circuit depth constraint from the quantum computing system; and selecting a hybrid processing function for the fragment based on the maximum memory availability value, the current qubit count and circuit depth constraint, and an uncertainty score for the fragment generated based on the uncertainty scores of each of the two or more atoms; and executing, by the one or more processors, the processing function for the at least one atom via a hybrid classical-quantum computing system by using the quantum computing system to process a first portion of atoms of the fragment and the classical computing system to process a second portion of atoms of the fragment.

12. The method of claim 11, wherein the graph data structure further comprises a plurality of edges connecting pairs of the plurality of nodes, each edge of the plurality of edges representing a relationship between at least two atoms of the plurality of atoms.

13. The method of claim 12, wherein each edge of the plurality of edges is associated with at least one edge feature comprising an interatomic distance between the at least two atoms, a relative position vector between the at least two atoms, or a bond type.

14. The method of claim 11, further comprising generating, by the one or more processors, the uncertainty score at least in part by applying a parameter dropout to the GNN model.

15. The method of claim 11, further comprising:

generating, by the one or more processors, the uncertainty score at least in part by calculating a gradient of a predicted value with respect to one or more parameters of the GNN model; and determining, by the one or more processors, a magnitude of the gradient as at least part of the uncertainty score.

16. The method of claim 11, further comprising:

generating, by the one or more processors, the uncertainty score at least in part by determining a distance in an embedding space between an environment of the at least one atom and a plurality of atomic environments in a training data set for the GNN model; and generating, by the one or more processors, the uncertainty score at least in part using the distance.

17. The method of claim 11, further comprising selecting, by the one or more processors, the processing function based on a comparison of the uncertainty score for the at least one atom to a first threshold.

18. The method of claim 17, further comprising selecting, by the one or more processors, a quantum computing function in response to the uncertainty score exceeding the first threshold.

19. The method of claim 17, further comprising selecting, by the one or more processors, a classical computing function in response to the uncertainty score failing to exceed the first threshold.

20. A non-transitory computer-readable medium storing instructions that, when executed by one or more processors communicably coupled with a classical computing system and a quantum computing system, cause the one or more processors to:

obtain a three-dimensional molecular structure comprising a plurality of atoms, each atom of the plurality of atoms corresponding to a position and a type;

generate a graph data structure representative of the three-dimensional molecular structure, the graph data structure comprising a plurality of nodes respectively corresponding to the plurality of atoms;

execute a graph neural network (GNN) model to generate, for each of the plurality of atoms:

(i) an energy prediction, (ii) a force vector prediction, and (iii) an uncertainty score associated with the energy prediction or the force vector prediction;

select a processing function for at least one atom of the plurality of atoms according to the energy prediction, the force vector prediction, and the uncertainty score for each atom of the plurality of atoms at least by:

generating a fragment comprising two or more of the plurality of atoms;

retrieving a maximum memory availability value from the classical computing system and a current qubit count and circuit depth constraint from the quantum computing system; and selecting a hybrid processing function for the fragment based on the maximum memory availability value, the current qubit count and circuit depth constraint, and an uncertainty score for the fragment generated based on the uncertainty scores of each of the two or more atoms; and execute the processing function for the at least one atom via a hybrid classical-quantum computing system by using the quantum computing system to process a first portion of atoms of the fragment and the classical computing system to process a second portion of atoms of the fragment.

* * * * *